United States Patent
Kobashi et al.

(10) Patent No.: US 7,761,791 B2
(45) Date of Patent: Jul. 20, 2010

(54) LAYOUT PROCESSING USING A TEMPLATE HAVING DATA AREAS AND CONTENTS DATA TO BE INSERTED INTO EACH DATA AREA

(75) Inventors: Kazufumi Kobashi, Yokohama (JP); Jun Makino, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/196,579

(22) Filed: Aug. 4, 2005

(65) Prior Publication Data

US 2006/0029125 A1  Feb. 9, 2006

(30) Foreign Application Priority Data

Aug. 6, 2004  (JP)  .............................. 2004-231428

(51) Int. Cl.
G06F 17/00 (2006.01)
G06F 17/20 (2006.01)
G06F 17/21 (2006.01)
G06F 17/22 (2006.01)
G06F 17/24 (2006.01)
G06F 17/25 (2006.01)
G06F 17/26 (2006.01)
G06F 17/27 (2006.01)
G06F 17/28 (2006.01)

(52) U.S. Cl. ...................................... 715/253; 715/243
(58) Field of Classification Search .................. 715/517, 715/243, 253
See application file for complete search history.

(56) References Cited

U.S. PATENT DOCUMENTS

| | | | | |
|---|---|---|---|---|
| 5,018,079 A | * | 5/1991 | Shukunami et al. | 358/1.6 |
| 5,060,170 A | * | 10/1991 | Bourgeois et al. | 715/788 |
| 5,089,990 A | | 2/1992 | Saito | 395/375 |
| 5,649,216 A | * | 7/1997 | Sieber | 715/234 |
| 5,745,122 A | | 4/1998 | Gay et al. | 345/433 |
| 5,845,303 A | * | 12/1998 | Templeman | 715/517 |
| 5,855,009 A | * | 12/1998 | Garcia et al. | 706/45 |
| 6,470,016 B1 | * | 10/2002 | Kalkunte et al. | 370/395.41 |
| 6,596,032 B2 | * | 7/2003 | Nojima et al. | 715/247 |
| 6,760,043 B2 | * | 7/2004 | Markel | 715/717 |
| 6,826,727 B1 | * | 11/2004 | Mohr et al. | 715/235 |
| 6,879,943 B1 | * | 4/2005 | Shigemori | 703/2 |

(Continued)

FOREIGN PATENT DOCUMENTS

JP  03-71189  3/1991

(Continued)

Primary Examiner—Joshua D Campbell
Assistant Examiner—Stephen Alvasteffer
(74) Attorney, Agent, or Firm—Fitzpatrick, Cella, Harper & Scinto

(57) ABSTRACT

In a layout processing method of dynamically changing the layout of a template having a plurality of data areas in accordance with data presented to each of the plurality of data areas, a set of data areas associated by a link is extracted. For the plurality of data areas contained in the extracted set of data areas, the area size of each data area is determined on the basis of a contents size required by contents data to be presented to each data area and a priority set for each data area. The data are laid out in accordance with the thus determined area sizes of the plurality of data areas and output.

9 Claims, 38 Drawing Sheets

U.S. PATENT DOCUMENTS

| | | | |
|---|---|---|---|
| 7,028,255 B1 * | 4/2006 | Ayers | 715/202 |
| 7,129,993 B2 * | 10/2006 | Park | 348/569 |
| 2001/0035875 A1 * | 11/2001 | Suzuki et al. | 345/723 |
| 2002/0087986 A1 | 7/2002 | Markel | 725/42 |
| 2003/0028560 A1 * | 2/2003 | Kudrolli et al. | 707/509 |
| 2004/0019852 A1 * | 1/2004 | Purvis | 715/517 |
| 2004/0066392 A1 * | 4/2004 | Ueda | 345/629 |
| 2004/0070627 A1 * | 4/2004 | Shahine et al. | 345/794 |
| 2004/0088649 A1 * | 5/2004 | Elder et al. | 715/501.1 |
| 2004/0205553 A1 * | 10/2004 | Hall et al. | 715/513 |
| 2004/0255245 A1 * | 12/2004 | Yamada et al. | 715/517 |
| 2005/0094205 A1 * | 5/2005 | Lo et al. | 358/1.18 |
| 2005/0105116 A1 * | 5/2005 | Kobashi | 358/1.12 |
| 2005/0168780 A1 * | 8/2005 | Kobashi et al. | 358/1.18 |
| 2005/0168782 A1 * | 8/2005 | Kobashi et al. | 358/1.18 |
| 2005/0172221 A1 * | 8/2005 | Kobashi et al. | 715/513 |
| 2005/0172224 A1 * | 8/2005 | Kobashi et al. | 715/517 |
| 2005/0172225 A1 * | 8/2005 | Kobashi et al. | 715/517 |
| 2005/0172226 A1 * | 8/2005 | Kobashi et al. | 715/518 |
| 2005/0179947 A1 * | 8/2005 | Kobashi et al. | 358/1.18 |
| 2005/0183010 A1 * | 8/2005 | Iwasaki | 715/517 |
| 2006/0028659 A1 * | 2/2006 | Nishikawa | 358/1.2 |
| 2006/0029125 A1 * | 2/2006 | Kobashi et al. | 375/222 |
| 2006/0031762 A1 * | 2/2006 | Takashima | 715/517 |
| 2006/0044615 A1 * | 3/2006 | Kobashi et al. | 358/1.18 |
| 2006/0048054 A1 * | 3/2006 | Honda | 715/517 |
| 2006/0050287 A1 * | 3/2006 | Kobashi et al. | 358/1.2 |
| 2006/0156227 A1 * | 7/2006 | Hosotsubo | 715/517 |
| 2006/0170948 A1 * | 8/2006 | Kobashi | 358/1.13 |
| 2006/0174194 A1 * | 8/2006 | Miyazawa | 715/517 |
| 2006/0198555 A1 * | 9/2006 | Hosotsubo | 382/162 |
| 2006/0203294 A1 * | 9/2006 | Makino | 358/400 |

FOREIGN PATENT DOCUMENTS

| | | | |
|---|---|---|---|
| JP | 06-203130 | | 7/1994 |
| JP | 07-129658 | | 5/1995 |
| JP | 2004-94385 | | 3/2004 |
| JP | 2005216179 A | * | 8/2005 |
| JP | 2005216180 A | * | 8/2005 |
| JP | 2006048532 A | * | 2/2006 |

* cited by examiner

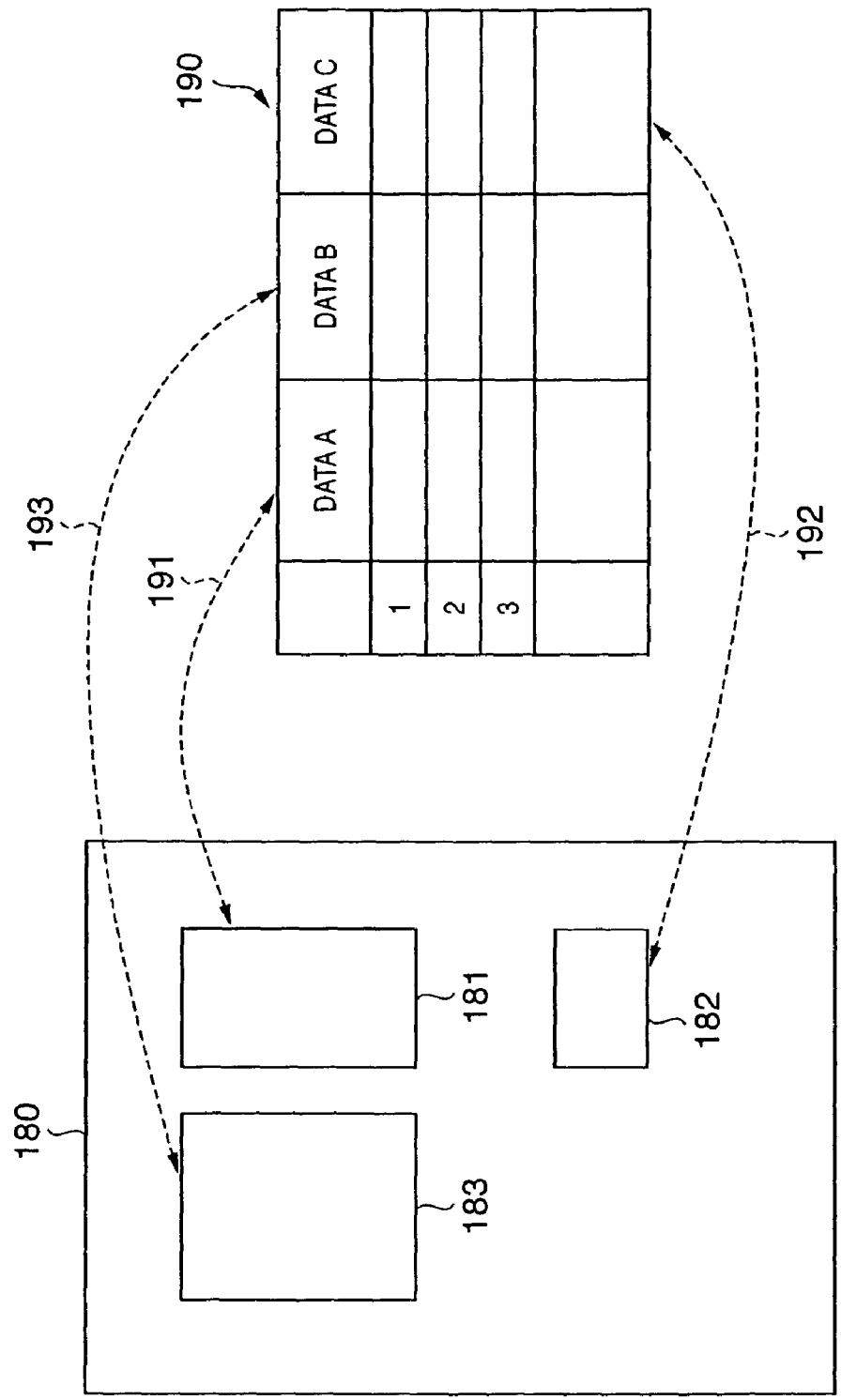

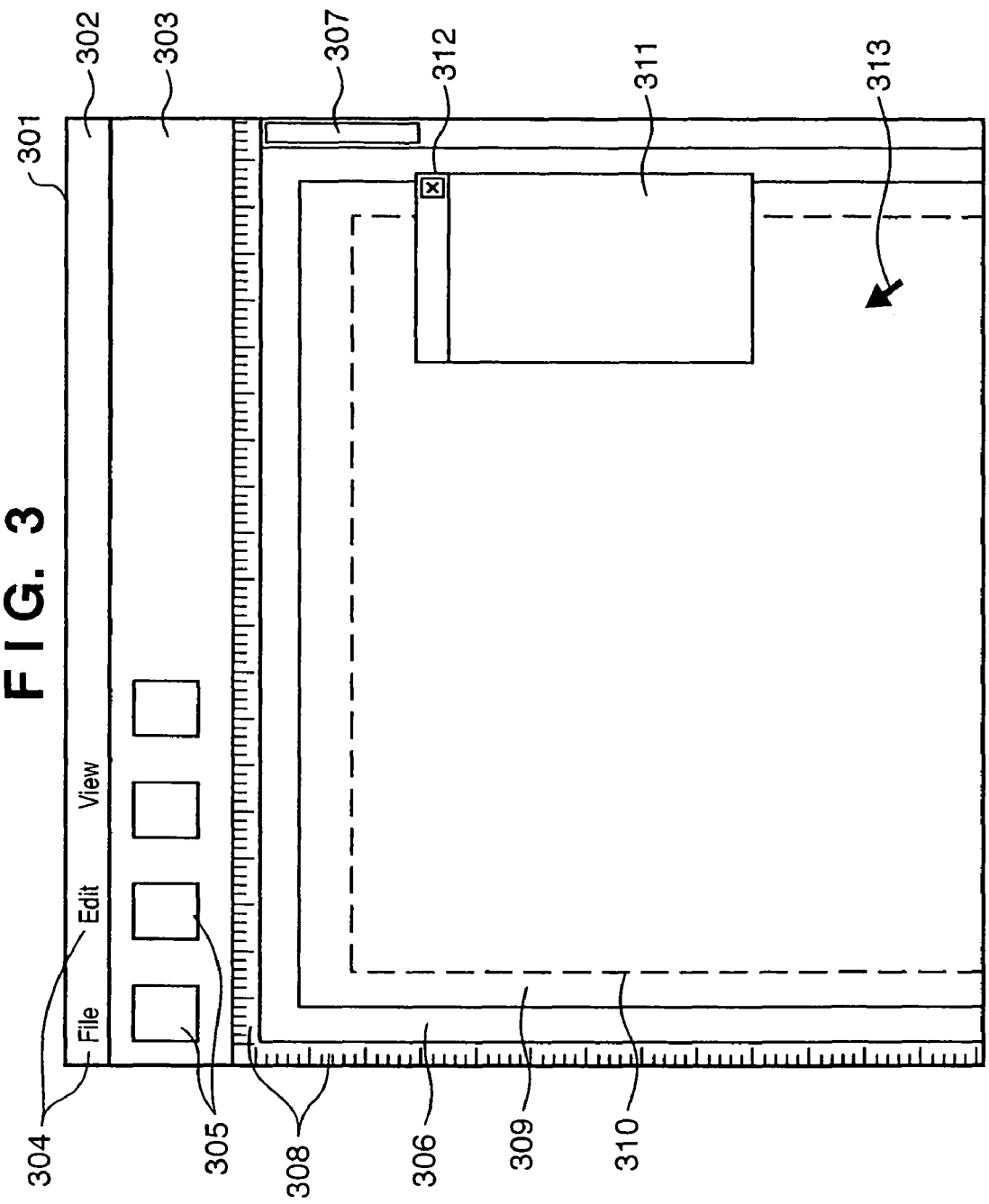

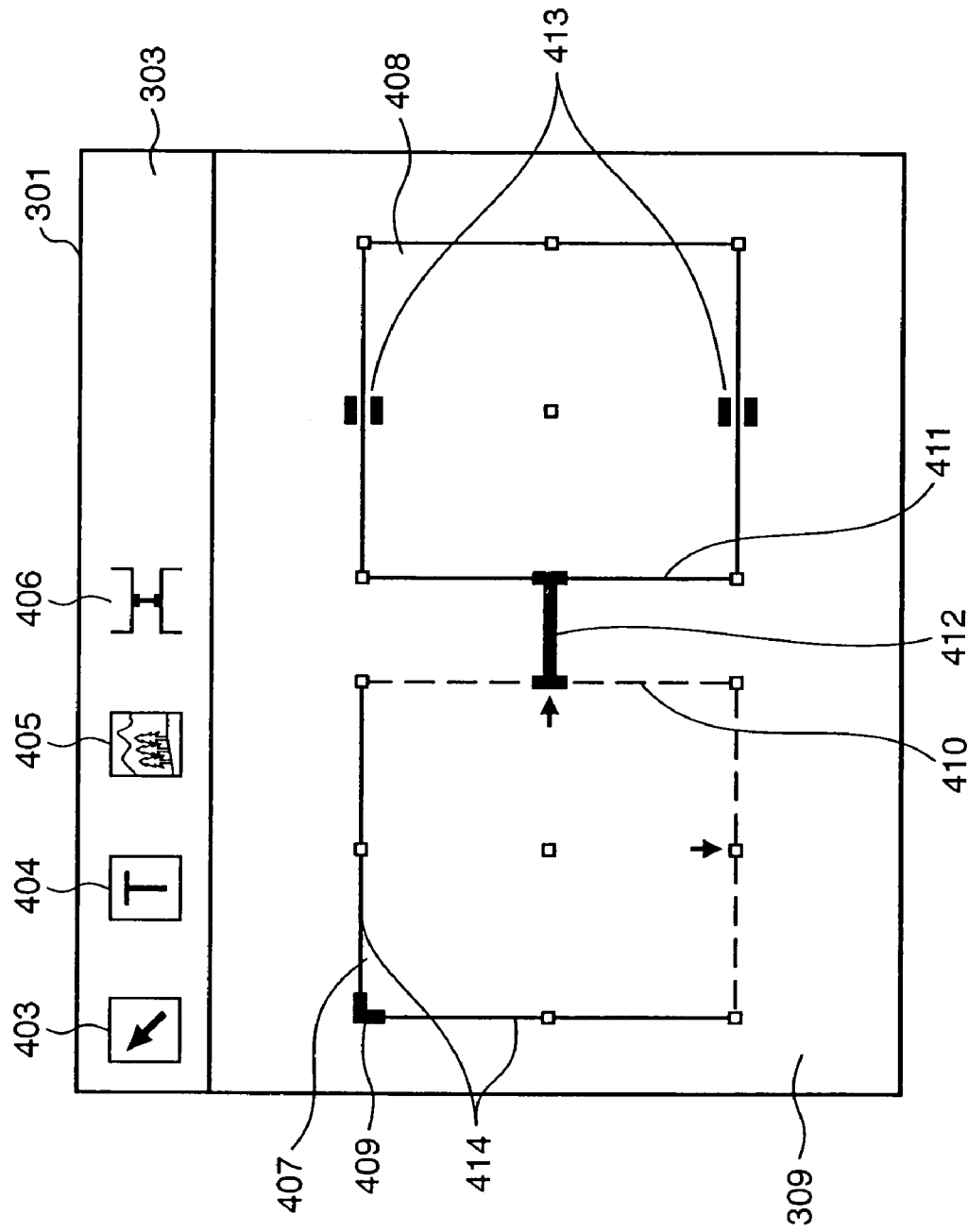

F I G. 32
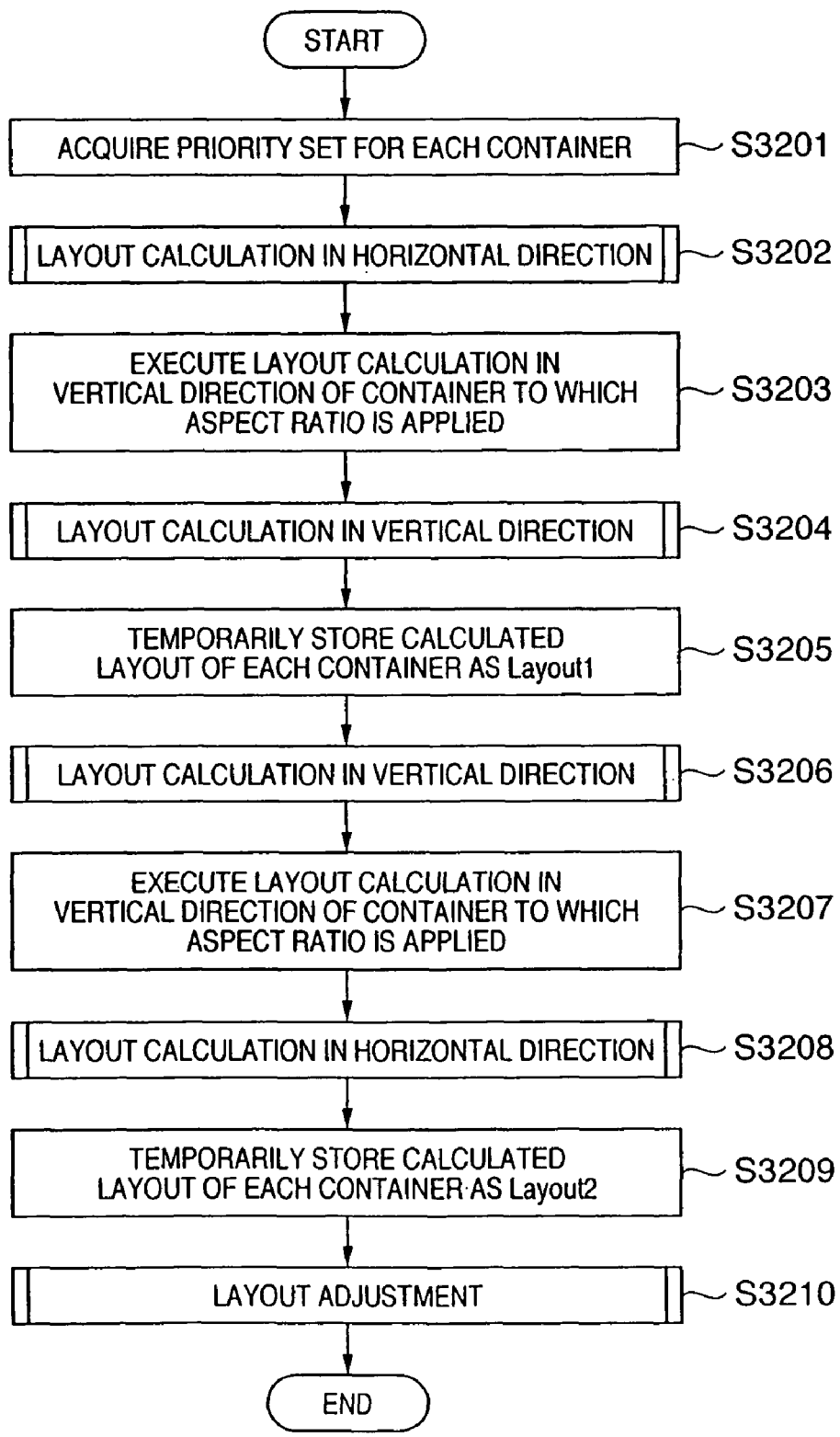

LAYOUT PROCESSING USING A TEMPLATE HAVING DATA AREAS AND CONTENTS DATA TO BE INSERTED INTO EACH DATA AREA

FIELD OF THE INVENTION

The present invention relates to a technique of generating, editing, and printing a document containing texts and images and, more particularly, to generation, editing, and printing of a variable data document.

BACKGROUND OF THE INVENTION

Since the merchandise service life decreases recently due to a variety of merchandise items, and the number of consumers with customization service orientation increases along with the penetration of the Internet, the necessity of CRM (Customer Relationship Management) and one-to-one marketing has received a great deal of attention. These methods are very effective for purposes of increasing the customer satisfaction and winning and networking new customers.

The one-to-one marketing is a kind of database marketing. Personal attribute information such as the age, sex, hobby, taste, and purchase log of each customer is stored as a database. The contents of the information are analyzed, and a proposal that meets customer's needs is presented. A typical method is variable print. Especially, along with the recent progress in DTP (DeskTop Publishing) technology and the spread of digital printers, variable print systems have been developed, which customize and output a document for each customer. Such a variable print system is required to create a customized document in which contents in quantity that changes for each customer are laid out in an optimum manner.

Generally, when such a customized document is to be created by a variable print system, containers are laid out on the document. A container indicates a partial area to draw a content (drawing content) and is sometimes called a field area. More specifically, containers are laid out on the document, and a database and the layout are associated with each other (each content in the database is associated with each container). With this operation, a customized document (document) is created. In this specification, such a document will be referred to as a variable data document.

In the variable print system, a content which is different for each customer can be inserted in each of the containers laid out. The size of data to be inserted in a content is flexible. If the size of a container is fixed, the following problem arises. For example, when text data having a size larger than the container size is inserted, the text cannot wholly be displayed in the container. Alternatively, when image data having a size larger than the container size is inserted, the image is partially missing. Such a problem is called overflow.

If the content is image data, the image may be reduced and drawn in the container. However, the image may be excessively small. There is also proposed a technique in which if text data whose size is larger than a fixed container size is inserted, the font size of the text is reduced to display the entire text in the container. However, if the font size is adjusted, it may be too small to balance the whole document, or the document may become difficult to read.

The "layout design apparatus" of Japanese Patent Laid-Open No. 7-129658 discloses an automatic layout technique to solve the above-described problems. In this technique, when the size of a container becomes large, the size of an adjacent container is reduced to maintain the interval between them.

In the automatic layout system described as the prior art, however, the user cannot set how to change the data size in automatic layout calculation based on the size of data in the database. For example, assume that there are two containers A and B with a flexible size, and data are inserted from the database in both containers. If both data cannot wholly be inserted in the containers A and B because of their large sizes, calculation is done to equally reduce the sizes of the data so that they can wholly be inserted in the containers A and B.

In the above-described one-to-one marketing, a catalog or brochure is created in accordance with a customer's needs. A container to insert the contents data of a merchandise item that appeals to the customer needs to be preferentially created in a larger size than other containers. However, in the automatic layout system, such layout creation reflecting the user's intention is impossible.

SUMMARY OF THE INVENTION

The present invention has been made in consideration of the above problems, and has as its object to implement layout processing capable of determining the size of each data area to insert data in accordance with weighting based on the priority set in the data area and properly adapting to the user's requirement.

According to one aspect of the present invention, there is provided a layout processing method of dynamically changing a layout of a template having a plurality of data areas in accordance with contents data to be inserted in each of the plurality of data areas, comprising: an extraction step of extracting a set of data areas associated by a link; a determination step of determining, for the plurality of data areas contained in the set of data areas extracted in the extraction step, an area size of each data area in accordance with a contents size required by contents data to be inserted in each data area and a weight based on a priority set for each data area; and an output step of laying out and outputting the contents data in accordance with the area sizes of the plurality of data areas which are determined in the determination step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1C is a view for explaining the outline of variable data print;

FIG. 3 is a view showing an example of a user interface according to the embodiment, which includes a menu bar, tool bar, work area, and floating palette;

FIG. 4 is a view showing a display example of containers in the user interface;

FIG. 32 is a flowchart showing layout calculation processing considering aspect ratios and priorities;

DETAILED DESCRIPTION OF THE PREFERRED EMBODIMENT

A preferred embodiment of the present invention will now be described in detail in accordance with the accompanying drawings.

<System Arrangement>

Figure 1A:
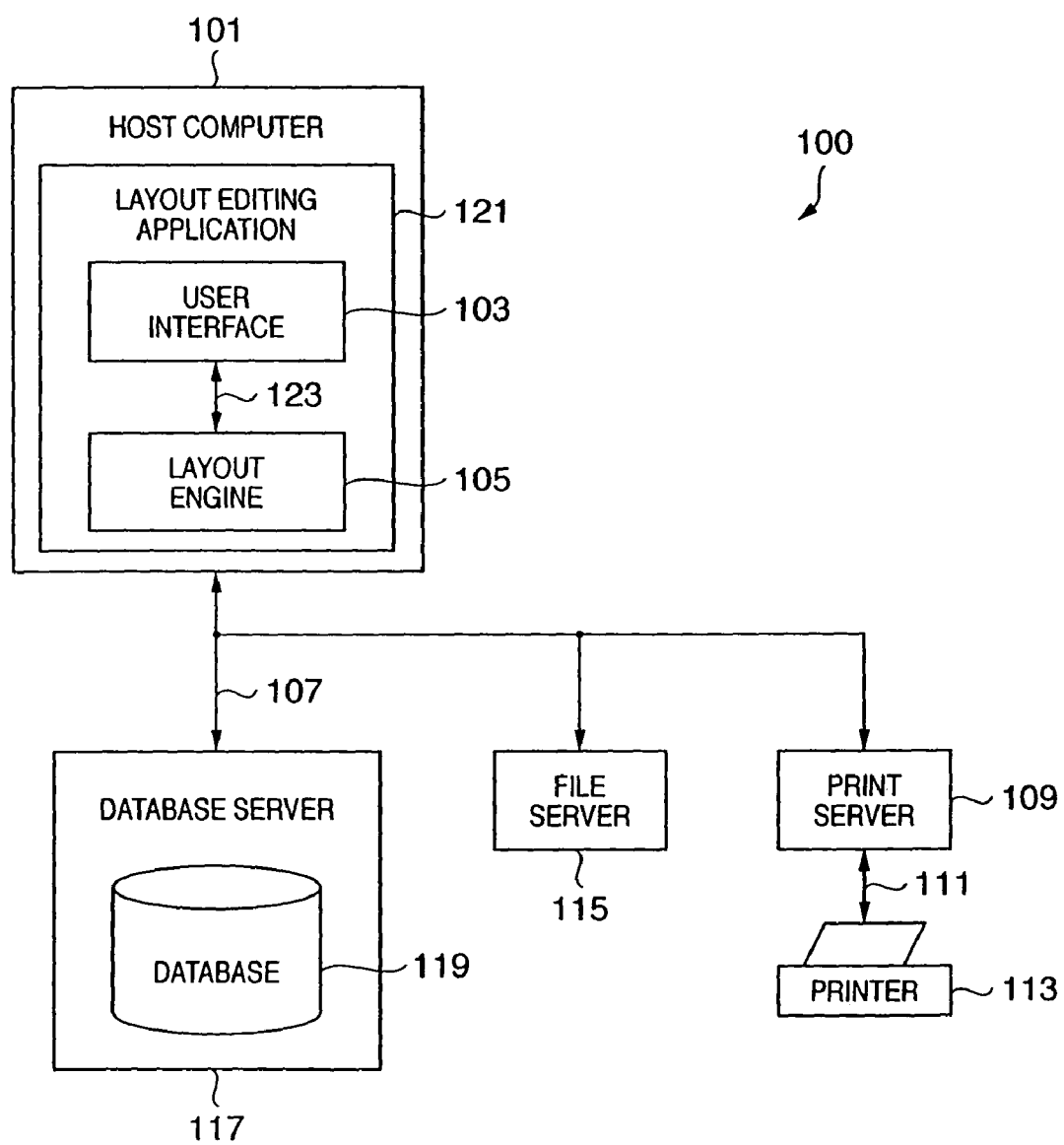
FIG. 1A is a block diagram showing an arrangement of a variable print system according to an embodiment.
Figure 1B:
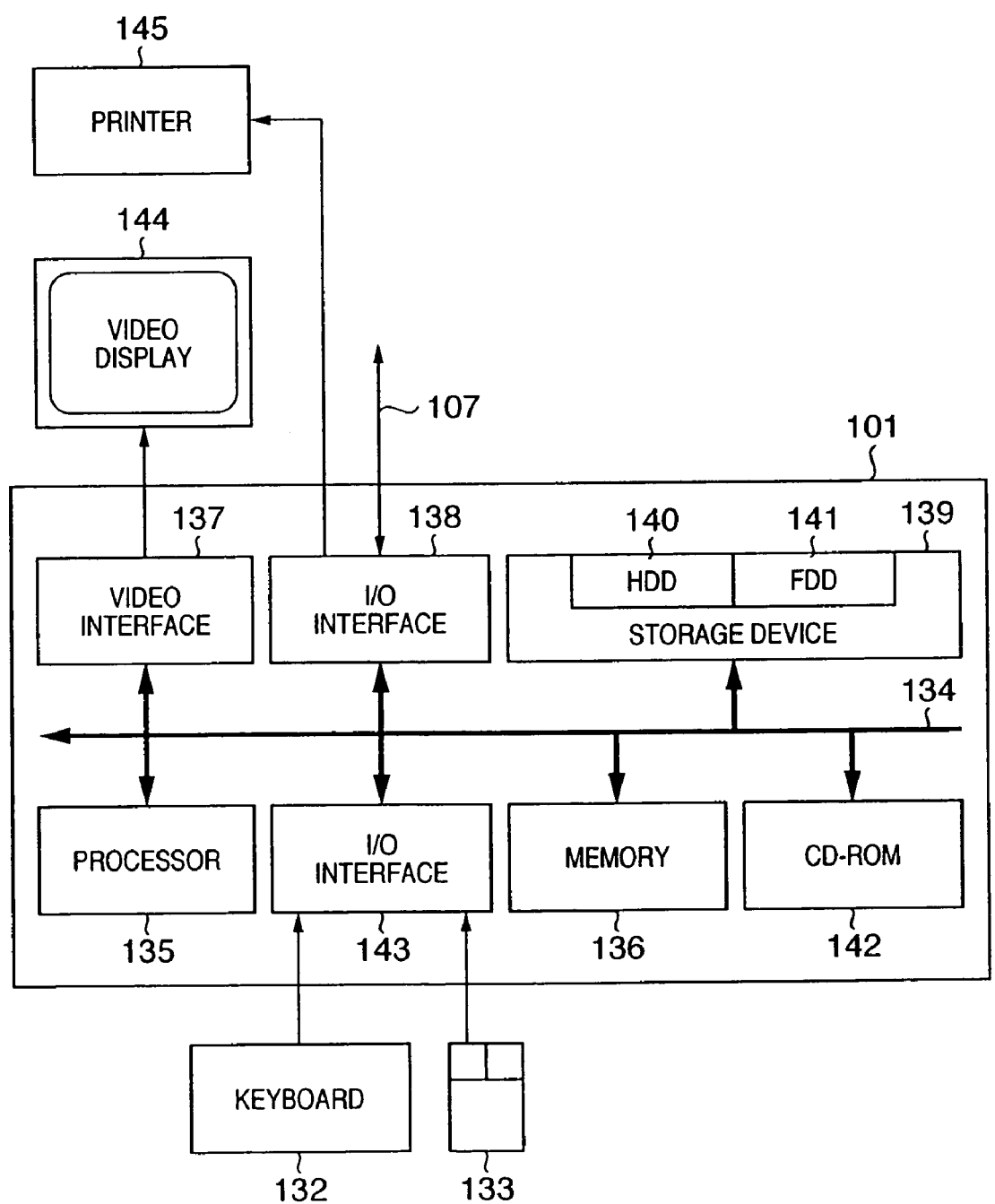
FIG. 1B is a block diagram showing the schematic arrangement of a host computer shown in FIG. 1.

The arrangement of a variable print system according to the embodiment will be described first with reference to FIGS. 1A and 1B. FIG. 1A is a block diagram showing an arrangement of a variable print system 100 to print a variable data document. FIG. 1B is a block diagram showing the arrangement of a host computer 101 shown in FIG. 1A in more detail. Variable print processing to be described in this embodiment is executed by the host computer 101 (including general-purpose computer modules) serving as a layout adjustment apparatus. The software of a layout editing application program 121 (layout adjustment program according to the present invention) executable on the system 100 is wholly or partially executed by the host computer 101. Especially, processing for layout editing or processing for printing a variable data document is implemented by the software executed by the host computer 101.

The layout editing application program 121 is stored in a computer-readable medium. The layout editing application program 121 is loaded from the computer-readable medium to a memory 136 of the host computer 101 and executed. The computer-readable medium which stores such software or computer program is a computer program product. When the computer program product is used by a computer, an apparatus suitable for layout editing or variable print of a document is provided.

As shown in FIG. 1B, pointing devices such as a keyboard 132 and a mouse 133 serving as input devices are connected to the host computer 101 through an input/output interface 143. A display device 144 serving as an output device is connected through a video interface 137. A local printer 145 or the like may be connected through an input/output interface 138. The input/output interface 138 also has a function of connecting the host computer 101 to a network 107. With this arrangement, the host computer 101 can be connected to another computer apparatus in the system 100 through the network. Typical examples of the network 107 are a local area network (LAN) and wide area network (WAN).

As shown in FIG. 1B, the host computer 101 includes at least one processor unit 135 and the memory unit 136 including, e.g., a semiconductor random access memory (RAM) or read-only memory (ROM). A storage device 139 includes a hard disk drive 140 and floppy (registered trademark) disk drive 141 capable of transmitting/receiving data to/from the computer-readable medium which stores the program. Although not illustrated in FIG. 1B, a magnetic tape drive can also be used as the storage device 139. A CD-ROM drive 142 is provided as a nonvolatile data source (the computer program may be provided by a CD-ROM, as a matter of course).

The host computer 101 uses the components 135 to 143 of the computer module 101, which communicate through an interconnection bus 134, typically in a form according to an operating system such as GNU/LINUX or Microsoft Windows® or by a method by the conventional operation mode of a computer system formed by a known associated technique. That is, the above-described components 135 to 143 are communicably connected through the bus 134 and used by the operating system installed in the host computer 101.

Examples of the host computer 101 shown in FIG. 1B are an IBM-compatible PC or Sparcstation available from SUN, or a computer system including them.

<Outline of Layout Editing Application>

In this embodiment, the layout editing application program 121 is resident in the hard disk drive 140, and its execution or reading is controlled by the processor 135. Data of the layout editing application program 121 that are fetched from the intermediate storage device and the network 107 use the semiconductor memory 136 in response to the hard disk drive 140.

As an example, the encoded program of the layout editing application 121 is stored in a CD-ROM or floppy (registered trademark) disk, loaded through the corresponding drive 142 to 141, and installed in the hard disk drive 140. As another example, the layout editing application program 121 may be loaded from the network 107 into the host computer 101 and installed in the hard disk drive 140. The software may be loaded in the host computer 101 by using a magnetic tape, ROM, integrated circuit, magnetooptical disk, wireless communication using infrared rays between the host computer 101 and another device, a computer-readable card such as a PCMCIA card, or another appropriate computer including e-mail communication, an intranet, or the Internet having recording information on a Web site. These are examples of computer-readable media. Any other computer-readable medium may be used.

Referring to FIG. 1A, the layout editing application 121 of the present invention causes the computer to execute variable print (also called variable data print (VDP)) and includes two software components, i.e., a layout engine 105 and user interface 103. The layout engine 105 is a software component which loads each record of variable data stored in a database 119 in accordance with the constraints of the sizes and positions given to containers (rectangular ranges) as partial areas and calculates, on the basis of the read data and the constraints of the containers, the size and position of each container in which the readout data should be inserted. In this embodiment, the layout engine 105 also executes processing of drawing data assigned to a container to generate an image of a variable data document. However, the present invention is not limited to this. The layout engine 105 may run as an application to determine the size and position of each partial area (container) and output drawing information to a printer driver (not shown). Accordingly, the printer driver may execute image drawing processing of a variable data document and generate print data. The user interface 103 allows a user to set the layout and attribute of each container and causes him/her to create a document template. In addition, the user interface 103 provides a mechanism to associate each container in the document template with a data source. The user interface 103 and layout engine 105 communicate with each other through a communication channel 123.

FIG. 1C is a view for explaining the outline of variable data print according to this embodiment. A plurality of containers 181 to 183 are laid out on a page in accordance with an operation instruction from the user through the user interface module 103 (to be referred to as the user interface 103 hereinafter) of the layout editing application 121. Then, constraints about the position and size are given to each container, thereby generating a document template 180. The user interface 103 also associates the document template 180 with a data source 190 and each container with a data field in the data source as indicated by dotted lines 191-193. The association information representing the association between each container and a data field in the data source 190 is described in the document template. The document template is stored in the HDD 140. The data source 190 is a file in which item data is described for each record. The data source 190 is stored in the HDD 140. In accordance with a print instruction or preview instruction from the user, the layout engine 105 reads out the data associated by the association information from the data source 190, inserts the data in the containers 181 to 183 of the document template for each record (for example, data fields A to C of data record 1 are inserted in the containers 181 to 183), and adjusts the size of each container in accordance with the inserted data (layout adjustment). When a preview instruction is input, a layout-adjusted document image is generated and output so that the image is displayed on the screen of the video display 144 as a preview. When a print instruction is input, a document image generated by using the layout engine 105 or printer driver is output to the print server 109 as print data. Variable data print is implemented by sequentially processing data records 1, 2, 3, . . .

The data source (190) for document generation may be, e.g., the general database 119 on a database server 117 formed by another computer which is making the database application run. In this case, the host computer 101 can acquire the data source by communicating with the database server 117 through the network 107. The document template (180) for variable data print, which is generated by the layout editing application 121, is stored in the host computer 101 or a file server 115 formed by another computer. As described above with reference to FIG. 1C, the layout engine 105 of the layout editing application 121 generates a variable data document containing a document template merged with data. The document is stored in the local file system of the host computer 101 or in the file server 115, or transmitted to and printed by a printer 113. The print server 109 is a computer to provide a network function to a printer which is not connected directly to the network. The print server 109 and printer 113 are connected through a general communication channel 111.

<Another System Arrangement>

Figure 2:
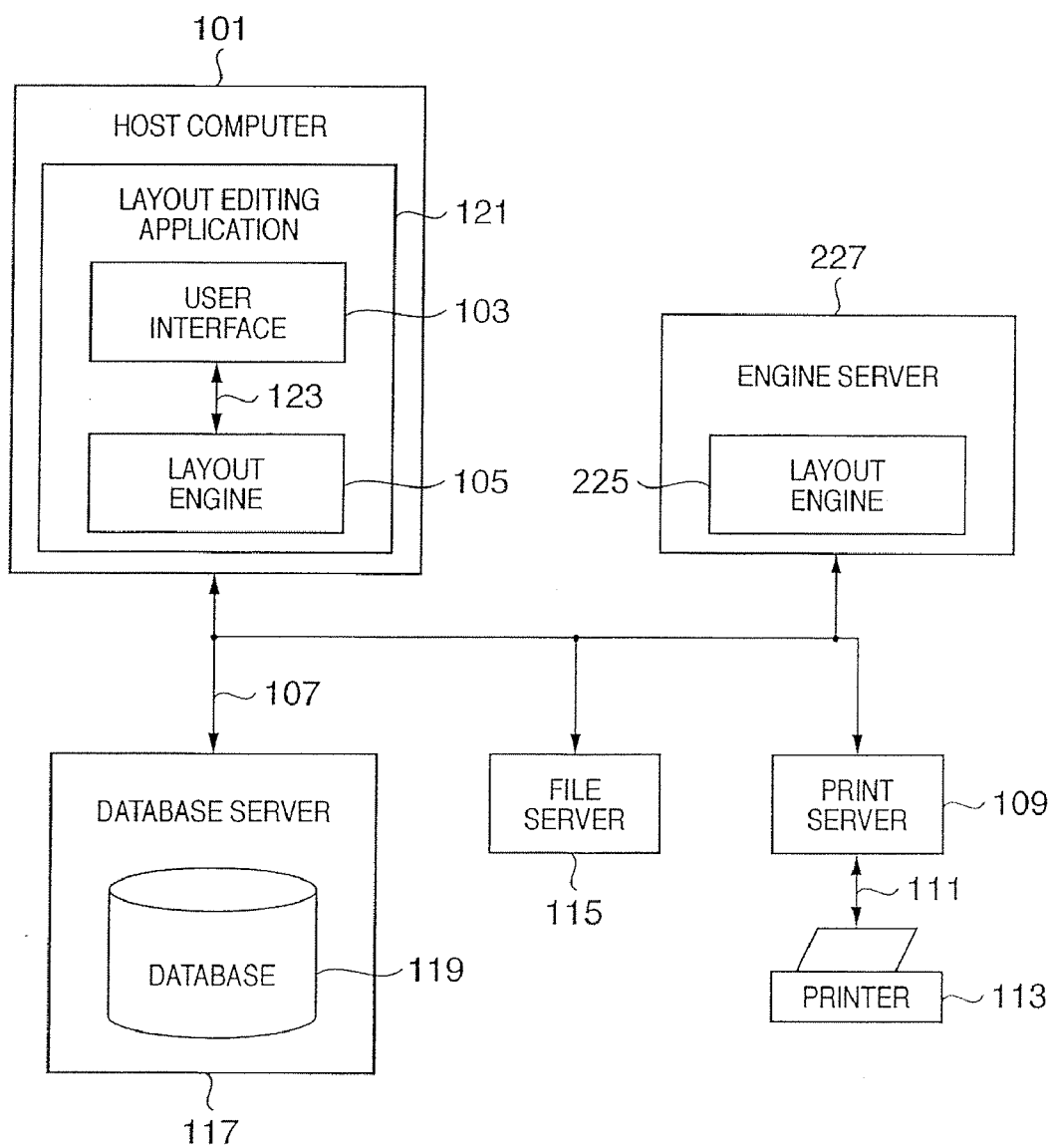
FIG. 2 is a block diagram showing another arrangement of the variable print system according to the embodiment.

FIG. 2 is a block diagram similar to FIG. 1A. An engine server 227 is added. A layout engine 225 stored in the engine server 227 is a separate version of the layout engine 105. As the engine server 227, a general computer is used. The layout engine 225 combines a document template stored in the file server 115 with data stored in the database 119 to generate a variable data document for printing or another purpose. This operation is requested through the user interface 103.

<Description of Layout Editing Application>

The layout editing application 121 will be described below.

[Main Window]

At the time of operation, the user interface 103 causes the video display 144 to display a user interface window formed by an application window 301 shown in FIG. 3. The window 301 has a menu bar 302, tool bar 303, work area 306, and optional palette 311. The menu bar 302 and tool bar 303 can be set in a non-display state or moved to various positions on the screen. The position of the work area 306 can be moved by operating the mouse 133. The palette 311 is an option. A cursor/pointer device 313 represents a position indicated by the mouse 133.

The menu bar 302 as a known technique has a number of menu items 304 extended under the layer of menu options.

The tool bar 303 has a number of tool buttons and widgets 305 which can be set in a non-display state or display state by a special mode of the application.

A ruler 308 is an option and is used to indicate the position of a pointer, page, line, margin guide, container, or object in the work area.

The palette 311 is used to access an additional function such as a variable data library. The palette 311 has a window control 312 to move, resize, or close it. The palette 311 can optionally be displayed on the foreground of the work area or hidden behind an object. The palette 311 can be displayed only within the application window 301 or can partially or wholly be displayed outside the application window 301.

User-selectable "buttons" as shown in FIG. 4 are laid out on the tool bar 303.

(1) Select tool button 403: This button is used for edge selection, movement, size change, resize, or lock/unlock of a container. A container is selected by dragging a select box around the container. When a plurality of containers are selected while keeping the CTRL key pressed, the plurality of containers can be selected.

(2) Text container tool button 404: This button is used to create a container having a static or variable text.

(3) Image container tool button 405: This button is used to create a container having a static or variable image.

(4) Link tool button 406: This button is used to create a link to associate containers with each other. This button is also used to control the distance of the link.

In the application window 301 of the layout editing application 121 shown in FIG. 3, when containers and links are laid out in a page, a basic layout can be determined. The basic layout is a layout as a base of variable data print. When containers in the basic layout are fixed containers, all record print results have the same layout. When containers in the basic layout are flexible containers, the size or position of each container varies within the constraint range (to be described later) in accordance with the amount or size of data inserted for each record. The document template created by the layout editing application 121 is strictly used to determine the basic layout. When a flexible container is included, the final layout of a printed product is adjusted in accordance with read data.

[Document Template]

Referring to FIG. 3, the work area 306 is used to display and edit the design of the document template (180: basic layout). The document template may simply be referred to a template. The outline of a document to be printed can be presented to the user in the process of causing him/her to design the document template. Accordingly, the user can easily understand how the document merged with the data source (190) changes on the basis of the amount and size of variable data.

When the data source is associated with the document template, a corresponding variable text or image is displayed in each container laid out so that a preview of the current document can be obtained.

In the document template creation mode, visual keys (e.g., frame lines of containers, anchors, sliders, and links) which express the document structure and variable data containers in the document template are always displayed. In the preview mode in which variable data are inserted, the visual keys are displayed when the cursor is moved onto a container, or a container is selected.

The work area 306 includes a scroll bar 307, the optional ruler 308, and a document template 309. The document template 309 can indicate the presence of a plurality of pages. The document template 309 indicates the document template 180 shown in FIG. 1C.

The page size of a given document template is designated by the user by using a known technique. For example, "Page Setup" is selected from "File" of the menu to display a dialogue to set the page size, on which the page size designated by the user is reflected. The actual number of pages of each document can change depending on the variable data in the associated data source. This is because when a field like a flexible table whose size is changed in accordance with the amount of variable data is set in the document template, and variable data which cannot be fitted in one page is read, an additional page is automatically created.

A border 310 shown in each page is an arbitrary page margin representing the maximum width of an object printable on the page.

FIG. 4 is a view showing examples of objects which can be displayed on the document template 309 of one page. The objects include containers 407 and 408, an arbitrarily applied anchor icon 409, fixed edges 411 and 414, an unfixed edge 410, a link 412, and sliders 413. The anchor icon 409 can be set at a corner or edge of the rectangle of a container or the center of a container. When the anchor icon 409 is set, the position of the set point is fixed. That is, in the example shown in FIG. 4, the anchor icon 409 is set at the upper left corner of the container 407. When variable data is inserted in the container 407, and the image size or text amount of the variable data is large, the container can be enlarged to the right and lower edges. When the anchor icon 409 is set on an edge, the edge is fixed. The container can be enlarged in the directions of the three remaining edges. When the anchor icon 409 is set at the center of a container, the central position of the container is fixed. The container can be enlarged in four directions without changing the central position of the rectangle of the container. The link 412 (to be described later in detail) indicates that the containers 407 and 408 are associated with each other. The link 412 indicates that the container 408 can be moved to the right while maintaining the length (the range can be designated) set for the link. The sliders 413 indicate that the container can be moved in parallel to the edges on which the sliders are set.

[Container]

A container will be described. A container is a space (called a partial area or data area) where a fixed or flexible text or image is inserted from a variable data file to the document template and drawn. A container is laid out together with other containers and objects, as shown in FIG. 4. Movement, size adjustment, and re-creation of the container are done by operating the mouse 133 on the basis of an operation instruction from the user through the user interface window. Data inserted in the container is called a content or contents data.

More exactly, the container has a set of settings, visual expression, interaction, and editing operation. The definition of a container according to this embodiment will be described below.

(1) A container has a fixed or flexible content. A flexible content can be regarded as dynamic because data acquired from the data source can change for each document, i.e., each record. In this embodiment, however, animated contents and contents which change over time by another method are not assumed as a flexible content because they are not suitable for printing. A fixed content is displayed in a similar manner in all documents generated by using containers. However, when a link is set between a fixed content and a flexible content, the fixed content may be affected by the flexible content and change its position in each document.

(2) A container has ornament functions like text settings such as a background color, border, and font style applied to a content. This setting is called a container attribute. The container attribute can be set for each container. The setting can also be done such that a container has the same container attribute as another container.

(3) A container is merged with data from the data source in generating a document. The ornament function can visually be recognized on a printed output product for all fixed contents. A flexible content provides display of specific data from the data source. This expression of the container can be, e.g., printed or displayed on the screen of the video display 144, or subjected to both printing and display.

(4) A container has a user interface as a visual key, as shown in FIG. 4. A container has, e.g., an interactive graphical user interface (GUI) to edit the container or set display. Each element of the GUI is displayed on the screen of the video display 144 but not printed in the document. The user interface 103 of the layout editing application 121 has a function of displaying some of the ornament functions of a container such as the background color and font and allowing editing and display of settings of the container.

[Constraints of Container]

Each container has constraints about control for the manner contents displayed by the respective documents are combined. These constraints (including combining a fixed or flexible content with a container) are used as a principal method of causing the user to control the generations of a number of documents from one document template. An example of the constraint is "the maximum height of the content of this container is 4 inches". Another example of the constraint is "the left edge of the content of the container must be displayed at the same horizontal position in each document". The contents described here indicate various methods of displaying and editing such constraints by using the GUI.

A contents place holder which designates the layout of a fixed content like an image having a defined place on a page is well-known in the digital print technique. Each container has a position and size. The containers are edited and displayed by a method as a known technique. The following description will be made with a focus on display and editing in a method specialized to variable data print.

When containers are used, the user can designate the sizes (drawing sizes) and positions of contents in a document. Since many kinds of documents are generated from one document template, a number of possibilities and constraints are set for the containers. To set (designate) and display them, a predetermined user interface is used.

The edges of one container define the virtual border of an associated content displayed in the document. Hence, discussion about the left edge of a container is equivalent to discussion about the leftmost edge of an area where an associated content can be displayed in each document. Similarly, discussion about the height of a container can be understood as discussion about the constraint of the height of an associated content in the generated document. In this specification, they are clearly distinguished in discussing the edge or size of a container by referring to the user interface 103.

In the following description, the term "fixed", which defines a certain value used to restrict display of a content, applies to all documents in the same way.

(1) When the width of a container is fixed, the width to be assigned to an associated content is the same in all documents.

(2) When the height of a container is fixed, the height to be assigned to an associated content is the same in all documents.

(3) When a distance (link length) is fixed, the designated distance is a constraint in all documents.

(4) When the left and right edges of a container are fixed, the horizontal positions of edges related to the page are the same in all documents. However, the height or vertical position of the container can change. For example, when the left edge of a container is fixed, the left edge of an associated content is displayed at the same horizontal position in all documents. However, the content may be displayed on the upper edge of the page in a document and on the lower edge of the page in another document.

(5) When the upper and lower edges of a container are fixed, the vertical positions of edges in the page are the same in all documents. However, the width or horizontal position of the container can change for each document.

(6) The vertical axis of a container is a virtual vertical line which is parallel to the right and left edges of the container and is located at the intermediate position therebetween. When the vertical axis of the container is fixed, the average of the horizontal positions of the left and right edges of the container (i.e., the central position between the left and right edges) is the same in all documents. In this constraint, the width of the container can change. However, the vertical axis is located at the same horizontal position in all of documents independently of whether the left and right edges are nearest to or farthest from the vertical axis. Note that the height and vertical position of the container are not affected by this constraint.

(7) Similarly, when the horizontal axis is fixed, the average of the upper and lower edges of a container is located at the same vertical position. However, the width and horizontal position of the container are not affected by this constraint.

(8) When both the horizontal axis and the vertical axis are fixed, the central position of the container is fixed. However, the width and height of the container are not affected by this constraint.

(9) When the angular position of a container, the intermediate position of an edge of a container, or the central position of a container is fixed, the position is the same in all documents. For example, when the upper left corner of a container is fixed, the upper left position of the container laid out is the same in all documents.

(10) The vertical edges or vertical axis can be fixed in association with the left or right edge of the page, left or right page margin, or another horizontal position. Similarly, the horizontal edges or horizontal axis can be fixed in association with the upper or lower edge of the page, upper or lower page margin, or another vertical position.

A term opposite to "fixed" is "flexible" which indicates that an edge, axis, corner, or intermediate position of a container or a document constraint can change between documents (between records). For example, in a page, the layout is expected to dynamically change depending on the size or amount of variable data. However, the user may want that the size or position of a specific container is fixed, or the four corners of a container at a corner of the page is fixed. For this purpose, the layout editing application 121 can appropriately set, for each container (partial area), whether to fix or change an edge, axis, corner, or intermediate position. Hence, the user can create a desired basic layout in determining the basic layout of the document template 180.

[Display/Editing of Container]

—Method of Creating New Container—

Containers are described in two types, i.e., text container and image container. A text container has a text and an embedded image. An image container has only an image.

As shown in FIG. 4, a new text container or image container is created on the document template 309 by clicking the mouse 133 on the text container tool 404 or image container tool 405 and dragging a rectangle on the document template 309.

Alternatively, a container may be created by activating the appropriate tool 404 or 405 and simply clicking the mouse on the document template 309. In this case, a container having a default size is inserted on the template in accordance with the click operation of the mouse 133. In addition, a dialogue box or prompt to set the size of the new container is provided. The container size can be set by various methods. For example, the size may be defined automatically in advance, or a container may be created and laid out by a calculated schema. When the generated container is selected by an input means such as the mouse, and its properties are displayed by clicking on the right button of the mouse, the container property dialogue is displayed so that constraints for the container can be set. In the container property dialogue UI (corresponding to a partial area setting means), various kinds of constraints described above can be set. In the container property dialogue, the size (width and height) and position of the container can be set. To set a flexible size, the basic pattern (basic size and reference position) of the container is set. In addition, the maximum container size (width and height) and the minimum container size (width and height) can be set.

[Container Display Method]

FIGS. 5A to 5D show display rules about the edges of a container.

To express the state of an edge of a container, the application 121 expresses an edge by using a solid line (item 503) or a dotted line (504). In addition, the application 121 uses anchors (line, shape, and icon indicated by 506, 507, and 509 drawn near the edges), handles (control points 502 drawn on or near the edges of the area for movement and correction), sliders (short parallel lines drawn on both sides of an edge, 413 in FIG. 4), enlarge/reduce icons (505), and colors.

The rules of the container display method shown in FIGS. 5A to 5D are as follows.

(1) To fix an edge, it is drawn by a solid line.

(2) When the width is fixed, the left and right edges are drawn by solid lines.

(3) When the height is fixed, the upper and lower edges are drawn by solid lines.

(4) The axes are not drawn.

(5) Enlarge/reduce icons are drawn near each of edges which are not drawn according to the rules (1) to (3). The edges are drawn by dotted lines.

(6) When the pair of vertical and horizontal edges or the pair of vertical axis and horizontal axis are fixed, an anchor is drawn at the intersection between them.

(7) When no anchor is drawn anywhere on a fixed edge, a slider is drawn at the center of the edge.

(8) When neither anchor nor slider is drawn for the pair of vertical and horizontal edges or the pair of vertical axis and horizontal axis, a handle is drawn at the intersection between them.

The lines defined by the rules (1), (2), and (3) are fixed or restricted, as described above, and drawn by solid lines. Flexible edges defined by the rule (5) are drawn by dotted lines. Fixed points defined by the rules (6), (7), and (8) represent anchors. Some fixed edges represent sliders. Remaining points represent handles.

In the above-described rules, higher priority is given to a constraint set by the user later. That is, when another constraint is set later, and it can affect edges which should be drawn in accordance with the above-described rules, the drawing contents of solid line or dotted lines are changed.

The location where a flexible edge is drawn depends on the content of the container. As will be described later, "dynamic calibration processing" is used, which indicates that a content is merged with a document template and made visible by the user interface. Alternative execution can be used by another means for determining the layout position of a flexible edge in the user interface or the content area of the container averaged in all documents.

These content expressions provide a graphical means for displaying the state of each edge of a container. The expressions can be interpreted in the following way.

(1) A dotted line indicates that the position of the edge in the document changes depending on the content of the container, like the edge 410 shown in FIG. 4.

(2) A solid line indicates that the edge is restricted because it is fixed (edge 414), or the width or height of the container is fixed (in the container 408, the four edges are indicated by solid lines so that both the width and height are fixed).

(3) An anchor indicates that the point where edges or axes cross is fixed. Hence, the anchor point appears at the horizontal and vertical positions in all documents. The anchor is fixed, as a matter of course. The icon 409 in FIG. 4 is an example of an anchor icon which indicates that the position at which the edges 414 cross is fixed.

(4) A slider indicates that the associated edge can be translated although it has a fixed length. For example, the sliders 413 in FIG. 4 indicate the content of the container 408 may be displayed on the left or right edge of a position represented by a specific diagram in the document. For example, when the image size or text amount of data inserted in the container 407 associated with the container 408 (a link is set between the containers) is small, the size of the container 407 becomes small. For this reason, the container 408 is slid (translated) to the left and laid out. When the size of the container 407 becomes large, the container 408 is slid conversely to the right and laid out.

Some or all of these icons and edges are drawn or not drawn depending on which tool or which container is selected/highlighted or activated. Generally, the container edges and icons are not drawn on a printed product because they are assistant tools for designing the document template.

As described above, settings for the basic pattern including the basic values, minimum values, and maximum values of the width and height of a container are displayed in a secondary dialogue window.

Figure 5A:
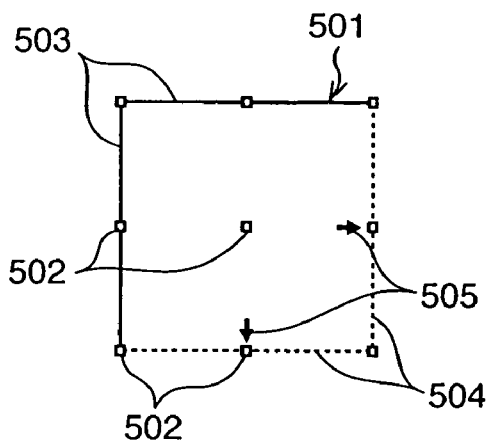
FIGS. 5A to 5D are views for explaining container rules according to the embodiment.

Referring to FIG. 5A, in a container 501, neither the width nor height is fixed (flexible). The fixed edges 503 are expressed by solid lines. The flexible edges 504 are expressed by dotted lines. The enlarge/reduce icons 505 represent the adjacent edges 504 are flexible. An indicator in another form may be used instead or additionally.

Figure 5B:
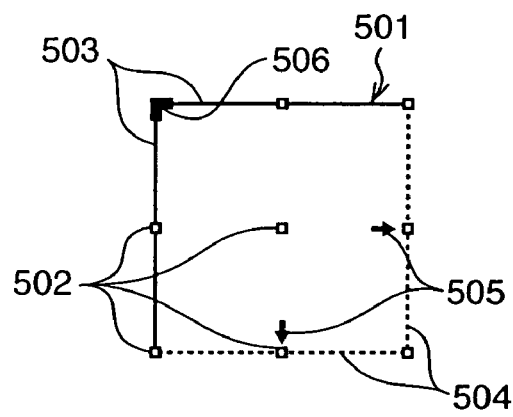

Referring to FIG. 5B, in the container 501, both the width and height are flexible. The anchor icon 506 is added to explicitly represent that the position of the corner at which the edges 503 cross is fixed.

Figure 5C:
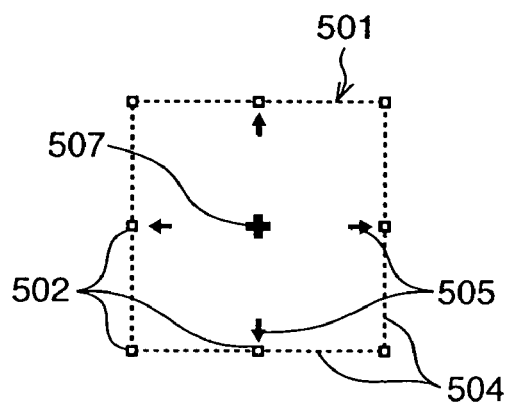

Referring to FIG. 5C, in the container 501, both the width and height are flexible. In this state, the container can extend equally from the central point indicated by the arbitrary anchor icon 507. That is, the container 501 can be enlarged or reduced about the anchor icon 507. In enlargement/reduction, the layout is adjusted such that the anchor icon 507 is always located at the central point of the container 501.

Figure 5D:
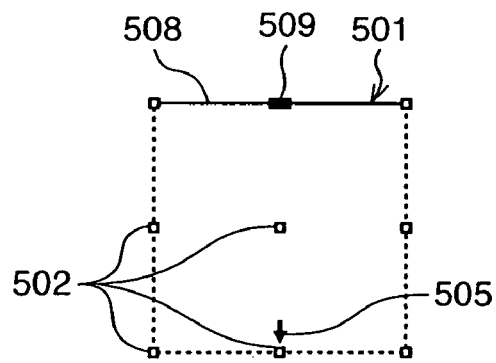

Referring to FIG. 5D, although an upper edge 508 of the container 501 is fixed, both the width and height are flexible. The anchor icon 509 located at the center of the upper edge

508 is fixed. The left and right edges (502) of the container 501 enlarge or reduce the container about the central axis (vertical axis) extending perpendicularly through the anchor icon 509.

[Link]

A link indicates the association between a container and another container. The association indicates the distance between the containers. The layout of containers associated by a link is calculated in consideration of the influence of their layout change. Reference numeral 412 in FIG. 4 denotes a link which associates the containers 407 and 408 in FIG. 4. The link setting method and the layout calculation method of containers associated by a link will be described later.

[Link Setting Method]

Figure 6:
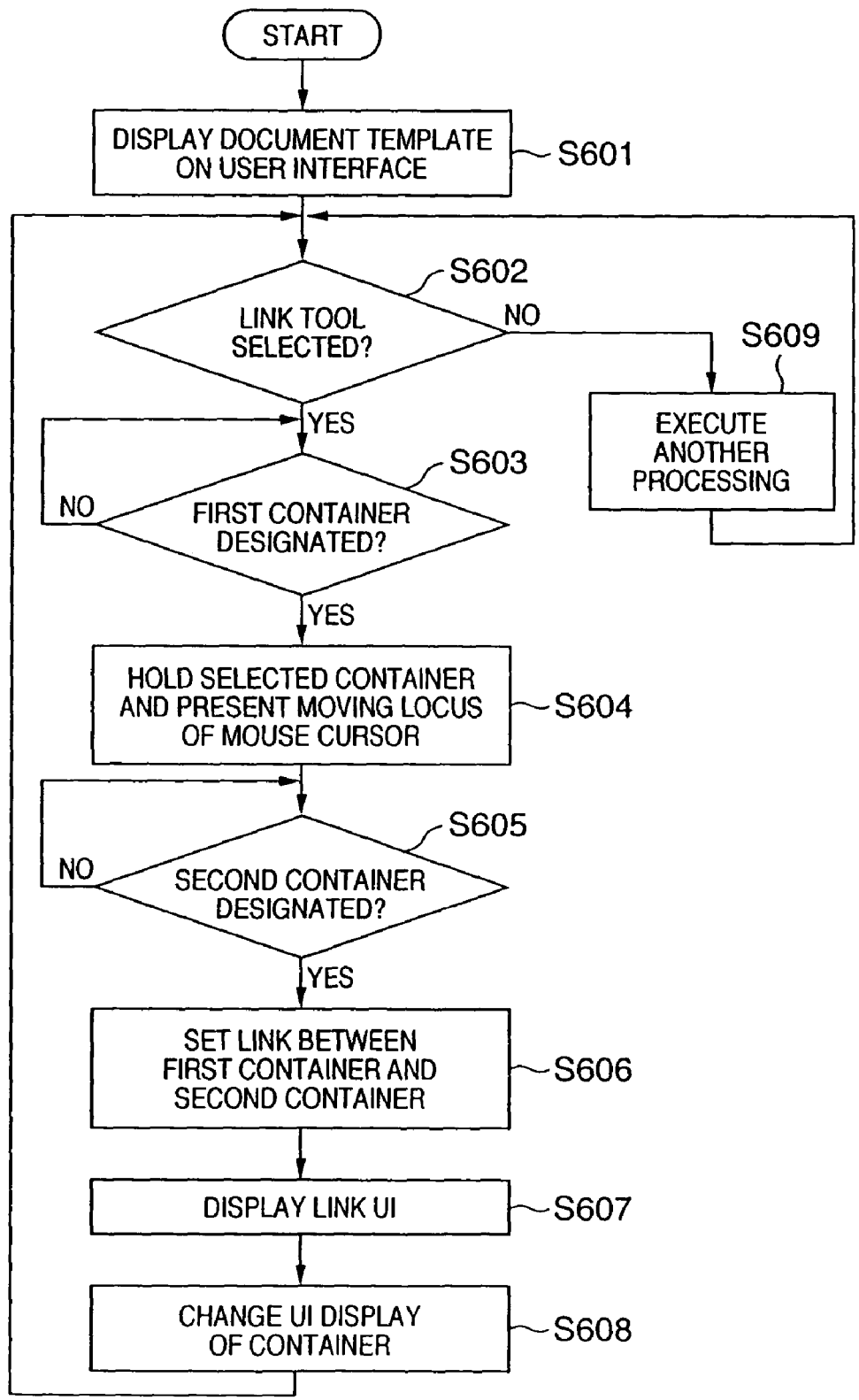
FIG. 6 is a flowchart for explaining link creation processing according to the embodiment.
Figure 7A:
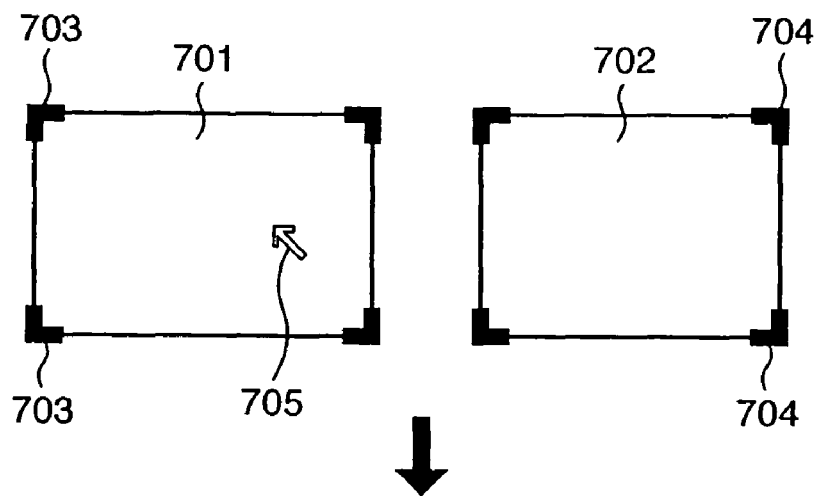
FIGS. 7A to 7C are views showing an example of transition of the user interface in creating a link.
Figure 7B:
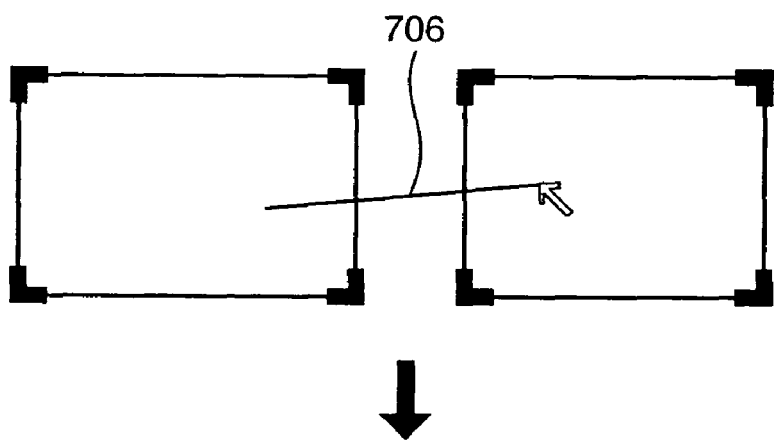
Figure 7C:
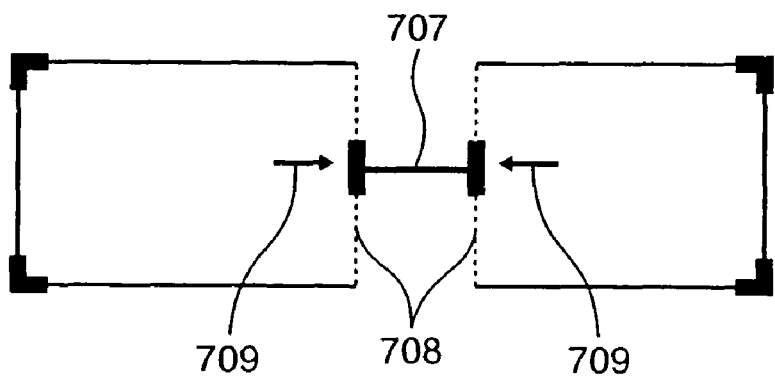

Setting of a link to associate containers with each other will be described next. FIG. 6 is a flowchart showing the link setting method. FIGS. 7A to 7C show an example of transition of the user interface (UI) in setting a link. A method of setting a link between containers will be described with reference to FIGS. 6 and 7A to 7C.

First, in step S601, the layout editing application 121 displays a document template selected for editing on the work area 306 of the user interface window. To set a link, containers (at least two containers) to set a link must be created on the document template. FIGS. 7A to 7C show an example of transition of the user interface when two containers are created in step S601, and a link is set.

In step S602, the layout editing application 121 determines whether the above-described link tool is set in a selected state (a selected state is set by clicking on the button 406 shown in FIG. 4). If NO in step S602, another processing is executed as needed (step S609), and the flow returns to step S602.

Referring to FIG. 7A, containers 701 and 702 have only fixed edges. Reference numerals 703 and 704 denote anchors, like the anchor 409 in FIG. 4; and 705, a mouse pointer. When the link tool is in the selected state, the user clicks on one (container 701) of the two containers, for which a link is to be set, to select the container. In accordance with this operation, the user interface 103 of the layout editing application 121 recognizes that the first container is designated (step S603) and holds information to specify the selected container. In addition, a locus corresponding to further movement of the mouse cursor is displayed on the screen (step S604). For example, a line segment 706 shown in FIG. 7B indicates a line which connects the click point in the state shown in FIG. 7A and the current position of the mouse cursor. With this UI, the position where a link is to be set can explicitly be presented to the user.

Next, as shown in FIG. 7B, the user moves the mouse pointer to the other container (container 702) and clicks on it. In accordance with this operation, the user interface 103 recognizes that the second container is designated (step S605). The layout editing application 121 sets a link between the first container held in step S604 and the second container recognized in step S605 as a designated container (step S606).

When the link is set between the two containers 701 and 702 selected by the user, a link UI 707 is displayed (step S607). In addition, when the link is set, the display state of the containers changes to that shown in FIG. 7C (step S608). That is, when the link is set, the UI of the containers is automatically changed. In this case, the edges associated with each other by the link change to flexible edges and are indicated by dotted lines. Referring to FIG. 7C, edges 708 are indicated by dotted lines. That is, the edges 708 are flexible edges, as described above.

The state of the edges of the containers is automatically changed, as shown in FIG. 7C, because the containers must have flexible edges due to link setting. This aims at preventing any contradiction which may occur when all edges are fixed even after link setting. Marks 709 visually show the user the directions in which the containers can change due to link setting, like the icons 505 shown in FIGS. 5A to 5D. In the example shown in FIG. 7C, the right edge of the left container and the left edge of the right container change to flexible edges. This is merely an example. For example, the right container may change to setting with the sliders 413 in FIG. 4.

<Layout Calculation Processing by Layout Engine>

[Layout Calculation Method (Overall Flow)]

The layout editing application of this embodiment has a layout mode in which containers are created by using the user interface 103, and a layout is created by associating the containers with each other (link setting), and a preview mode in which each record of a data source is inserted in the created layout by the layout engine 105, and the layout result after actual record insertion is previewed. In the preview mode, actual records are inserted, and a layout is calculated in accordance with the above-described priority order. In the preview mode, however, the layout for display is calculated. Even in actual printing, the layout is calculated by causing the layout engine 105 to insert data in each container. The calculation method at this time is the same as in the preview mode.

Figure 8:
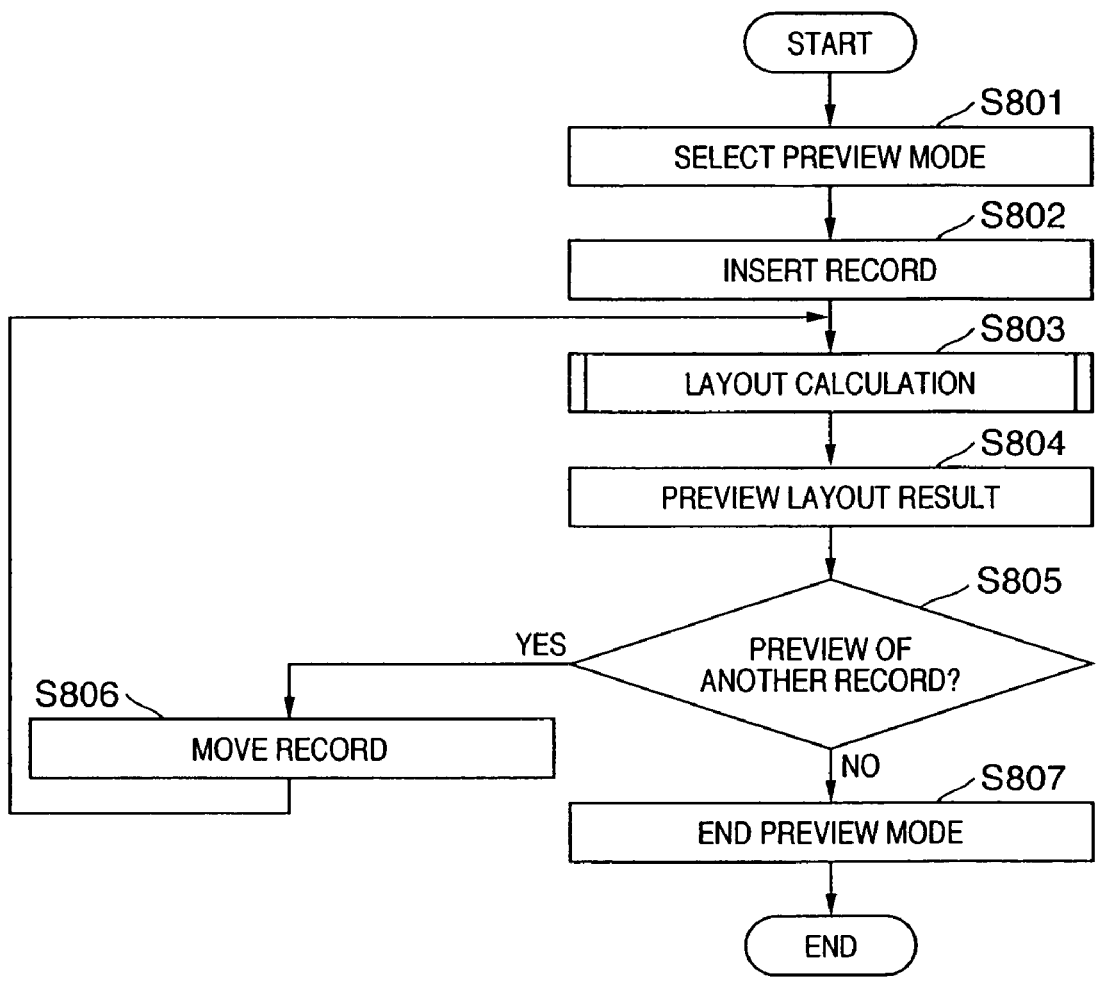
FIG. 8 is a flowchart showing layout calculation processing by a layout engine according to the embodiment.

FIG. 8 shows the flow of layout calculation. First, the preview mode is selected (step S801). In the preview mode, the layout editing application 121 causes the user to select a record to be previewed from the data source and determines to insert each field data of the selected record in each container (step S802). When insertion of the field data in each container is determined, the layout editing application 121 executes calculation to lay out the record and executes layout adjustment as needed (step S803). The layout calculation in step S803 will be described later in detail. The layout editing application 121 displays the layout calculated in step S803 (step S804). The layout editing application 121 determines in accordance with a user instruction whether to preview another record (step S805). If NO in step S805, the preview mode is ended (step S807). If YES in step S805, the layout editing application 121 selects another record, executes layout calculation again, and previews the layout (step S806).

When not the preview mode but the print mode is set, layout calculation is done sequentially for all records to be printed. Hence, step S804 is omitted. In step S805, it is determined whether all records to be printed are processed. The layout calculation result in step S803 is output, and print data is generated by using the printer driver and output to the printer. In this case, when print data output is ended for all records (all records designated for printing), the processing is ended.

[Layout Calculation Method (Details)]

Figure 9:
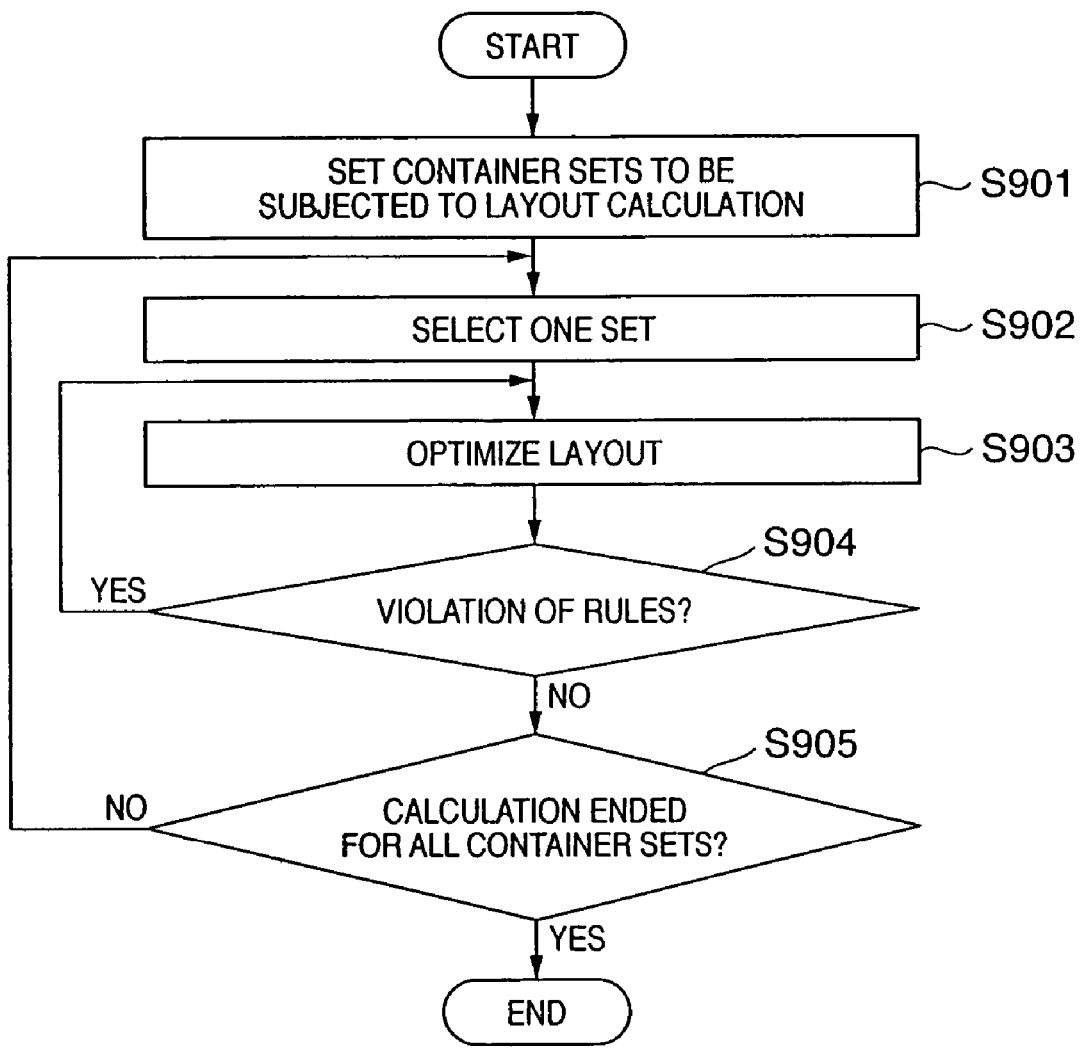
FIG. 9 is a flowchart showing layout calculation processing by the layout engine according to the embodiment.
Figure 10A:
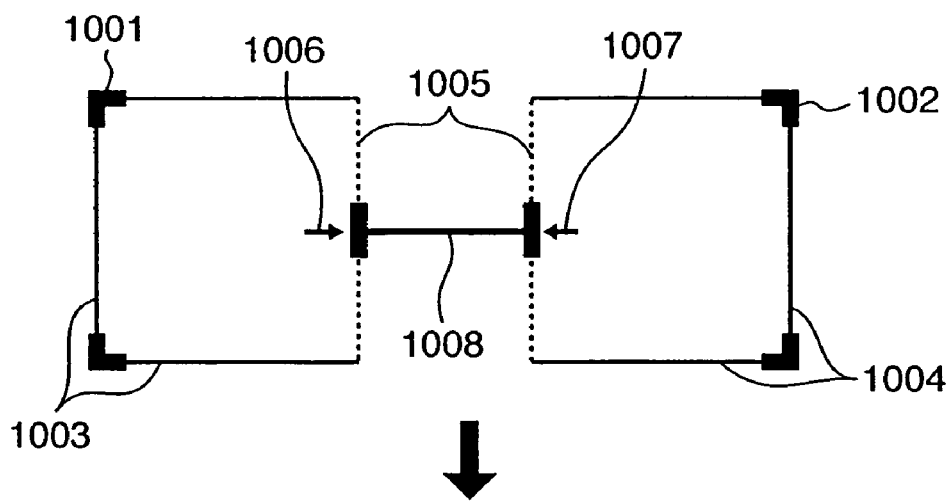
FIGS. 10A to 10C are views for explaining layout calculation processing according to the embodiment.
Figure 10B:
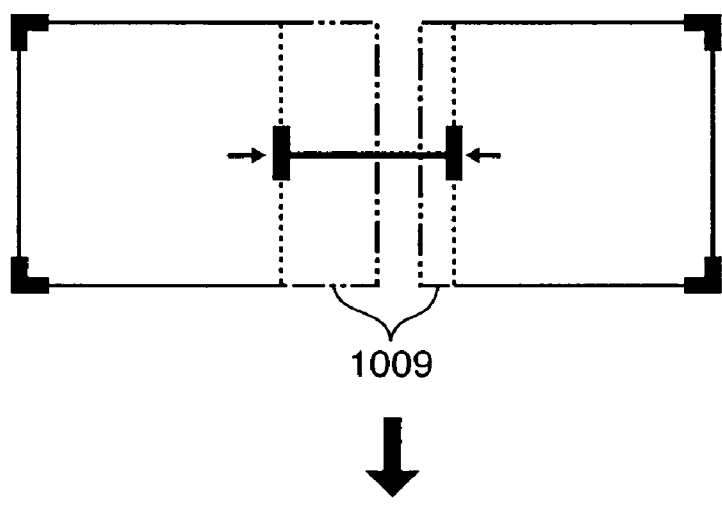
Figure 10C:
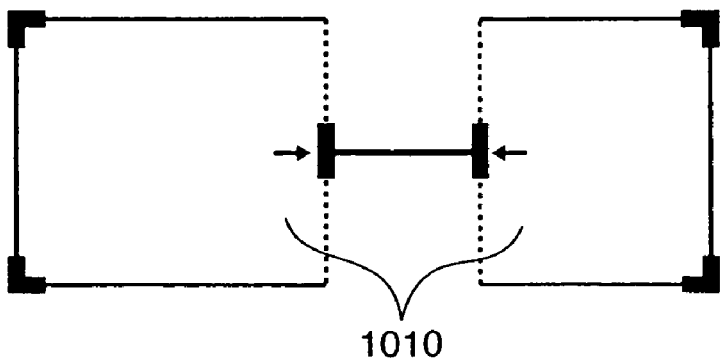

The layout calculation in step S803 will be described next in detail. FIG. 9 is a flowchart showing a layout calculation method when the layout priority order of this embodiment is not set. FIGS. 10A to 10C are views showing an example of the UI display at this time. FIG. 9 is a flowchart for explaining only the layout calculation processing method. This corresponds to the layout calculation method in printing/previewing one record of variable data print. When a plurality of records are present, the following processing is repeated.

Figure 11:
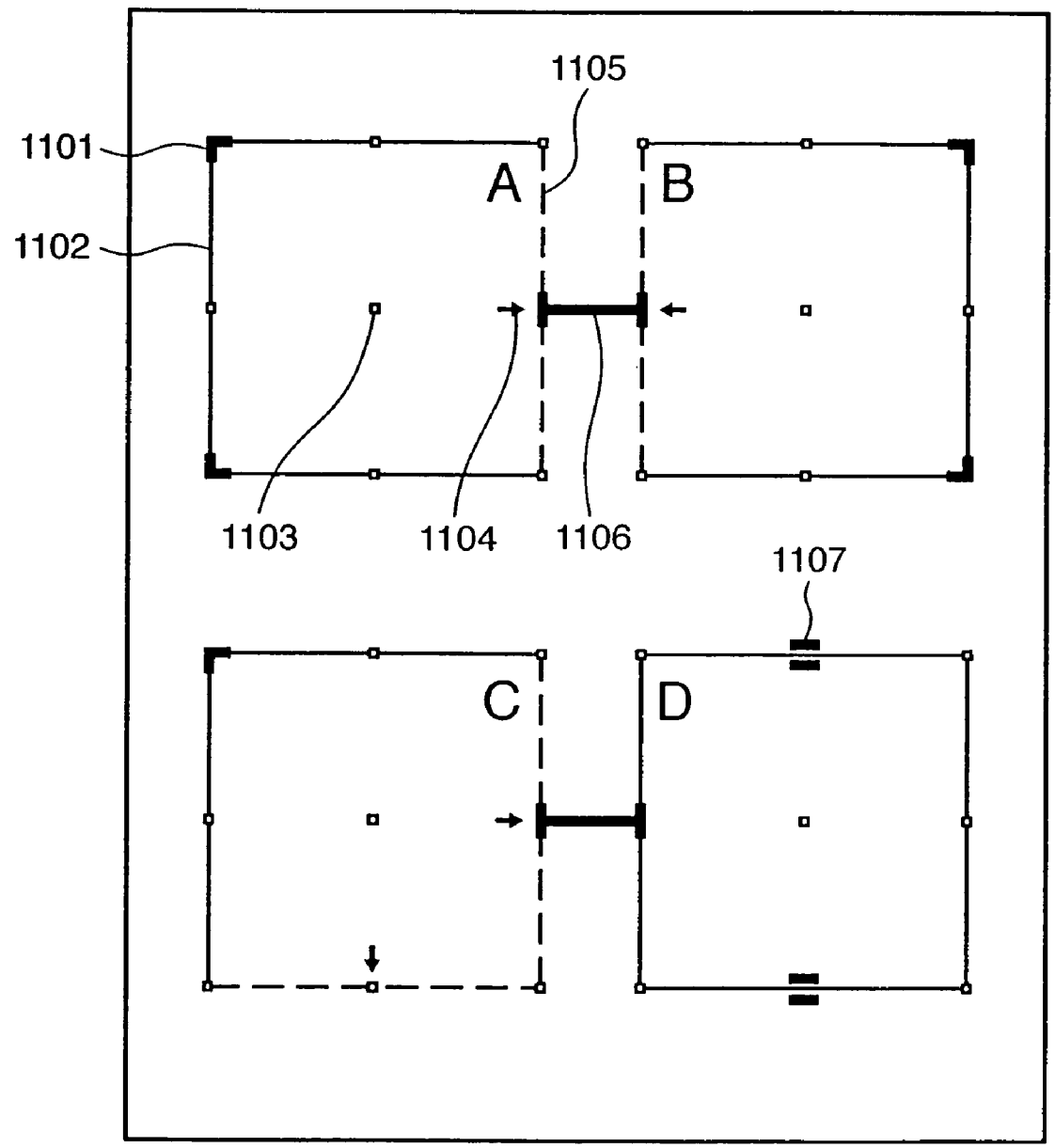
FIG. 11 is a view for explaining a set of containers in layout calculation according to the embodiment.

First, the layout editing application 121 obtains a set of containers whose layout should be calculated (step S901). Layout calculation is executed for a set of associated containers. Referring to, e.g., FIG. 11, four containers are laid out on a page and associated with each other. In this case, containers A and B are associated by a link, and containers C and D are also associated by a link. Hence, the containers A and B form set 1, and containers C and D form set 2. That is, a group of containers connected by a link is specified as a set. As described above, reference numeral 1101 denotes an anchor; 1102, a fixed edge; 1103, a controller; 1104, an arrow which indicates the change direction of a flexible edge; 1105, a flexible edge; 1106, a link; and 1107, a slider.

The layout editing application 121 selects a set as a layout calculation target from the container sets obtained in step S901 (step S902). For the selected container set, layout calculation is executed. First, the sizes of the two containers (A and B) as flexible elements included in the selected container set are calculated assuming that the containers are not affected by the image size or text amount of data to be inserted. More specifically, the layout editing application 121 determines whether the container A is an image data container or text container. This determination can be done on the basis of the attribute set for the container, as described above. Next, the layout editing application 121 reads out the data to be inserted in the container A. When the container A is an image data container, the size (the number of horizontal pixels, the number of vertical pixels, and the resolution) of the image data is defined as the size of the container A without any constraint. When the container A is a text container, the amount of data to be inserted in the container A can be calculated on the basis of the number of characters of text data and the character attribute such as a font type, font size, character pitch, and line pitch designated by the container attribute of the container A. For the text container, a constraint is applied because the aspect ratio of the container A cannot be determined without considering a constraint. In the example shown in FIG. 11, since anchors are set at the upper left and lower left corners of the container A, the height (vertical direction) is fixed. Hence, the layout editing application 121 determines whether characters corresponding to the calculated data amount (text amount) can be inserted in the container A having the width (horizontal direction) set as the basic pattern of the container A. If it is determined that all characters can be inserted, the size (width and height) set by the basic pattern does not change in the container A. If it is determined that not all characters can be inserted, the container A expands in the horizontal direction because the height is fixed by setting the anchors. In this case, the layout editing application 121 calculates the width of the container A, which allows insertion of characters in the calculated amount, thereby calculating the size of the container A.

Next, the layout editing application 121 optimizes the layout such that the difference between the size of each container to be laid out and the actual contents size becomes as small as possible (step S903). The layout is optimized such that the difference between the size of the content to be inserted and the size of layout becomes as equal as possible between the containers associated with each other to dynamically change their sizes. The layout editing application 121 obtains the size of the container set selected in step S902, i.e., the total size of the container A, container B, and link 1106 (a fixed link in this case). Then, the layout editing application 121 calculates the difference between the total size and the size of the container set in the basic layout (in the example shown in FIG. 11, the size of the container set corresponds to the distance between the anchor icons of the containers A and B). If the width of the container A or B is increased by the calculation in the preceding step, a difference value is generated. The layout editing application 121 equally distributes the difference value to the elements of the container set, thereby adjusting the layout.

The layout editing application 121 optimizes the layout. If a violation of rules has occurred, calculation is executed again to prevent any violation of rules (step S904). The rules described here are constraints set by the user in creating the layout. Examples of the constraints are a constraint on the container size change range or container position, and for a flexible link, a constraint on the change in link length. When the layout is calculated without any violation of rules, the layout of the set is completed. The processing in steps S902 to S904 is executed for all sets on the page. With the processing, the layout editing application 121 calculates the layout of the entire page (step S905).

FIGS. 10A to 10C show a UI example in laying out containers without setting the priority order.

FIG. 10A shows a state in which records are inserted, and the layout is determined. Reference numerals 1001 and 1002 denote anchors; 1003 and 1004, fixed edges; 1005, a flexible edge; 1006, an arrow which indicates the change direction of a flexible edge; and 1008, a link. In this state, the records are changed, and contents having different sizes are inserted. Referring to FIG. 10B, the sizes of the new contents are superimposed on the state shown in FIG. 10A. Reference numeral 1009 denotes a size of the content to be inserted in each container. Layout calculation is executed. FIG. 10C shows the result of layout calculation. The sizes of the containers are calculated such that they have the same difference to the size of the content to be actually inserted, and no violation of the above-described rules occurs. As shown in FIG. 10C, the contents size (1009) to be inserted shown in FIG. 10B and a contents size (1010) after calculation have the same difference to the reference container size.

[Setting of Link with Flexible Length]

Figure 12:
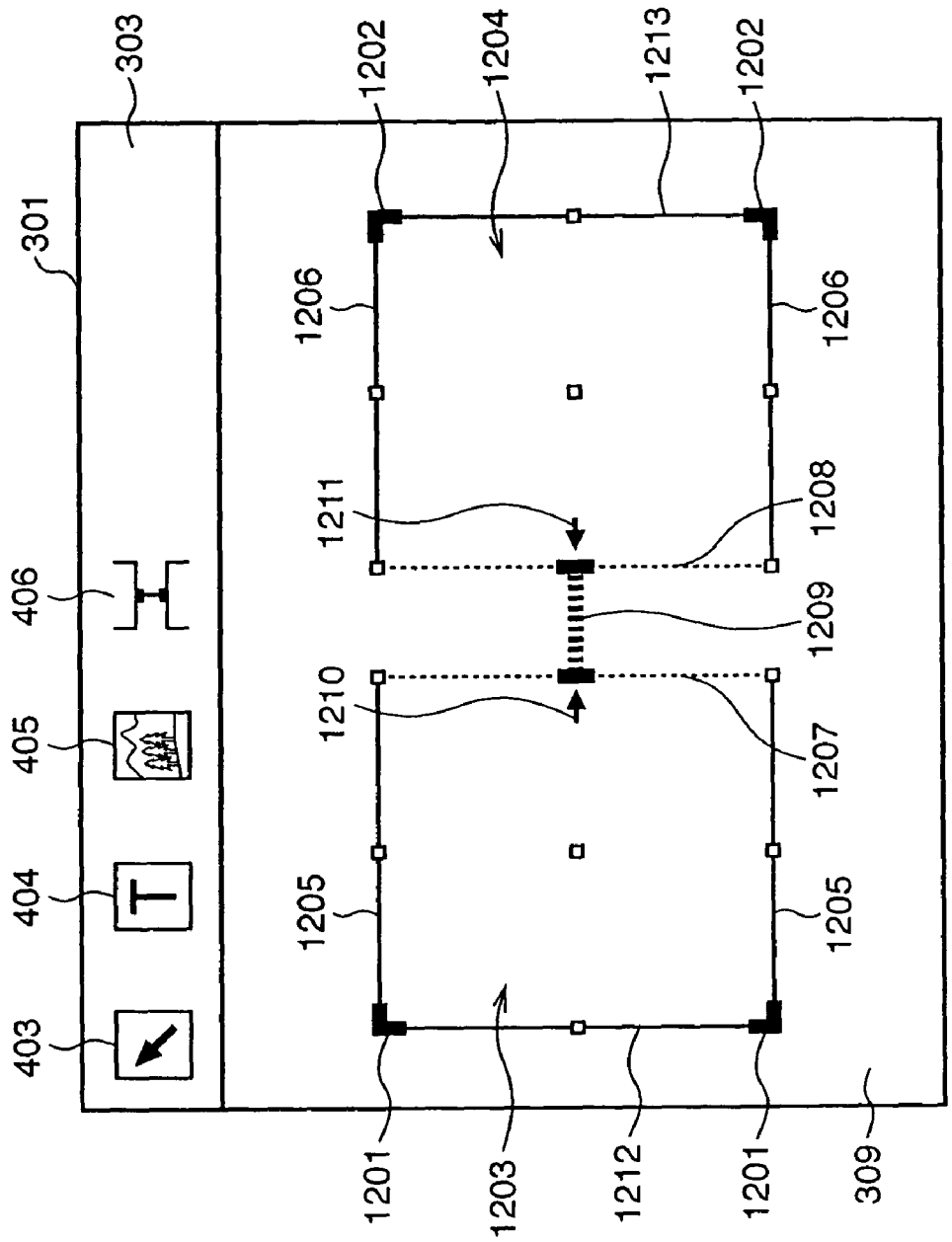
FIG. 12 is a view showing a display example in the user interface when containers are laid out by a flexible link.

FIG. 12 shows a user interface to set a flexible link. As in FIG. 4, the user interface has the application window 301 and tool bar 303. In the state shown in FIG. 12, containers 1203 and 1204 are present on the document template 309. The containers include anchor icons 1201 and 1202 and fixed edges 1205 and 1206. A link 1209 having a flexible size is set between the containers 1203 and 1204 to connect them. Since the link is set between the containers 1203 and 1204, a right edge 1207 of the container 1203 and a left edge 1208 of the container 1204 are expressed by dotted lines. Hence, indicators 1210 and 1211 are displayed in the containers to indicate that the edges 1207 and 1208 are flexible.

Figure 14:
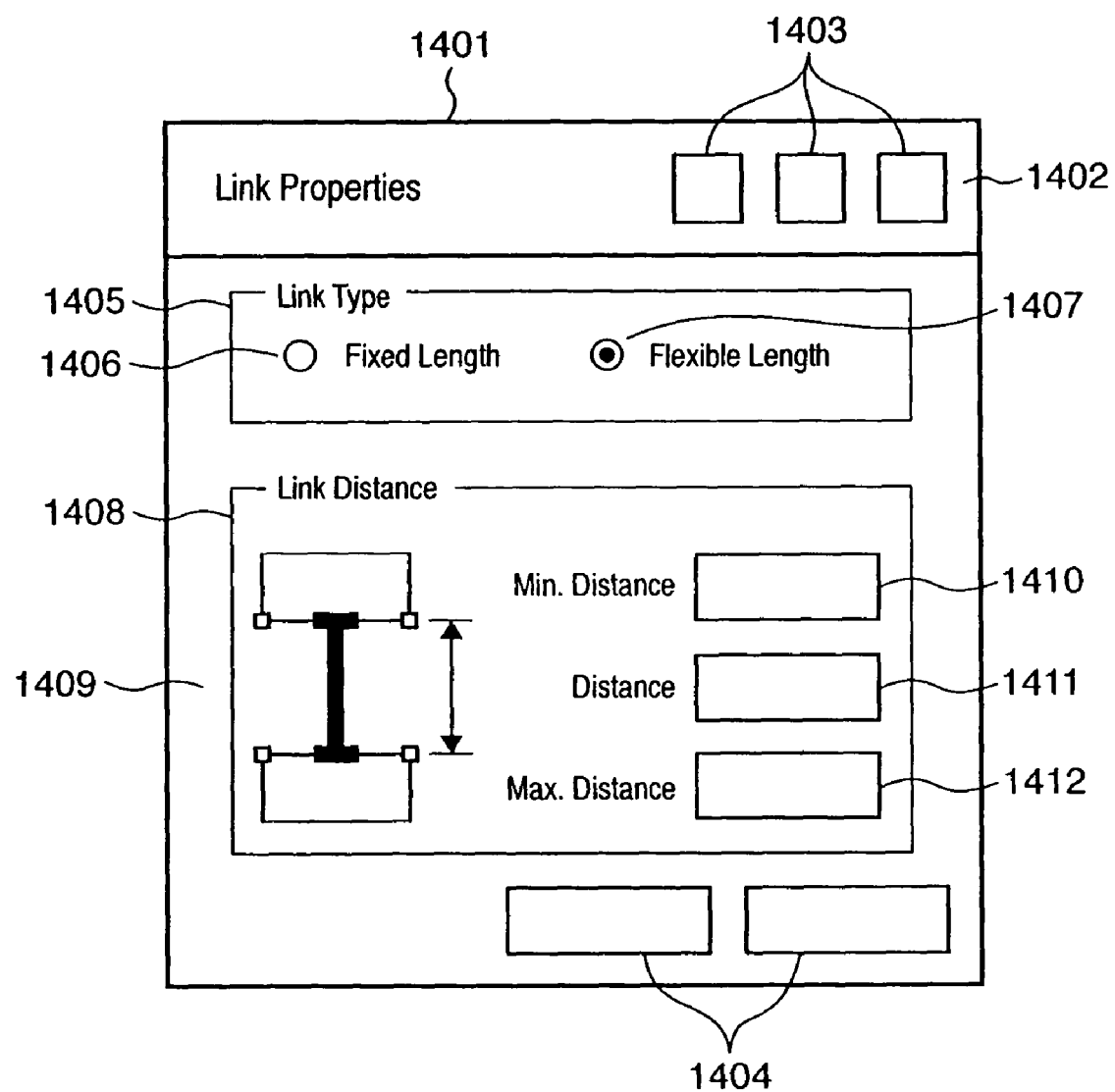
FIG. 14 is a view showing a link setting dialogue window according to the embodiment.

FIG. 14 shows a user interface window in the link setting means. FIG. 14 shows an example of a dialogue window 1401 to set the information of the link 1209. This dialogue includes a title bar 1402, a tool button 1403, a button 1404 to open/close the dialogue window, and an area 1409 to set various kinds of information. In this dialogue window, the link type can alternatively be selected from a flexible length (1407) and a fixed length (1406). When the link type is "flexible", the minimum value (Min. Distance 1410), maximum value (Max. Distance 1412), and reference value (Distance 1411) of the link length can be set. The dialogue 1401 shown in FIG. 14 is displayed when a link is set between two containers by the link setting operation described with reference to FIGS. 6 and 7A to 7C, and the set link is selected by, e.g., a click operation. Alternatively, immediately after a link is set, the dialogue window 1401 related to the link may be displayed automatically. The reference value 1411 of the distance between the containers indicates a link length used when the size of each container does not change at the time of data insertion.

Figure 13:
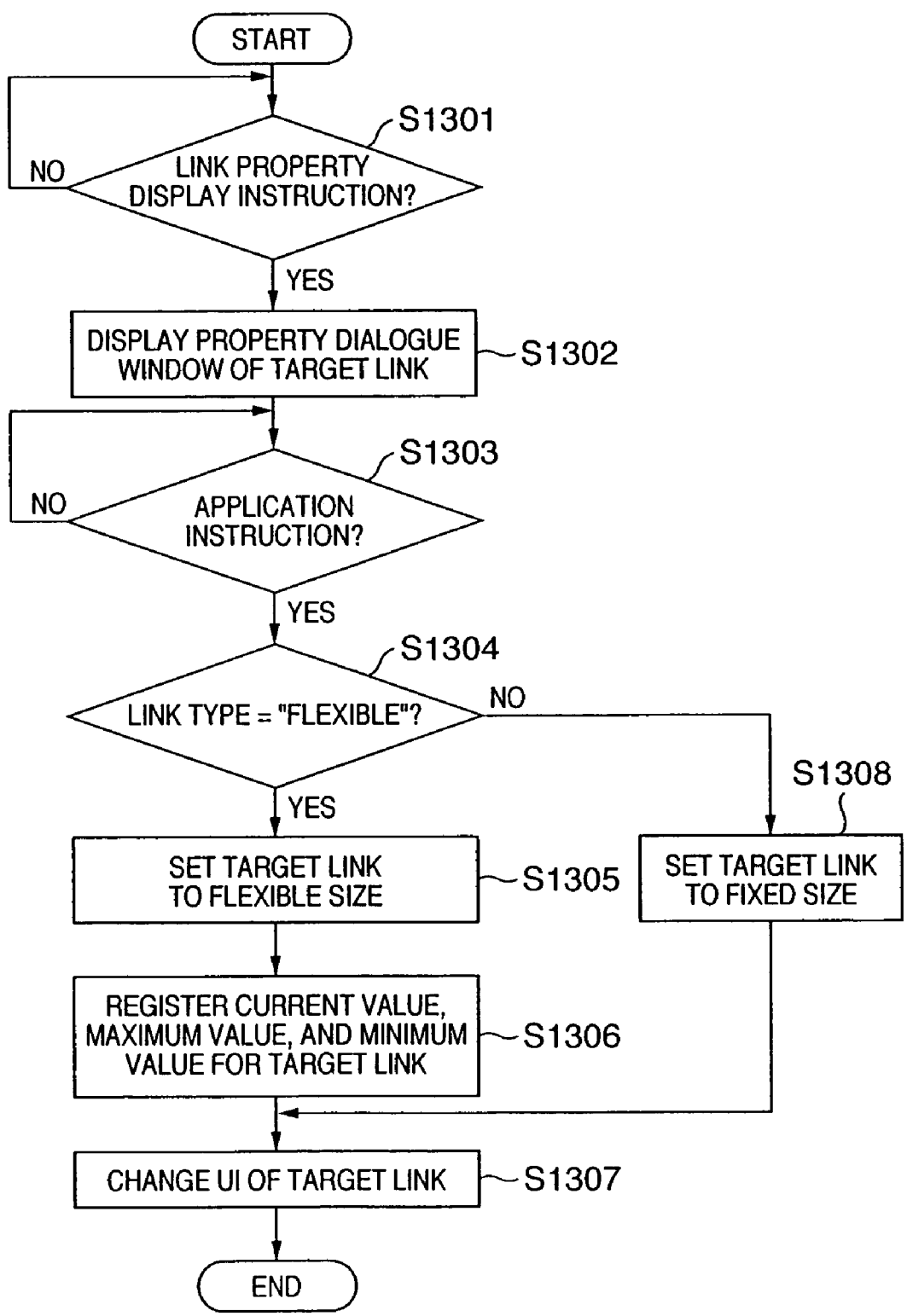
FIG. 13 is a flowchart for explaining processing of setting a flexible link by the user interface according to the embodiment.

FIG. 13 is a flowchart for explaining flexible link setting procedures by the user interface 103 according to this embodiment. For example, when a link is set between, e.g., the containers A and B shown in FIG. 11 in accordance with the procedures described with reference to FIGS. 6 and 7A to 7C, a link with a fixed size is set first. When this link is selected, and processing shown in FIG. 13 is executed, the link can be changed from a link 1106 (FIG. 11) with a fixed size to a link 1209 (FIG. 12) with a flexible size.

First, a desired link (e.g., link 1106) is selected by the mouse, and a predetermined operation to display link properties is performed. The user interface 103 of the layout editing application 121 recognizes the operation as input of a link property display instruction (step S1301). Upon recognizing the link property display instruction, the property dialogue window 1401 (FIG. 14) corresponding to the selected link (to be referred to as a target link hereinafter) is displayed. Next, the user interface 103 displays link properties (step S1302). A link can be selected by any operation such as clicking on the right button of the mouse or operating a specific key of the keyboard, like in setting the basic pattern of a container.

The current state of the selected link is shown in the dialogue window 1401 displayed in step S1302. In this example, since the link 1106 is selected, the link size is fixed at this step. As a Link Type 1405, the Fixed Length 1406 indicating a fixed length is selected.

In the dialogue window 1401, the Flexible Length 1407 is selected as the Link Type 1405 to change the link from the fixed size to the flexible size. Accordingly, the Max. Distance 1412, Min. Distance 1410, and Distance 1411 arranged in a Link Distance 1408 are validated, and numerical values can be set. To set the flexible size of the link, the user sets the maximum value of the link length in the Max. Distance 1412, the minimum value in the Min. Distance 1410, and the current value in the Distance 1411.

When setting is ended, the user instructs application of the setting by clicking on the general dialogue window open/close button 1404. When the user interface 103 detects this instruction, the processing advances from step S1303 to step S1304 to reflect the set state on the target link.

In step S1304, the layout editing application 121 determines whether the target link has a fixed size or flexible size. When a fixed size is designated, the flow advances to step S1308 to set the target link to "fixed size". In step S1307, the display state of the target link is changed to "solid line" representing "fixed link".

If it is determined in step S1304 that a flexible size is designated, the flow advances to step S1305. The layout editing application 121 sets the target link to "flexible size". In step S1306, the current value (reference value), maximum value, and minimum value of the target link set in the dialogue window 1401 are registered. In step S1307, the display state of the target link is changed to "dotted line" representing "flexible link". As a result, the UI display of the link changes to the state indicated by the link 1209 in FIG. 12 (step S1306). The pieces of setting information of the dialogue window 1401 are stored in the memory.

As the current value set in the Distance 1411, the distance between the containers currently laid out may be input automatically as a default value.

Figure 15:
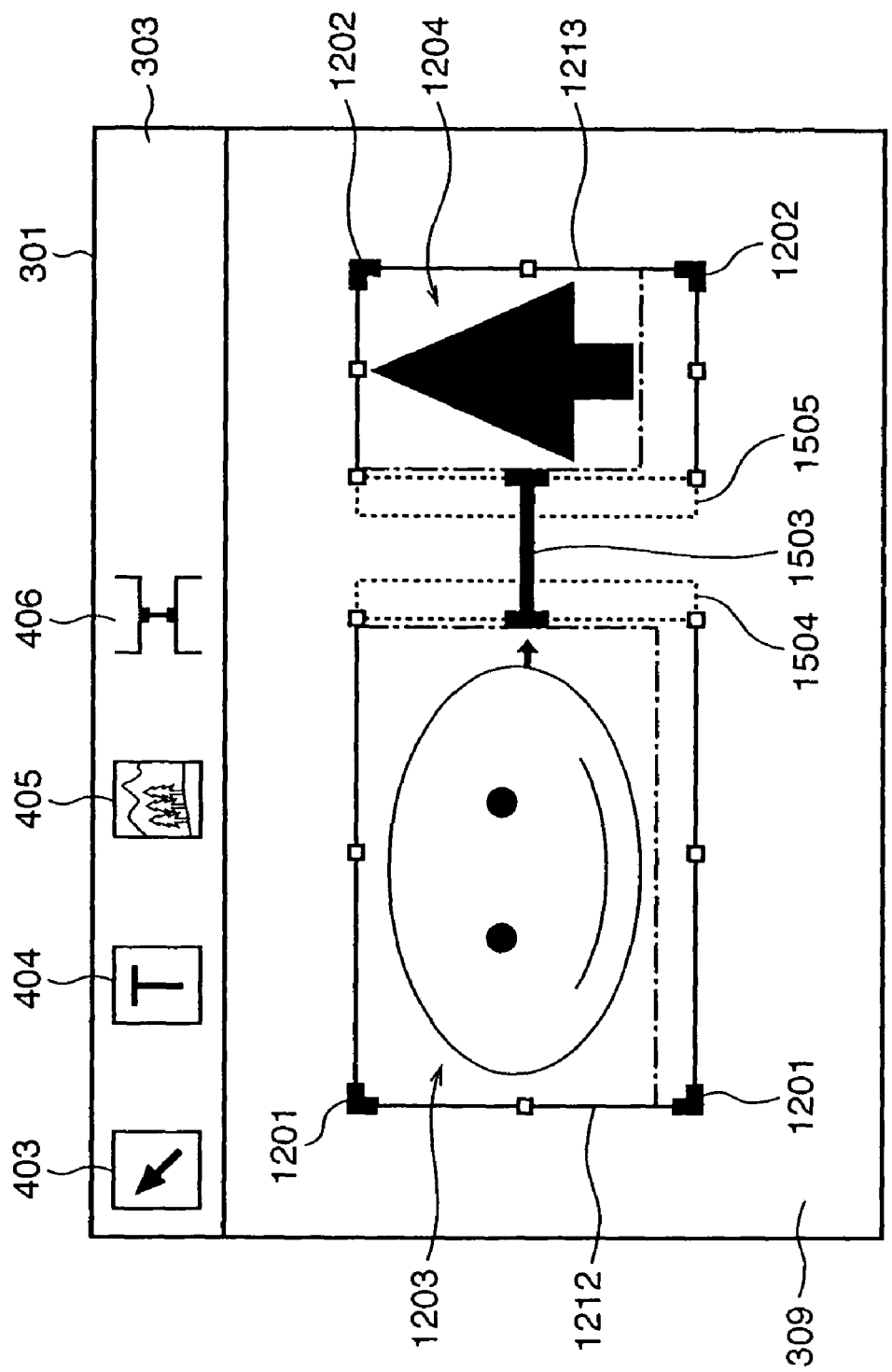
FIG. 15 is a view showing an example of a layout result by a fixed link.

FIG. 15 shows a layout result when a link with a fixed size is used. Layout calculation is executed in the above-described way. For example, assume that image data having different sizes are inserted in the containers 1203 and 1204 shown in FIG. 12. In this case, each container regards the data size as optimum. The container 1203 changes its size rightward to a frame 1504 (optimum container size) corresponding to the size of the inserted image. Similarly, the container 1204 changes its size leftward to a frame 1505 (optimum container size) corresponding to the size of the inserted image. However, the left edge 1212 of the container 1203 and the right edge 1213 of the container 1204 cannot be moved because of the anchors 1201 and 1202. To change the sizes of the containers, the distance between them must be shortened. However, a link 1503 having a fixed size is set between the containers. Since the link length is maintained in the layout calculation, the sizes of the containers 1203 and 1204 are changed.

As a consequence, the containers 1203 and 1204 cannot ensure the optimum sizes corresponding to the aspect ratios of the data. Finally, as shown in FIG. 15, the container sizes are smaller than the optimum sizes (frames 1504 and 1505). That is, since the size of the link 1503 is fixed, the containers 1203 and 1204 cannot achieve the optimum sizes (referring to FIG. 15, the range indicated by the alternate long and short dashed line in each container represents the aspect ratio of the data).

Figure 16:
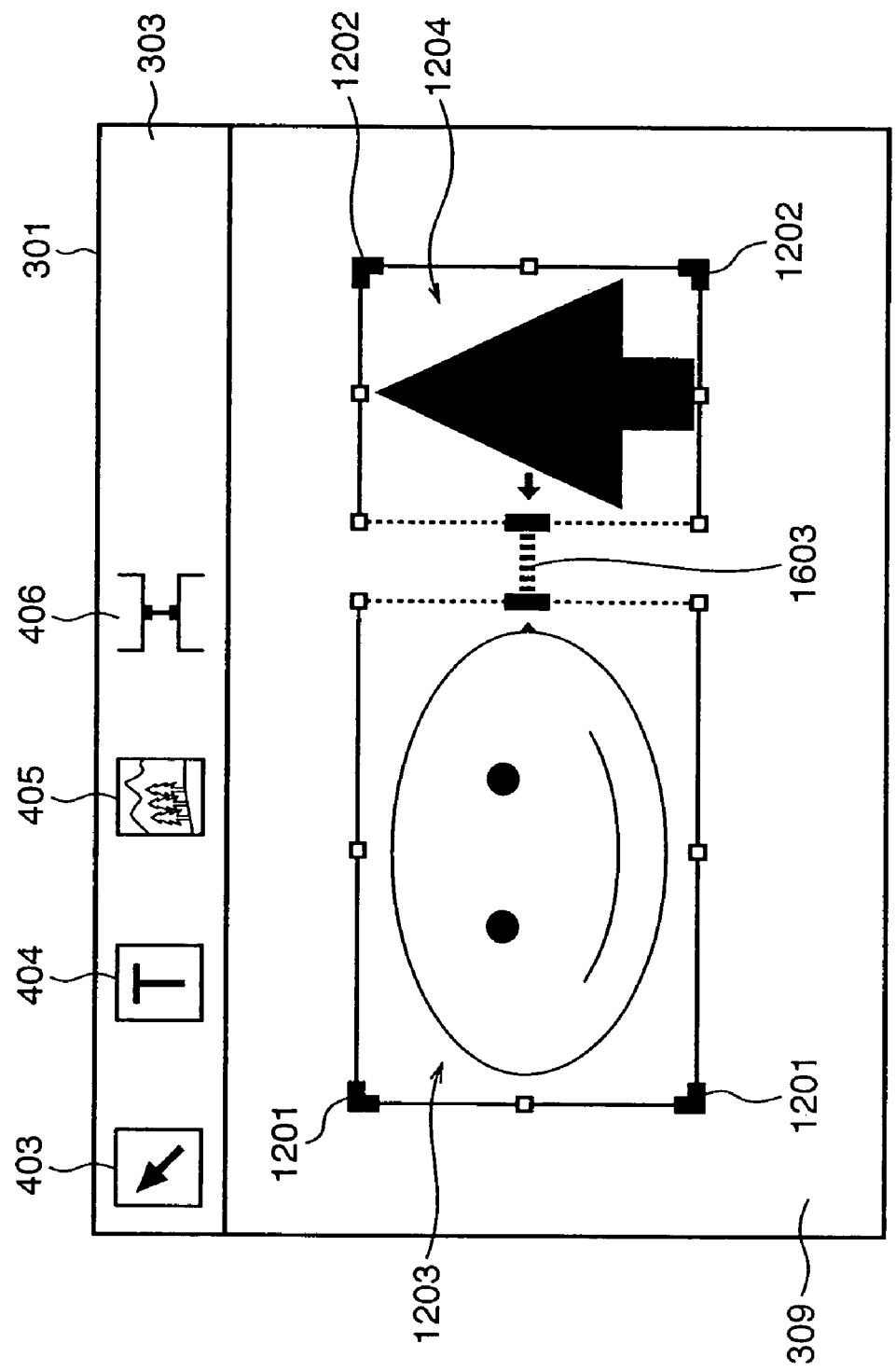
FIG. 16 is a view showing an example of a layout result by a flexible link.

FIG. 16 shows the same case as in FIG. 15 except that the link has a flexible size. In this case, a link having a flexible size is set between the containers 1203 and 1204 of the above example, as shown in FIG. 16. Hence, when the sizes of the containers 1203 and 1204 are changed, the link size decreases so that the containers 1203 and 1204 can be larger than in the example shown in FIG. 15. As a result, optimum sizes corresponding to the inserted data sizes can be achieved. Alternatively, container frames close to the inserted data sizes (optimum sizes) can be set. FIG. 16 shows this result. The size of the flexible link 1209 changes to a size indicated by a flexible link 1603 as a result of layout calculation. In this case, the containers 1203 and 1204 have optimum sizes (sizes corresponding to the data sizes).

[Automatic Layout Processing Capable of Setting Priority about Size for Container]

Figure 17:
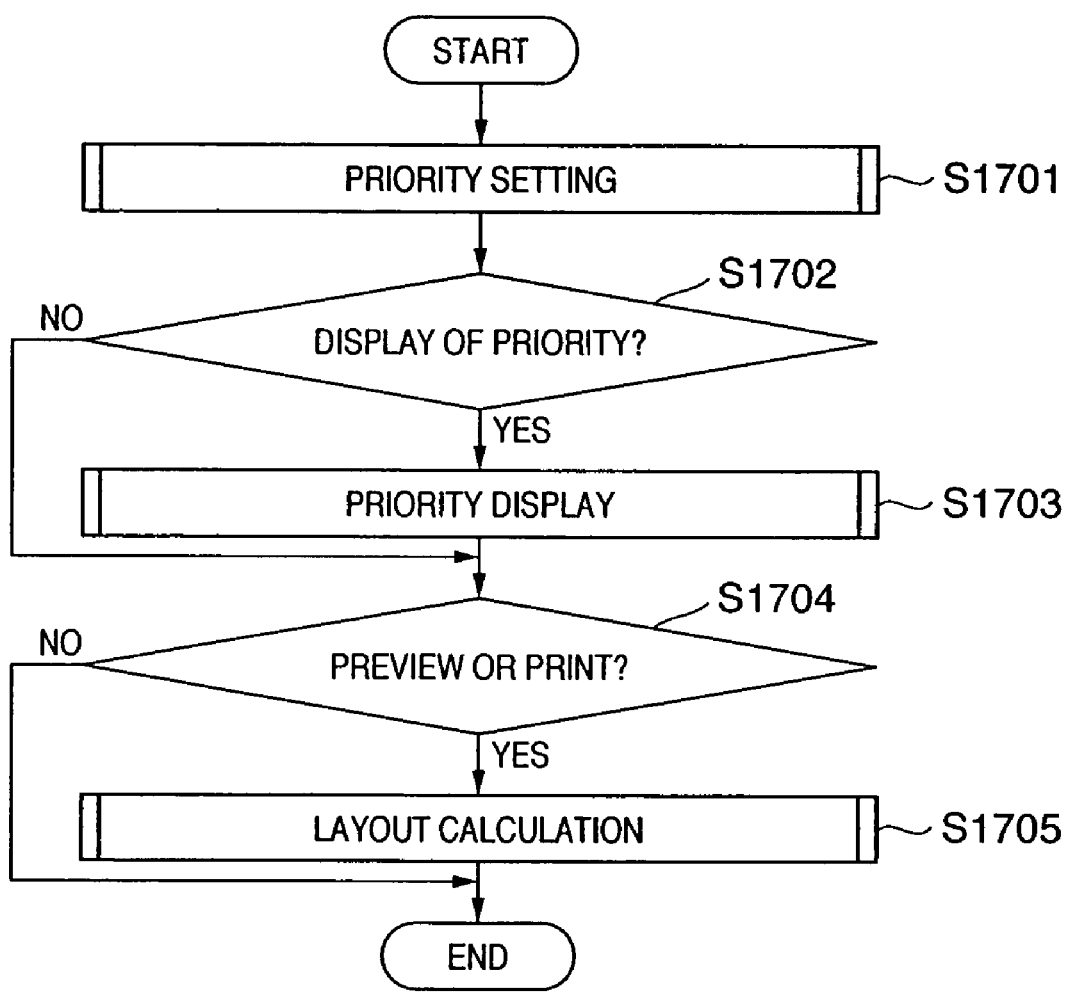
FIG. 17 is a flowchart showing automatic layout processing according to the embodiment, which can set a priority about a size for each container.

FIG. 17 is a flowchart showing automatic layout processing according to this embodiment, which can set a priority about a size for each container.

In step S1701, a priority in determining the size is set for each container. Priority setting processing in step S1701 will be described later with reference to FIGS. 18 and 19A to 19C. In step S1702, the user is asked whether to execute display on the user interface to confirm the priorities set in step S1701. If YES in step S1702, the flow advances to step S1703 to display the priorities set in step S1701 on the video display 144. Priority display processing in step S1703 will be described later with reference to FIGS. 20 to 24.

If NO in step S1702 or if the display operation in step S1703 is ended, the flow advances to step S1704 to inquire of the user about whether to execute preview or printing. If YES in step S1704, the flow advances to step S1705 to merge contents with the layout template and automatically calculate the layout. The layout calculation is done by applying the "priorities (ratios)" set in step S1701. More specifically, container sizes are calculated by weighting the set priorities (ratios) on the respective containers. Layout calculation in step S1705 will be described later with reference to FIG. 25 and subsequent drawings. Of the steps of the overall flow, the display step and preview/print step are not always executed only once. These steps can also be repeated an arbitrary number of times by the user.

[Priority Setting Processing]

Figure 18:
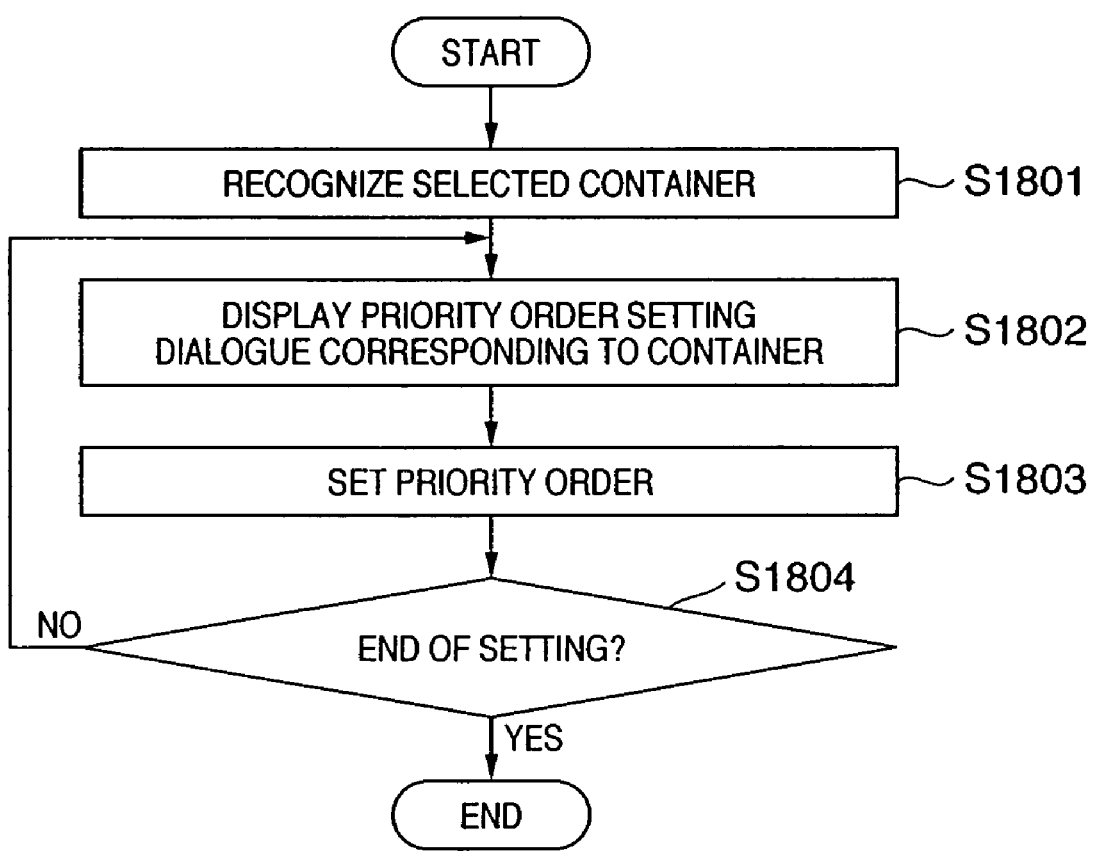
FIG. 18 is a flowchart showing priority setting processing according to the embodiment.

FIG. 18 is a flowchart showing priority setting processing (step S1701 in FIG. 17) according to this embodiment.

Figure 19A:
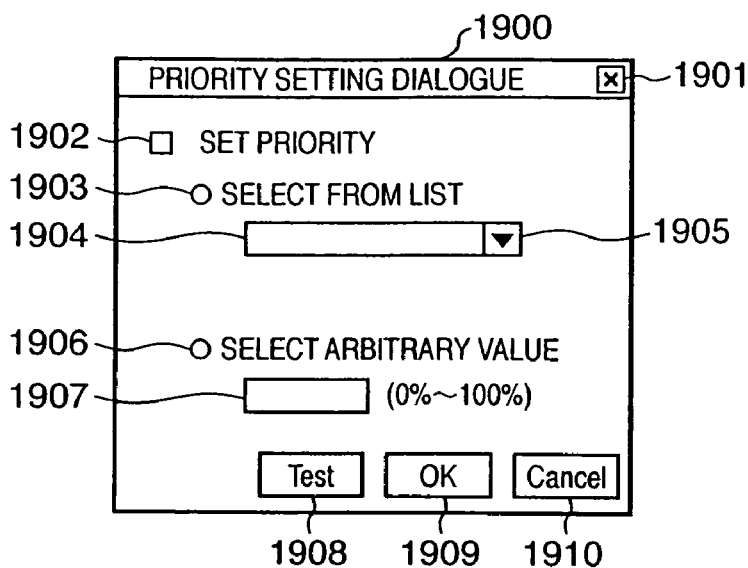
FIGS. 19A to 19C are views showing examples of the user interface in priority setting according to the embodiment.
Figure 19B:
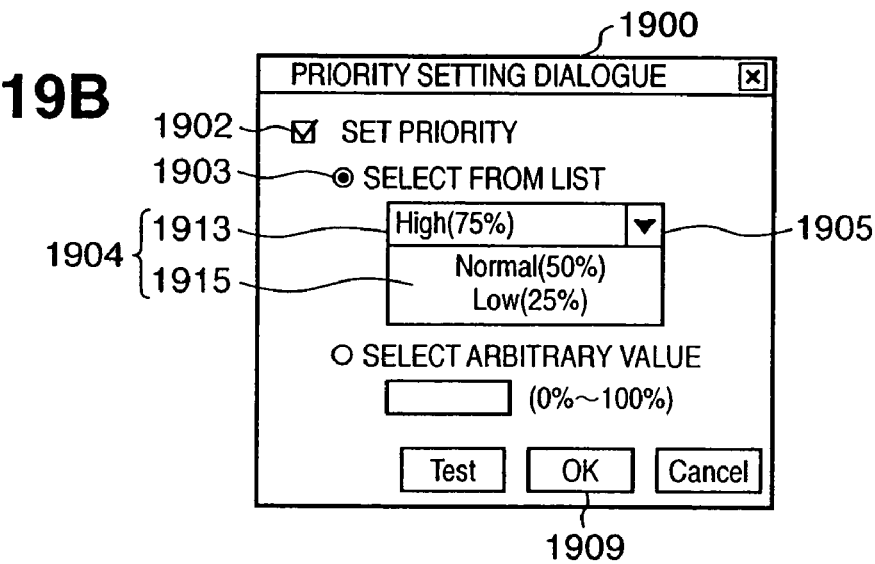
Figure 19C:
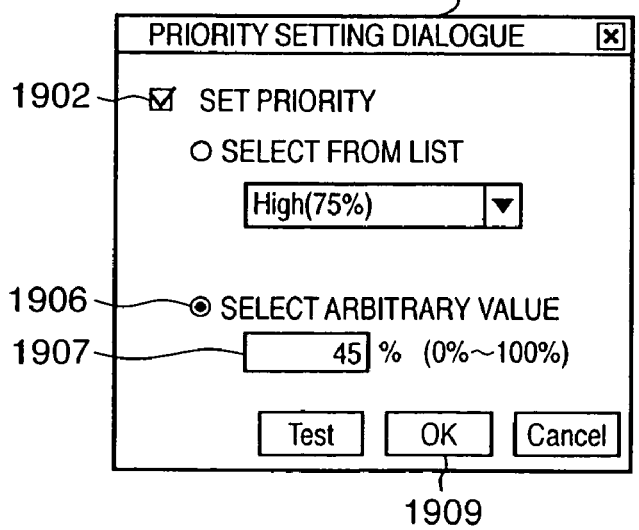

In step S1801, that a container as a priority setting target is selected by the user is recognized. Recognition here indicates that a container laid out is selected by, e.g., clicking the mouse, and the handles 502 and the like shown in FIGS. 5A to 5D are displayed to set the container in the selected state. In step S1802, a priority setting dialogue corresponding to the recognized container is displayed. This dialogue can be displayed by using, e.g., a window menu or a menu displayed by clicking on the right button of the mouse. FIGS. 19A to 19C show display examples of the dialogue.

FIG. 19A shows the entire dialogue. Reference numeral 1900 denotes a general view of a priority setting dialogue. A button 1901 is used to close the dialogue. A check box 1902 is used to validate priority setting. In the default state, the check box 1902 has no check mark so that priority setting is invalid. A radio button 1903 is checked to select the priority from values prepared on the system edge in advance. A list box 1904 is validated when the radio button 1903 is checked. When the mouse is clicked on an arrow button 1905, selectable priorities are displayed in a list. A radio button 1906 is checked to allow the user to set an arbitrary value as the priority. When the radio button 1906 is checked, a text box 1907 is validated so that a value can be input. The priority can be set by inputting an arbitrary value in the text box 1907.

When a test button 1908 is clicked on, test processing is executed, in which the priority set in this dialogue is temporarily applied to confirm the change in layout. The priority set at this time is temporarily set in the properties of the corresponding container. When the test processing is ended, the property value returns to the original value before execution. This button is optionally prepared to improve the usability and is not indispensable in practicing the present invention. When an OK button 1909 is clicked on, the property set in this dialogue is applied to the properties of the corresponding container, and the dialogue is closed. When a Cancel button 1910 is clicked on, the dialogue is closed without applying the priority set in this dialogue to the corresponding container.

FIG. 19B shows an example in which a priority prepared in the system in advance is used in the priority setting dialogue 1900. The check box 1902 is validated to set the priority. When the radio button 1903 is checked, the list box 1904 is validated. A list is displayed, as indicated by 1913 and 1915, so that a desired priority can be selected. This list display is executed by clicking on the arrow button 1905. Priorities prepared in the system in advance are displayed. In this example, High (75%), Normal (50%), and Low (25%) are prepared. These priorities are merely examples, and any other priorities may be prepared. A priority selected from the list 1915 by the user is displayed in the box 1913. When the OK button 1909 is clicked on, the selected property is set in the properties of the corresponding container.

FIG. 19C shows an example in which a priority designated as an arbitrary value by the user is set in the priority setting dialogue 1900. The check box 1902 is validated to set the priority. When the radio button 1906 is checked, the text box 1907 is validated so that a priority (numerical value) can be input. The user can input an arbitrary value in the text box 1907 in the inputtable state. When the OK button 1909 is clicked on, the property designated in the text box 1907 is set in the properties of the corresponding container. As described above, by allowing various priority setting modes, the layout intended by the user can easily be created.

Referring back to FIG. 18, the priority designated in the dialogue 1900 is set for the container. In step S1804, the user is asked whether priority setting is ended. If priority setting is necessary for another container, processing from step S1801 is repeated. If YES in step S1804, the processing is ended.

[Priority Display Processing (1)]

Figure 20:
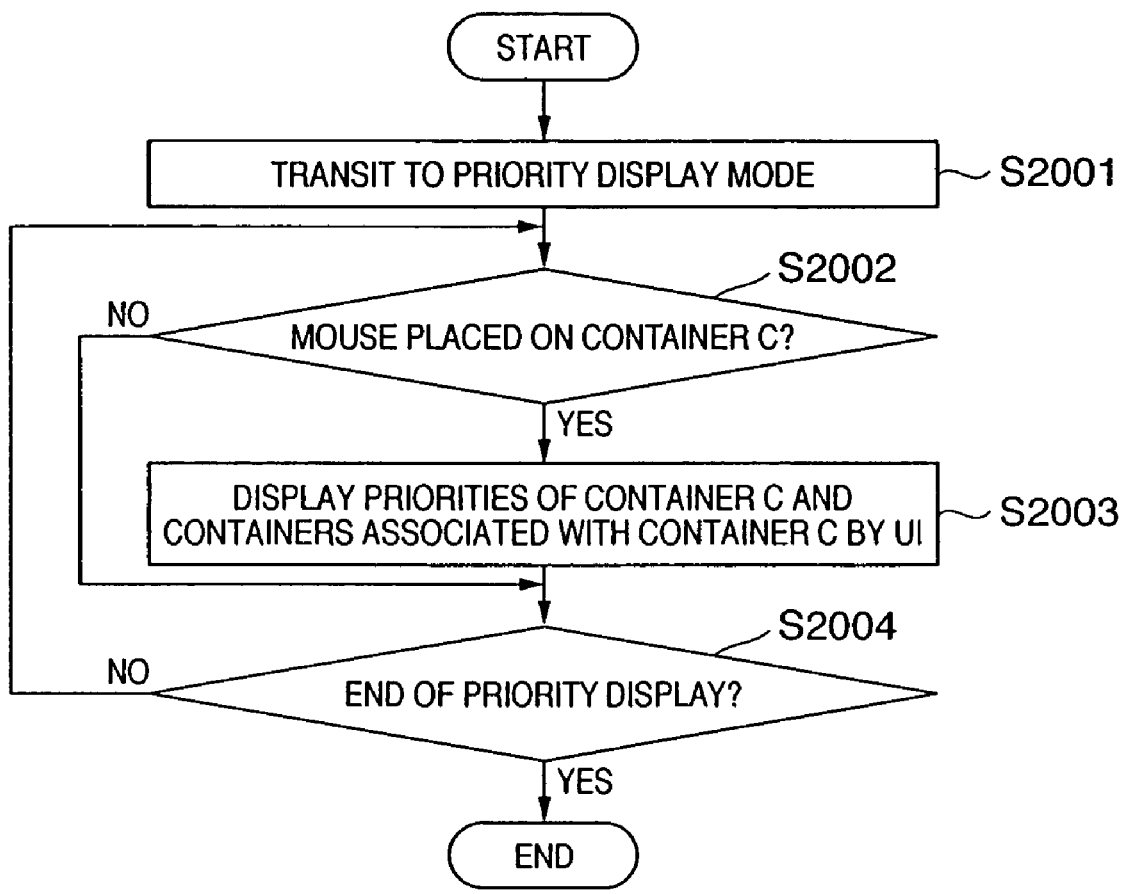
FIG. 20 is a flowchart showing priority display processing according to the embodiment.

Priority display processing in step S1703 will be described next. FIG. 20 is a flowchart showing priority display processing. Processing in each step will be described below in detail with reference to display examples of the user interface in FIGS. 21A to 21C and 22.

In step S2001, the mode is transited to the priority display mode. In the priority display mode, a priority set for a desired container in the above-described priority setting processing is displayed for the user on the user interface. This mode is prepared to improve the usability. The current container set state is explicitly presented by displaying the priority.

Figure 21A:
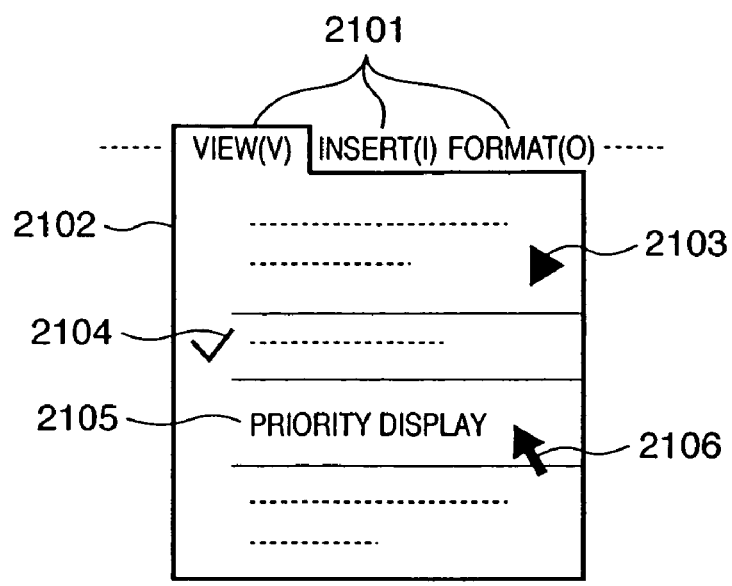
FIGS. 21A to 21C are views showing examples of the user interface in priority display processing according to the embodiment.
Figure 21B:
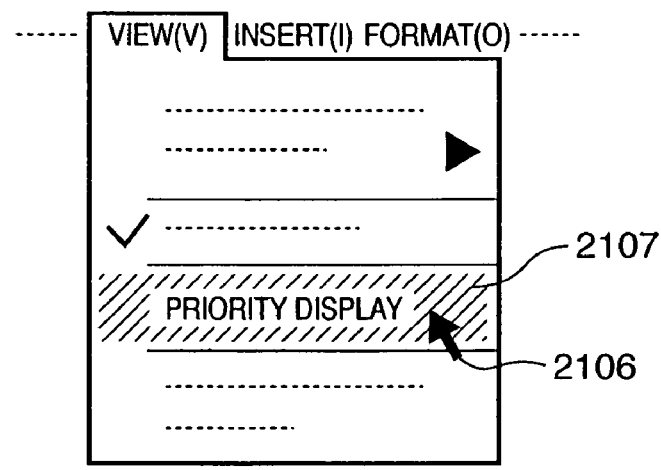
Figure 21C:
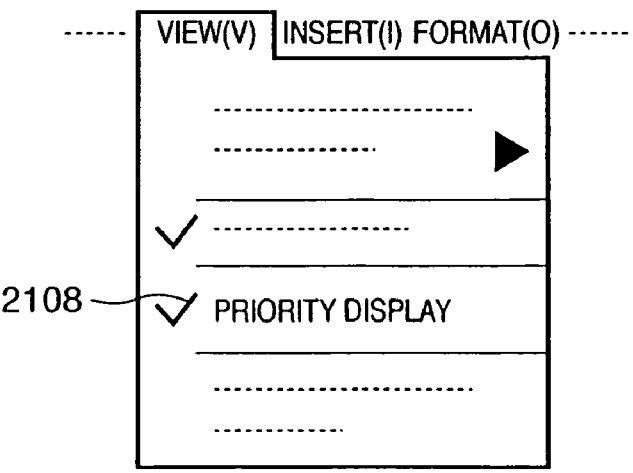

To transit to the priority order display mode, for example, an interface shown in FIGS. 21A to 21C is used. FIGS. 21A to 21C show a menu list (2102) displayed from the display menu of a menu bar 2101 provided by the automatic layout system according to this embodiment. The menu list has a plurality of items including "priority display" (2105). Like a general Windows® application, menu items with a two-layer structure 2103 or a check mark 2104 may be prepared in the menu list. When a mouse pointer 2106 is moved onto an item, shading (2107) is displayed to indicate that the item is selected, as shown in FIG. 21B. When the mouse is clicked on in this state, a check mark 2108 is displayed, as shown in FIG. 21C, and the mode is transited to the priority display mode. When the above-described operation is executed in the priority display mode, the priority display mode can be canceled. The above-described method is a general one, and the method of transiting to the display mode is not limited to this. Instead of separately preparing the priority display mode, the mode to display the priority may always be set.

Referring back to FIG. 20, in step S2002, whether the mouse pointer is placed on a container (container C) in the layout window of the automatic layout system is recognized. If YES in step S2002, the flow advances to step S2003 to display the priorities of the container C and each container associated with the container C by a link by the user interface.

Figure 22:
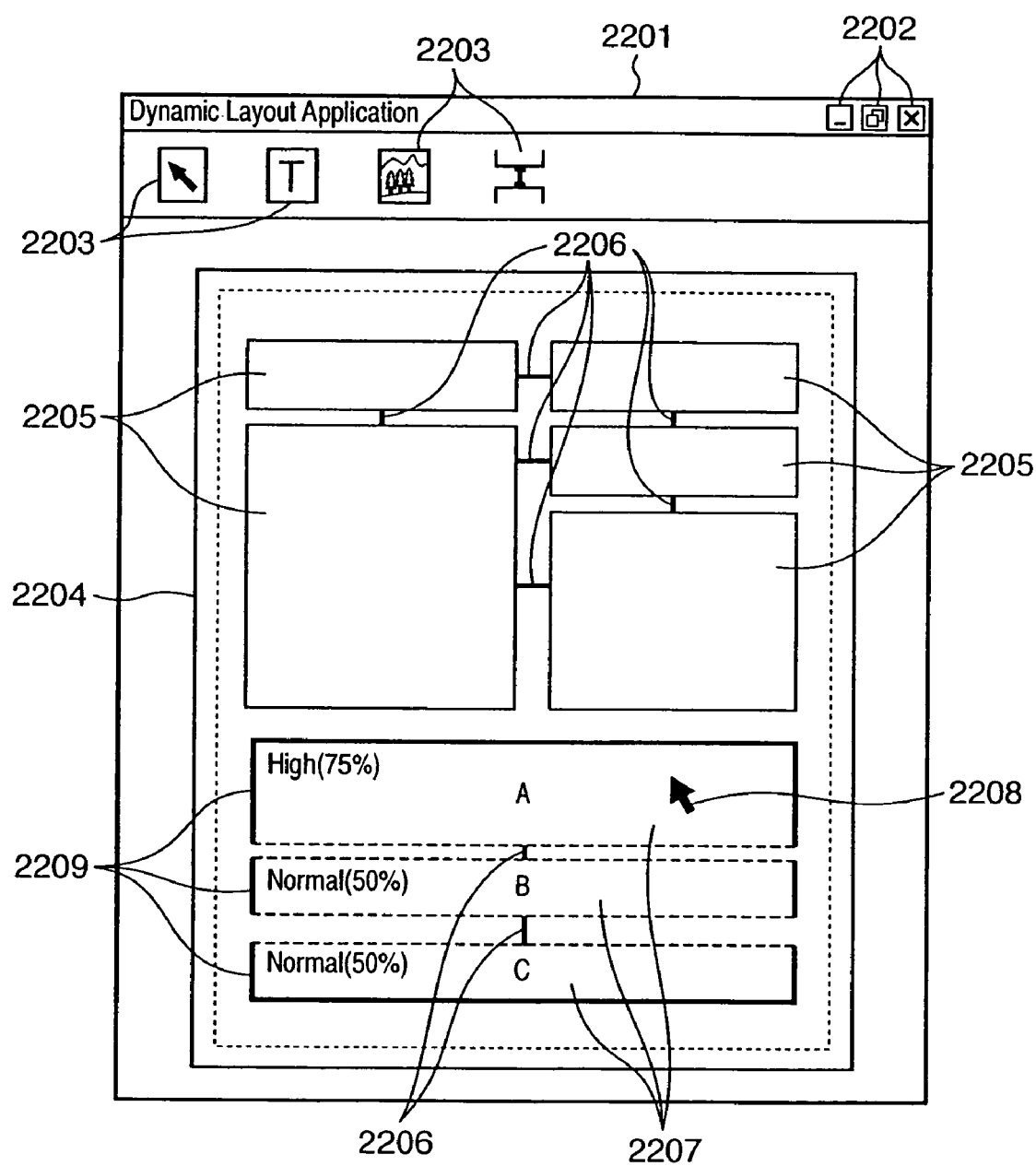
FIG. 22 is a view showing an example of the user interface in priority display processing according to the embodiment.

FIG. 22 shows a display example of priorities in the user interface. Referring to FIG. 22, reference numeral 2201 denotes a layout window of the automatic layout system according to this embodiment; 2202, buttons prepared for a dialogue of Windows®, which are used to minimize, reduce/enlarge, and close the window; and 2203, various kinds of tool buttons of this system. Mere examples are shown in FIG. 22. Containers are laid out in a layout page 2204 of this system to create a layout template. Reference numeral 2205 denotes containers; 2206, links indicating the association between the containers; and 2207, containers like the containers 2205. The containers 2207 are represented by A, B, and C from the upper edge for the descriptive convenience. Reference numeral 2208 denotes a mouse pointer; and 2209, priorities displayed by UI. In FIG. 22, the mouse pointer is located on the container A (mouseover on the container A). Then, the priorities of the container A and the containers B and C associated with the container A by links are displayed, as indicated by 2209 in FIG. 22, on the respective containers. In this example, the container A is set to High (75%), and the containers B and C are set to Normal (50%).

Referring back to FIG. 20, in step S2004, it is determined whether an instruction to end the display mode is input. An example of the instruction to end the display mode has been described above. If YES in step S2004, the priority display mode is ended. If the priority display mode should continue, processing from step S2002 is repeated.

[Priority Display Processing (2)]

Figure 23:
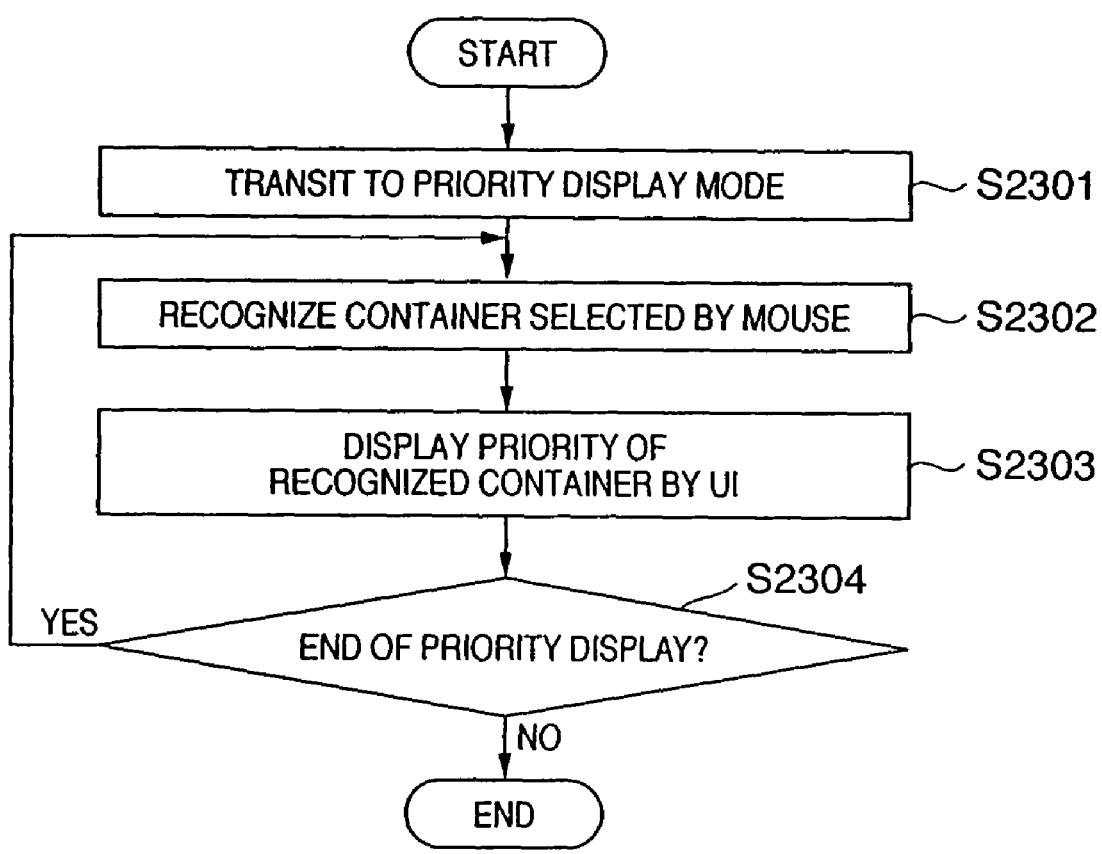
FIG. 23 is a flowchart showing another priority display processing according to the embodiment.

Another example of priority display processing will be described. FIG. 23 is a flowchart showing another example of priority display processing. Each step will be described in detail by using the user interface display example shown in FIG. 24.

Figure 24:
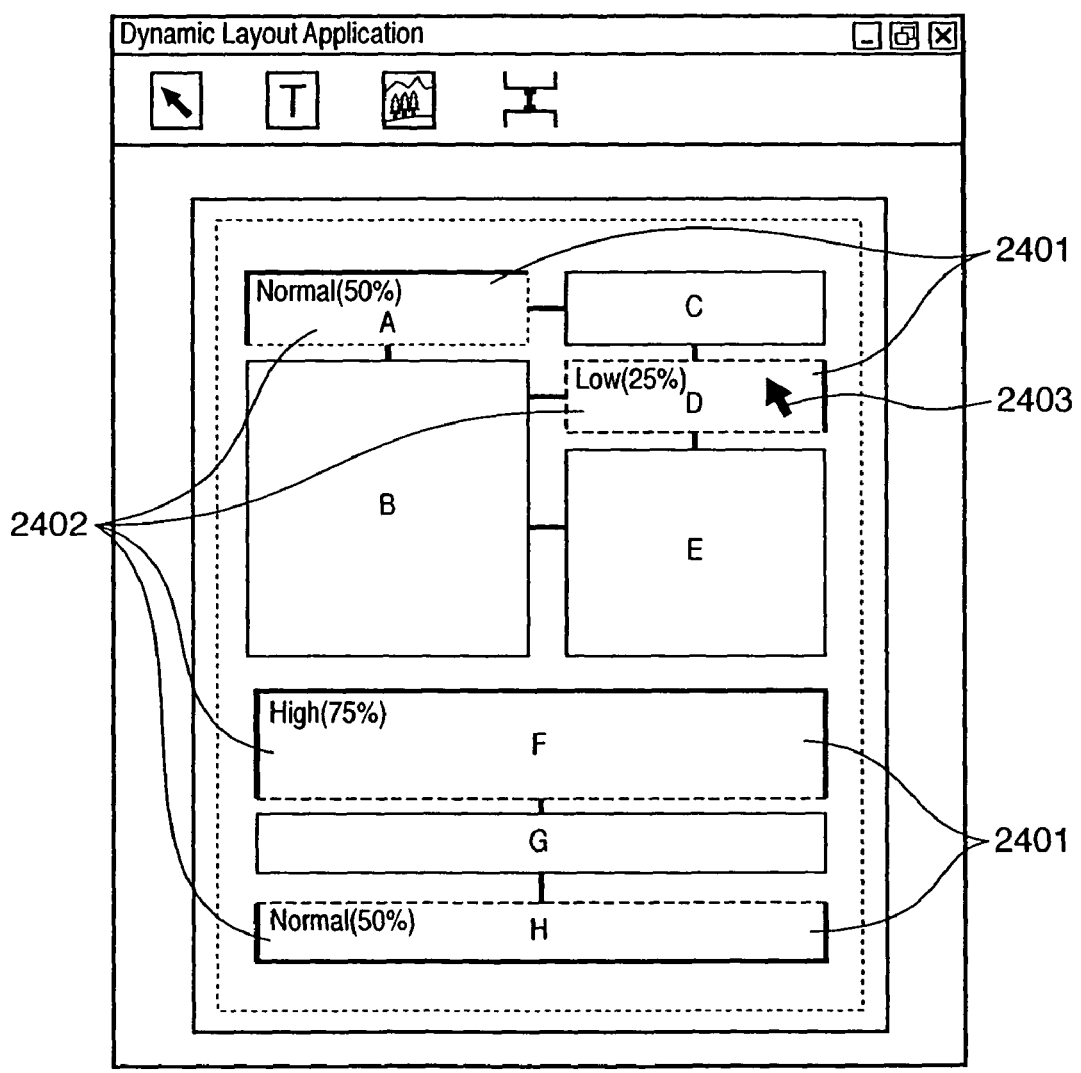
FIG. 24 is a view showing an example of the user interface in priority display processing shown in FIG. 23.

In step S2301, the mode is transited to the priority display mode. Processing in step S2301 is the same as that in step S2001 described above, and a description thereof will be omitted. In step S2302, a selected container is recognized. In the above-described priority display processing, the priorities of a container on which the mouse pointer is placed and containers associated with that container are displayed. In this priority display processing, however, the priorities of containers arbitrarily selected by the user with the mouse are displayed. Assume that the containers A to H are laid out, as shown in FIG. 24. A mouse cursor 2403 is moved onto a desired container. The container is selected by clicking on the mouse button. The edges of the selected containers change, as indicated by 2401, so that selection of the containers is explicitly indicated. In step S2303, the priorities of the selected containers are displayed. The priorities are displayed as indicated by 2402.

When the priorities are displayed in this way, the user can grasp the detailed process of layout determination.

In step S2304, it is determined whether an instruction to end the display mode is input. An example of the instruction to end the display mode has been described above in priority display processing (1). If YES in step S2304, the priority display mode is ended. If the priority display mode should continue, processing from step S2302 is repeated. While the priority display mode continues, the priority of a container is displayed every time it is selected by the mouse operation. In consideration of usability, however, when a selected container is selected again, it is preferably returned to the unselected state. In this case, a plurality of containers may be selected by clicking on the mouse button together with a predetermined key (e.g., the control key) such that the priorities of the plurality of containers can be displayed, as shown in FIG. 24.

[Container Size Calculation Considering Priorities]

Figure 25:
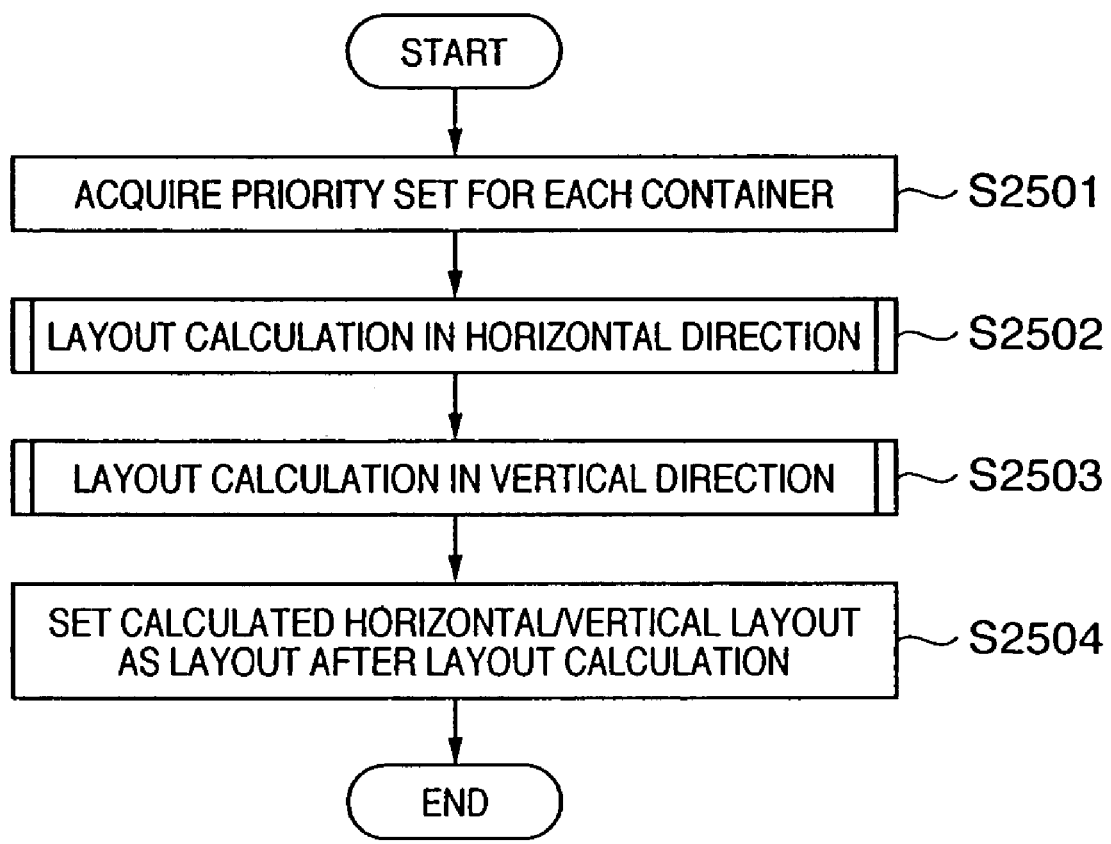
FIG. 25 is a flowchart showing the outline of layout calculation considering priorities according to the embodiment.

FIG. 25 is a flowchart showing the outline of layout calculation considering priorities according to this embodiment.

In step S2501, priorities set for containers laid out are acquired. In step S2502, layout calculation is executed in the horizontal direction of the page. In step S2503, layout calculation is executed in the vertical direction of the page. The layout calculation will be described later in detail. In step S2504, the layout calculation results in the horizontal and vertical directions in steps S2502 and S2503 are set as a layout after layout calculation.

Figure 26:
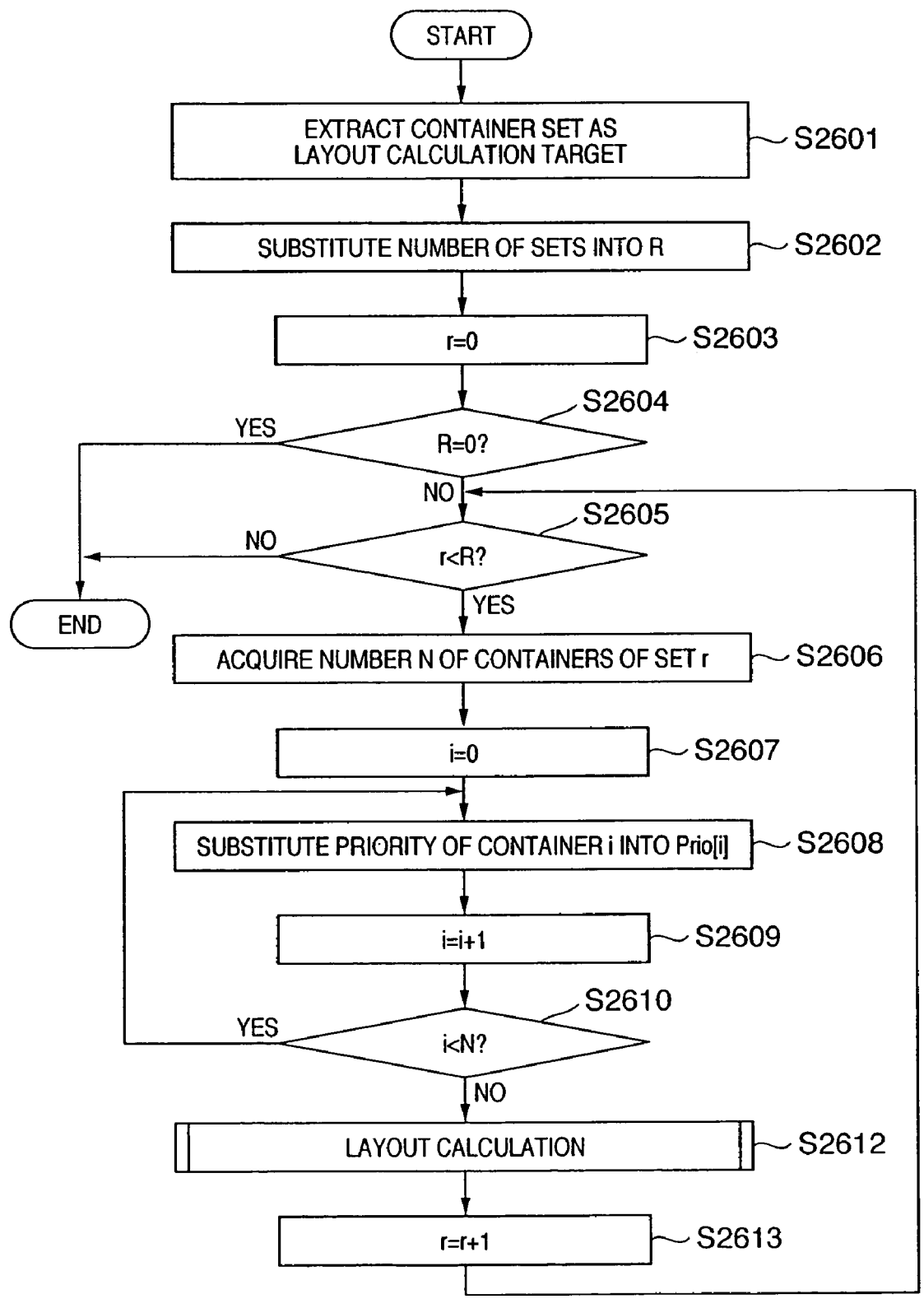
FIG. 26 is a flowchart showing layout calculation processing for the horizontal or vertical direction.

The layout calculation in steps S2502 and S2503 will be described below in detail with reference to the flowchart in FIG. 26.

In step S2601, sets of containers (sets each formed by containers associated by links) as layout calculation targets are extracted. In step S2602, the number of extracted container sets is substituted into R. In step S2603, 0 is substituted into a variable r. If R=0, i.e., the number of container sets to be calculated is 0 in step S2604, it indicates that no container is laid out. Hence, the processing is ended without executing calculation. If R≠0, R is compared with r in step S2605. If r<R, the flow advances to step S2606 to do layout calculation for a container set specified by r. If r≧R, it indicates that calculation is ended for all target container sets. Hence, the processing is ended.

Actual layout calculation is performed from step S2606. In step S2606, the number of containers of the container set (to be referred to as a set r hereinafter) specified by r is extracted and substituted into N. In step S2607, 0 is substituted into a variable i. Processing in steps S2608 to S2610 is repeatedly executed a number of times corresponding to the number of containers of the set r. The priority set for the container i is substituted into an array Prio[i]. For a container having no priority, Normal (50%) is set. When priority acquisition is ended, layout calculation of the set r is executed in step S2612. The layout calculation will be described later in detail. When layout calculation of the set r is ended, r is incremented by one in step S2613. Then, the flow returns to step S2605. That is, processing of the next container set r is executed. When processing of all container sets is ended, r≧R in step S2605. Hence, the processing is ended.

Figure 27:
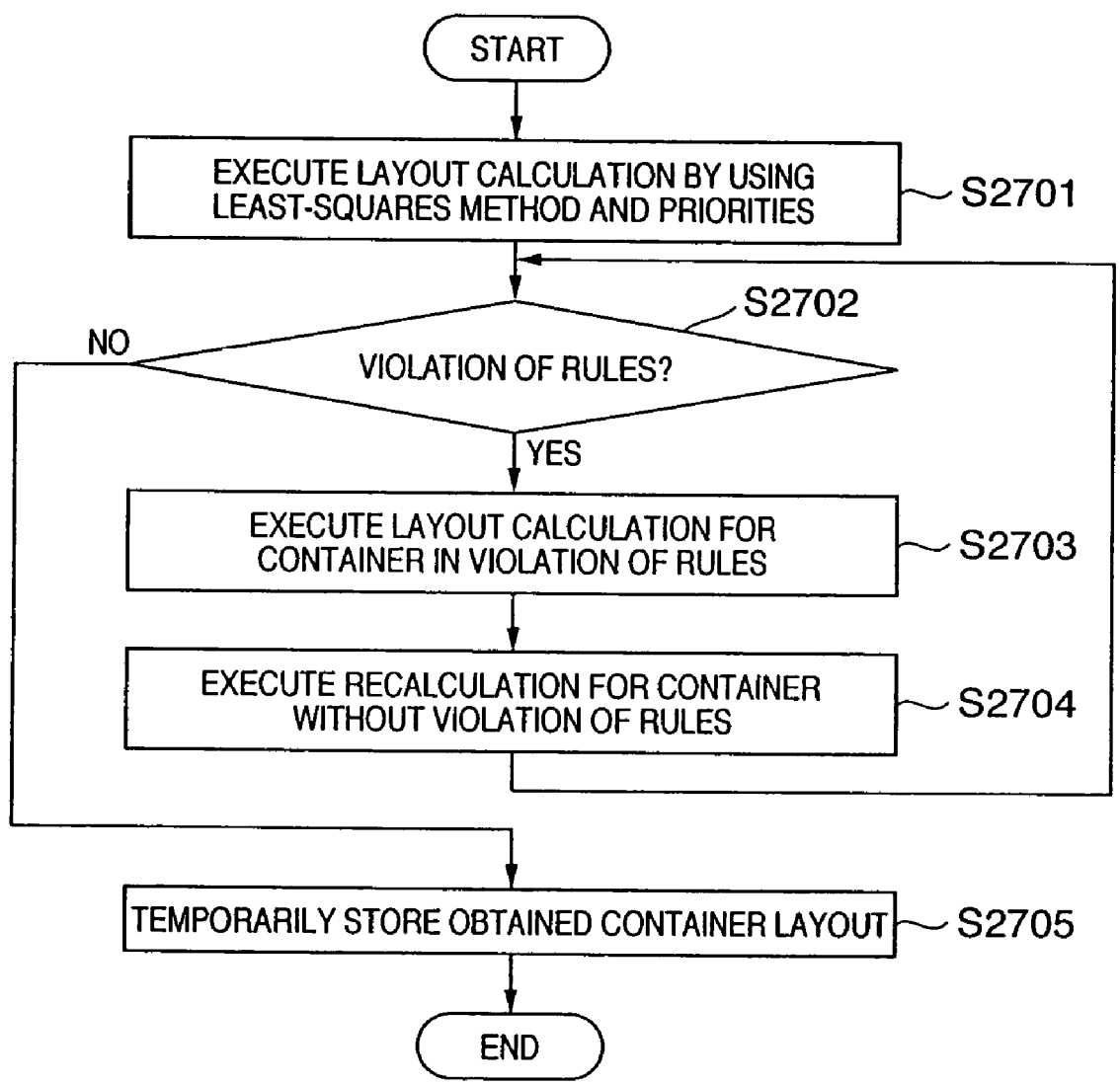
FIG. 27 is a flowchart showing details of processing in step S2612 in FIG. 26.
Figure 28:
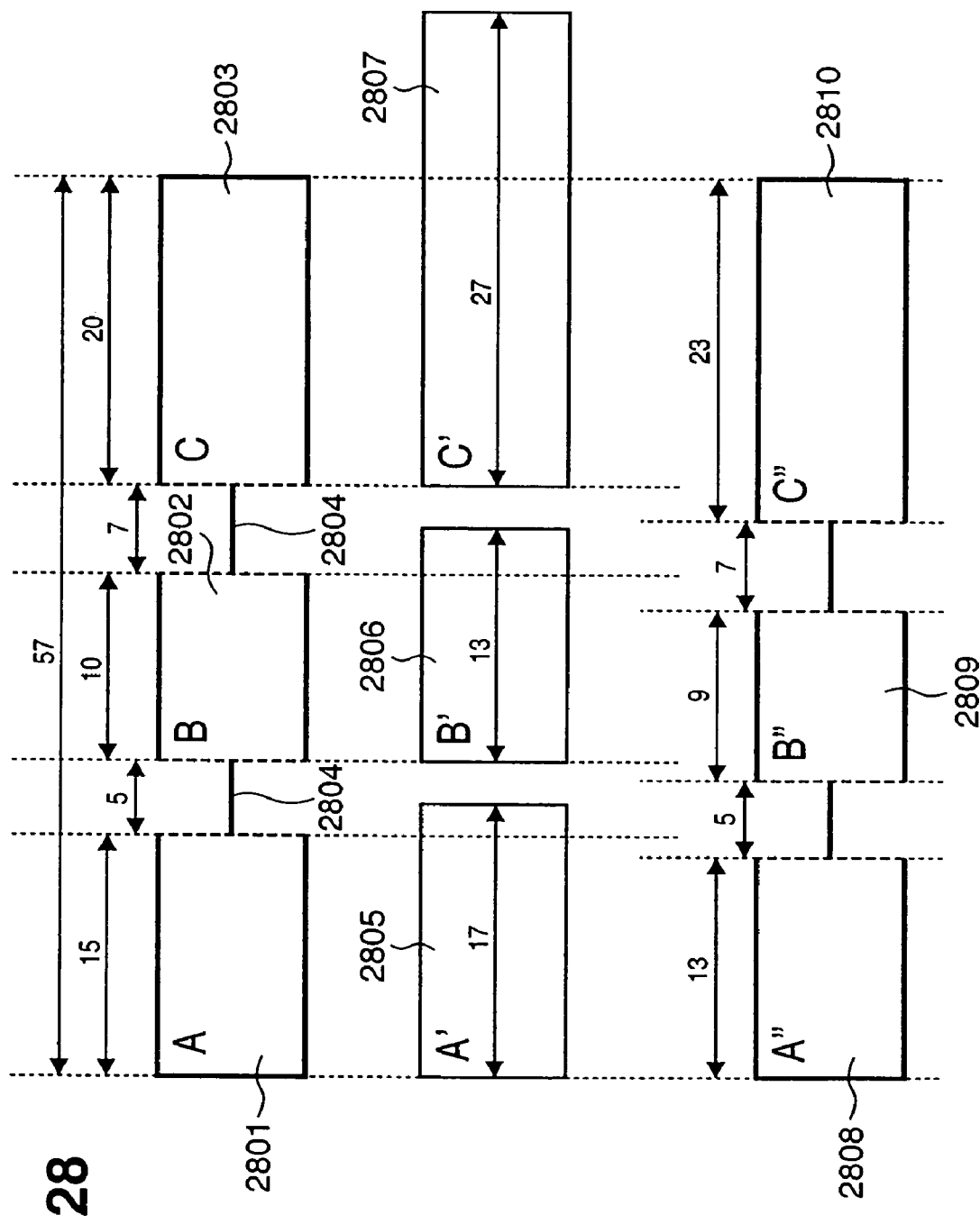
FIG. 28 is a view showing a layout calculation example without considering priorities.
Figure 29:
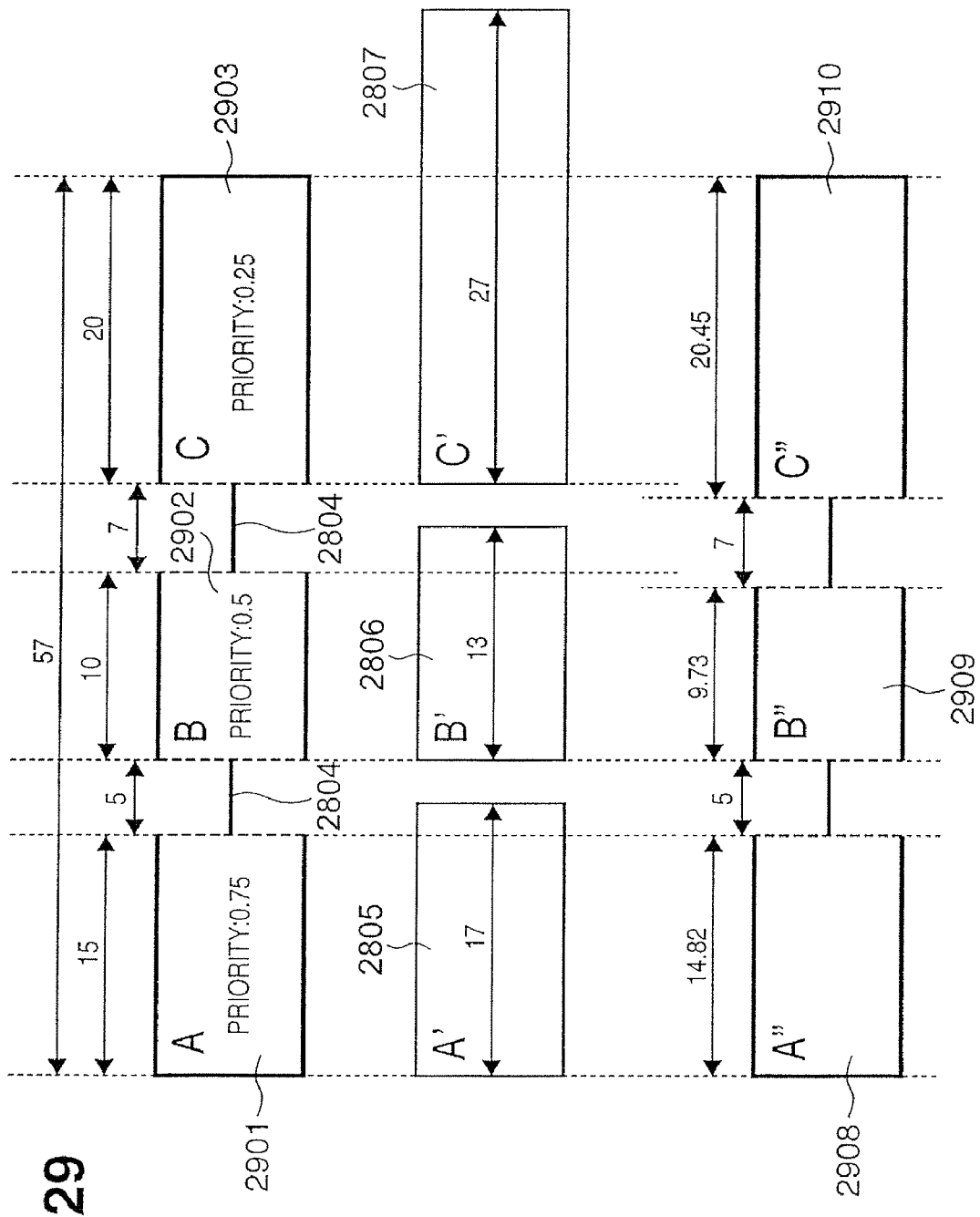
FIG. 29 is a view showing a layout calculation example considering priorities.

Layout calculation processing in step S2612 will be described next in detail with reference to FIGS. 27, 28, and 29. FIG. 27 shows details of layout calculation executed for each container set. FIG. 28 shows a container size calculation example when contents are inserted in containers laid out, and layout calculation is executed without any priority order. FIG. 29 shows a calculation example when priorities are set in the example shown in FIG. 28.

In step S2701, layout calculation of the set r is executed by using the least-squares method and priorities set for the containers. The layout calculation will be described later in detail with reference to FIGS. 28 and 29. In step S2702, it is determined whether the layout calculation result in step S2701 is in violation of the rules. The rules indicate here the maximum and minimum sizes set for each container and the maximum and minimum sizes set for each link. For example, if a calculated value does not satisfy the set maximum/minimum value, it is determined that the container violates the rules. When a container determined as violating the rules is present, the flow advances from step S2702 to step S2703 to do layout adjustment of the container determined as violating the rules.

The layout adjustment will be described. For example, assume that the horizontal size of a given container A is calculated as 10 by layout calculation. If "15" has been set as the minimum size of the container A, the horizontal size of the container A is set to 15 because the minimum size "15" has priority over the calculation result "10" (S2703). However, when the size of the container A, which is calculated as 10, is set to 15, 15−10=5 is newly given to the container set as stress. This stress must be distributed again to the containers in the layout set, which are not in violation of the rules. In step S2704, recalculation of these containers is executed. Processing in steps S2702 to S2704 is repeatedly executed until no container violates the rules. When no container violates the rules, the flow advances to step S2705 to temporarily store the calculated layout.

The layout calculation described with reference to FIGS. 26 an 27 is executed in the horizontal direction (S2502) and vertical direction (S2503). The container layout temporarily stored in step S2705 is set for each container in step S2504 described above as a layout after calculation after calculation in the horizontal and vertical directions is ended.

The above-described layout calculation in step S2701 will be described in detail with reference to FIGS. 28 and 29. To make it easy to understand the effect of layout calculation considering priorities, layout calculation (FIG. 28) without considering priorities and layout calculation (FIG. 29) considering them will be described by using the same layout.

Layout calculation without considering priorities will be described with reference to FIG. 28. Containers A 2801, B 2802, and C 2803 are associated by fixed links 2804. The containers and links have horizontal sizes shown in FIG. 28. The total horizontal size is 57. In this layout, the total size in the horizontal direction is fixed. When contents A' 2805, B' 2806, and C' 2807 are inserted in the containers, stress (layout load) is generated.

Each content has a real size (ideal size). As shown in FIG. 28, the real sizes of the contents A', B', and C' are 17, 13, and 27, respectively. When a content is a text, its ideal size is determined on the basis of the current amount of the content (amount of characters) and the font size and the flexible/fixed properties and maximum/minimum values of the horizontal and vertical sizes set for the container to insert the data. When a content is an image, the ideal size equals the size. (the numbers of vertical and horizontal pixels) of the image data. To lay out all the contents inserted in the containers in ideal sizes, a horizontal size of 17+5+13+7+27=69 is necessary. However, the horizontal size of this layout is fixed to 57, as described above. Hence, 69−57=12 is stress applied to this layout. The stress is distributed to the containers. This automatic layout system calculates to minimize the stress application. For this purpose, the least-squares method is used.

Let a, b, and c be the container sizes after calculation. A cost k as the sum of the squares of stress applied to the containers is given by $$k=(a-17)^2+(b-13)^2+(c-27)^2 \quad (1)$$

Since no priority is set in this layout, the cost k is minimized when $$a-17=b-13=c-27 \quad (2)$$

The layout size after calculation is given by $$a+5+b+7+c=57 \quad (3)$$

The size of each container after calculation is obtained from equations (2) and (3). The stress applied to each container is 4. After calculation, containers A", B", and C" (2808 to 2810) have the sizes shown in FIG. 28.

A calculation method when priorities are applied in the same layout as in FIG. 28 will be described next with reference to FIG. 29. Assume that a priority of 75% is set for a container A (2901), a priority of 50% is set for a container B (2902), and a priority of 25% is set for a container C (2903).

The layout calculation method is almost the same as the above-described method without priority setting. Letting a, b, and c be the container sizes after calculation, the cost k as the sum of the squares of stress applied to the containers is obtained by equation (1). An equation to minimize the cost k is derived next. Since the priorities are set, the stress of each container must be multiplied by the priority. Hence, we obtains $$75/100(a-17) = 50/100(b-13) \quad (4)$$
$$= 25/100(c-27)$$

The layout size after calculation is given by equation (3).

The size of each container after calculation considering the priority is obtained from equations (4) and (3). The stress applied to the containers is distributed in accordance with the priorities. After calculation, the sizes of containers A", B", and C" (2908 to 2910) are 14.82, 9.73, and 20.45, respectively. As compared to the layout calculation result without priorities shown in FIG. 28, a container having a high priority is laid out in a size close to the ideal size. An example for only the horizontal direction has been described above. Layout calculation in the vertical direction is also executed by the same method.

Since the priorities act in equation (4), the ratio of the differences between the layout sizes of the containers after calculation and the ideal sizes of corresponding contents equals the ratio of the reciprocals of the priorities set for the containers in the containers associated by links. As a result, the higher the priority of a container is, the smaller the difference from the ideal size is. Hence, a layout on which the ideal size (real size) of each contents data is reflected can be created.

[Layout Calculation Processing Considering Aspect Ratios of Contents]

The above-described layout calculation processing is executed without considering the aspect ratios of contents to be inserted. However, when the layout of a content (e.g., an image) having an aspect ratio is determined without considering the ratio, the content must be displayed after executing clipping or changing the aspect ratio by stretching. To display a content in an appropriate size, it is more preferable to take the aspect ratio into consideration. Layout calculation processing which also takes the aspect ratio into consideration in addition to priorities as in the above-described processing will be described below. Whether to take the aspect ratio into consideration may be set as the attribute of a container in advance or automatically set on the basis of the attribute of a content to be inserted in the container (for example, when a content is an image, a corresponding container is set as a container to consider the aspect ratio).

Figure 30:
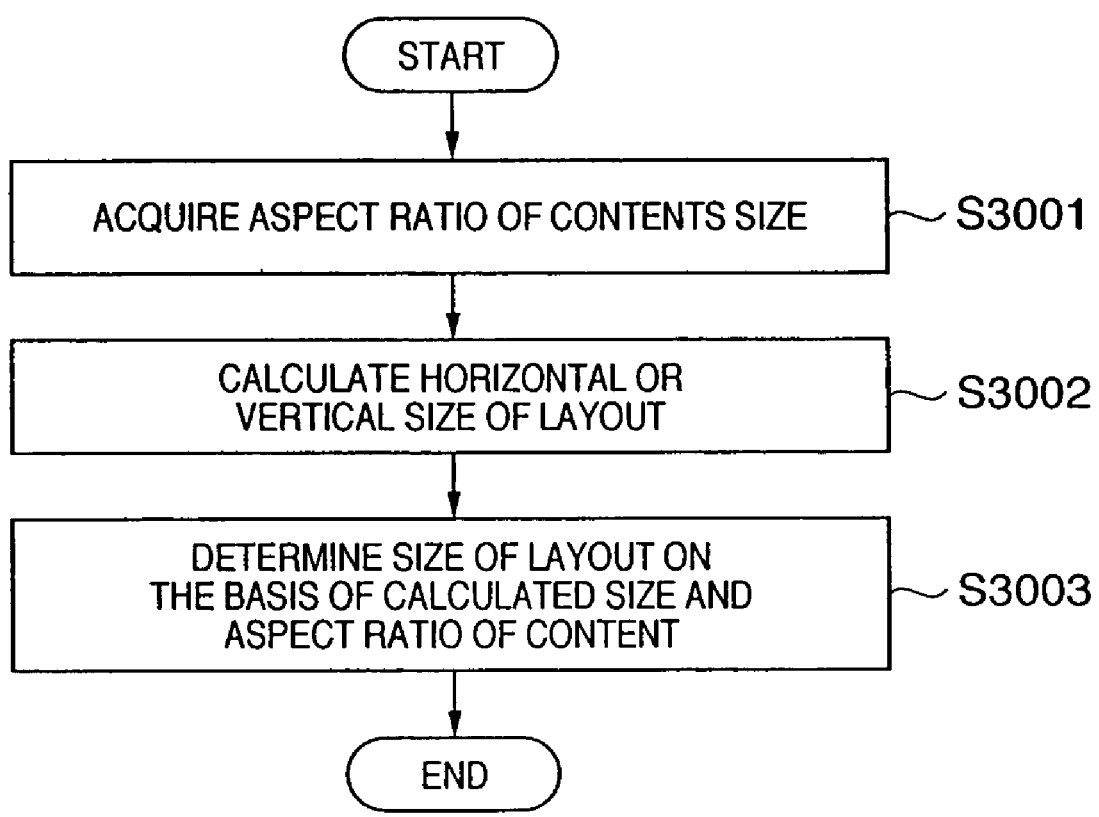
FIG. 30 is a flowchart for explaining layout calculation processing considering aspect ratios.

FIG. 30 is a flowchart for explaining basic layout calculation processing considering the aspect ratio in the automatic layout system.

In step S3001, the size and the aspect ratio of a content are acquired. In step S3002, layout calculation is executed in the horizontal or vertical direction of a container layout to insert the content. When layout calculation in one of the horizontal and vertical directions is ended, the size in the remaining direction is determined in step S3003 on the basis of the calculation result in step S3002 and the aspect ratio acquired in step S3001. That is, the above-described layout calculation without considering the aspect ratio is executed by using the least-squares method in both the horizontal and vertical directions. In layout calculation considering the aspect ratio, when one of the layouts in the horizontal and vertical directions is calculated, the other layout is forcibly calculated by using the aspect ratio of the content.

Figure 31A:
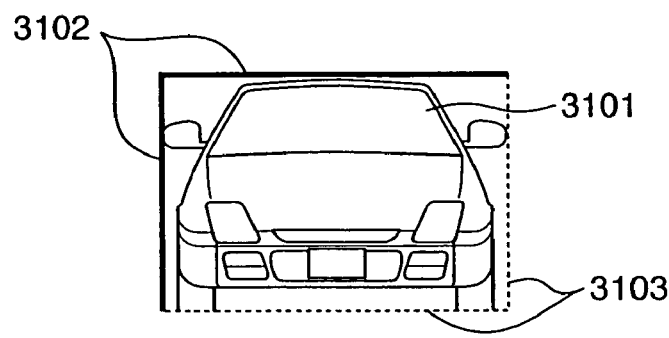
FIGS. 31A to 31C are views showing examples of layout calculation considering aspect ratios.
Figure 31B:
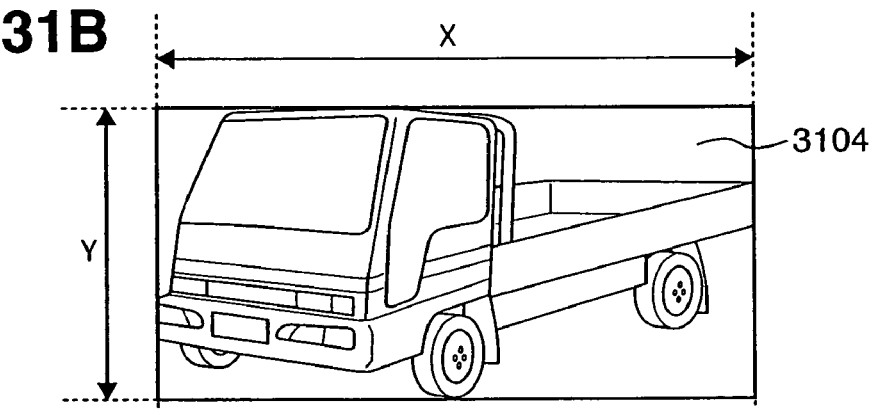
Figure 31C:
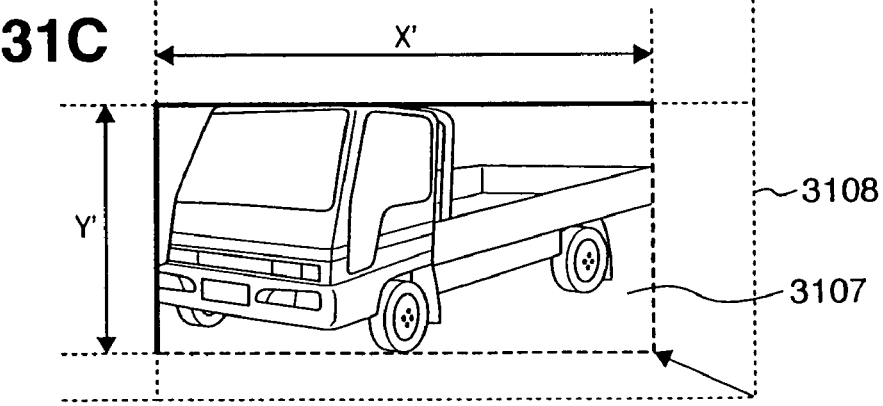

FIGS. 31A to 31C show simple examples of layout calculation considering the aspect ratio. FIG. 31A shows a state wherein a content is inserted in a container 3101 and laid out. The container, has as edges, a fixed edge 3102 and flexible edge 3103. A content 3104 shown in FIG. 31B is inserted in this container. The aspect ratio of the content 3104 is X:Y. Assume that when the content is inserted, an ideal size 3108 changes to a size 3107, as shown in FIG. 31C. In this case, when X' is obtained by the above-described layout calculation processing in the horizontal direction, Y' which satisfies X:Y=X':Y' is calculated in the vertical direction. The above-described layout calculation processing is not used.

Figure 33:
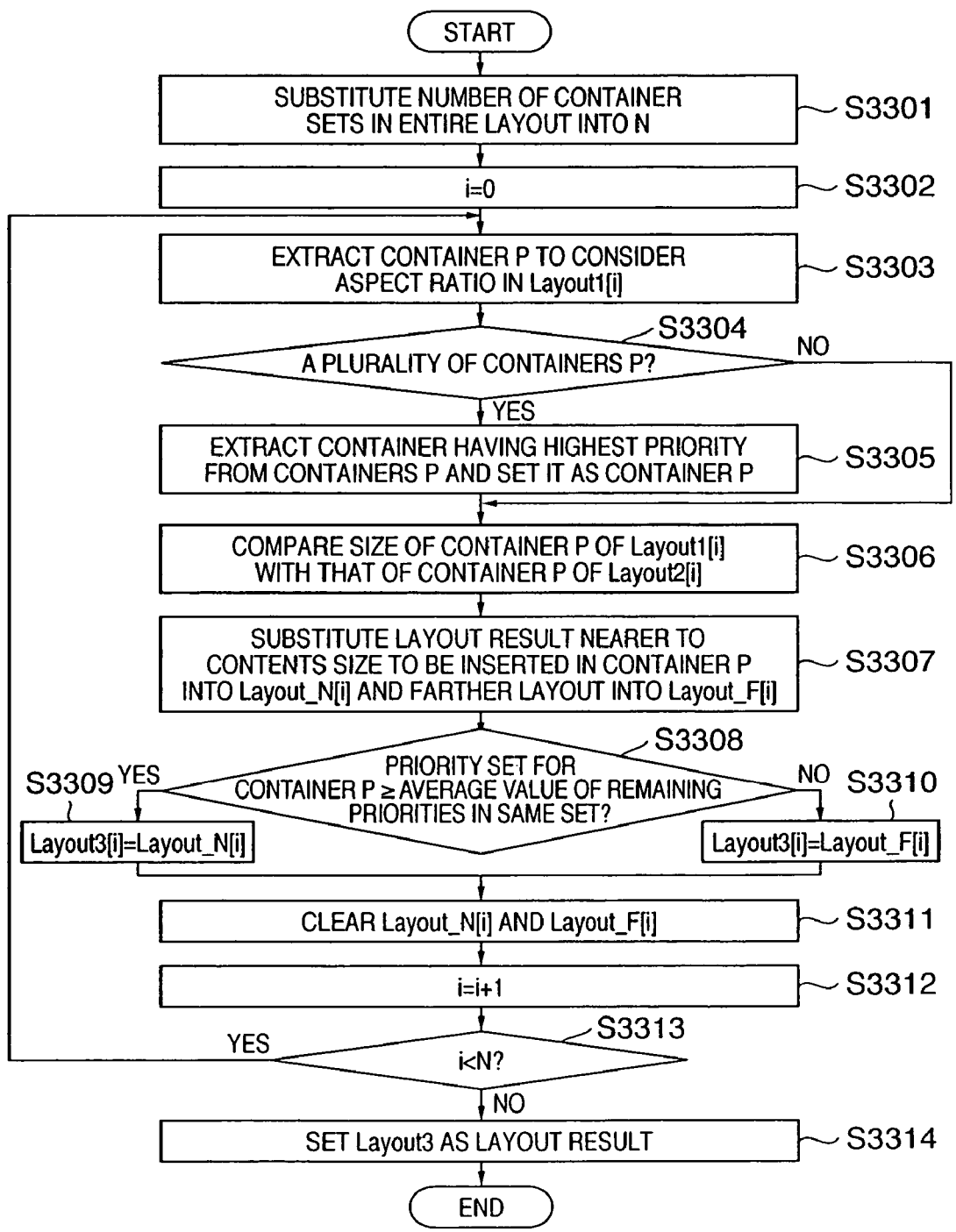
FIG. 33 is a flowchart showing layout adjustment processing (3210) in layout calculation processing considering aspect ratios and priorities.
Figure 34:
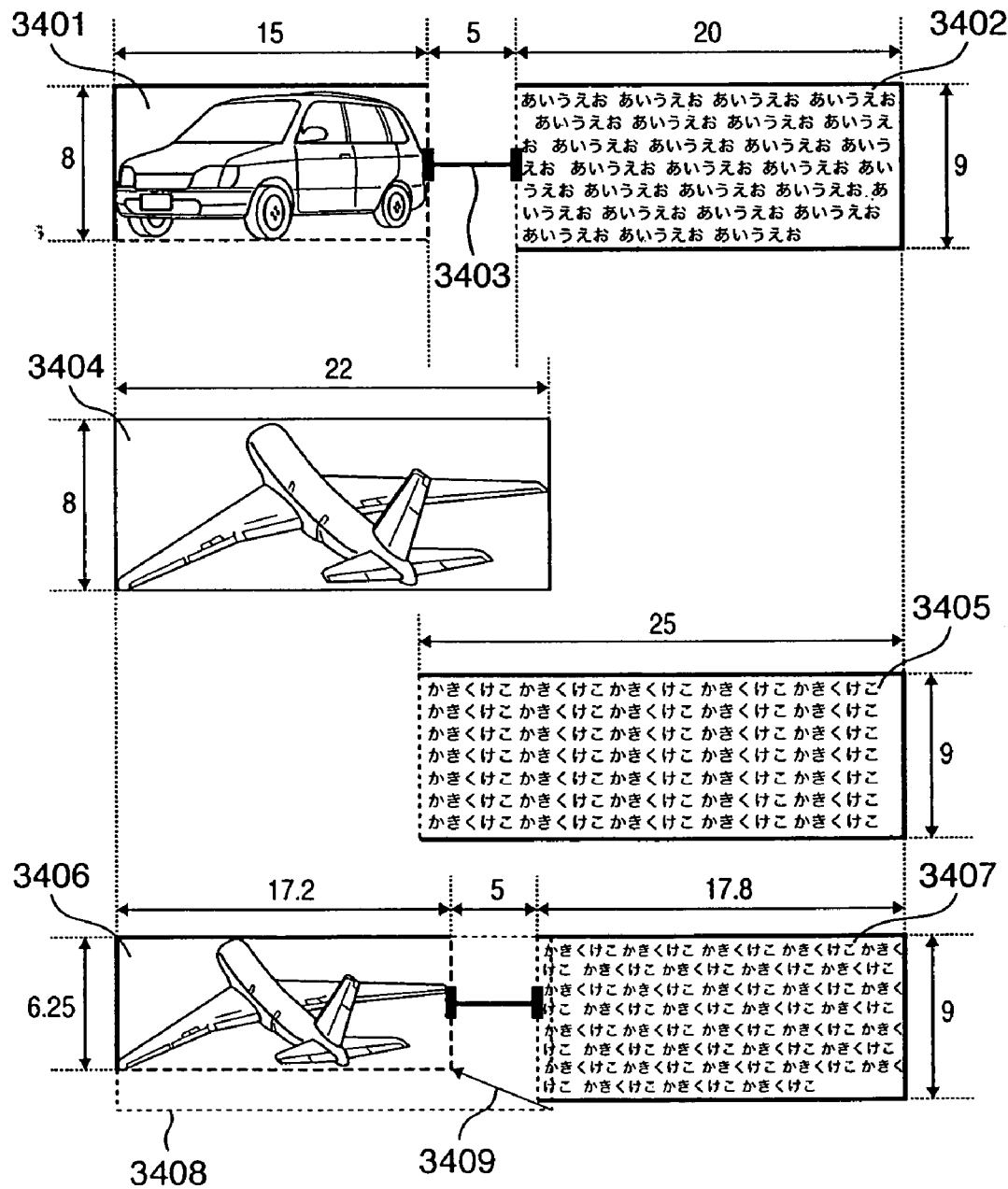
FIG. 34 is a view showing a processing example of layout calculation considering aspect ratios and priorities.

FIGS. 32 and 33 are flowcharts showing layout calculation processing considering the aspect ratio in addition to priorities as in the above-described layout calculation processing. FIG. 34 is a view showing a layout example by the layout calculation processing.

In step S3201, priorities set for containers are acquired. In step S3202, layout calculation in the horizontal direction is executed. The layout calculation processing is the same as that described with reference to FIGS. 26 and 27. When layout calculation in the horizontal direction is ended, a container having priority on the aspect ratio is detected, and the above-described layout calculation considering the aspect ratio is executed for the container in step S3203. The vertical size obtained by layout calculation in step S3203 is fixed at this point. In layout calculation in the vertical direction in step S3204, the container is excluded from calculation targets. That is, in step S3204, for each container to consider the aspect ratio, the size calculated in step S3203 is fixed, and layout calculation processing in the vertical direction is performed by using the fixed size. The remaining steps of the layout calculation processing in the vertical direction are the same as those described above with reference to FIGS. 26 and 27. In step S3205, when layout calculation is ended in the horizontal and vertical directions, the layout of each container is temporarily stored in the memory. For the descriptive convenience, assume that layout information is stored in an area Layout1.

In step S3205, the calculated layout is only temporarily stored and not applied to the containers. Hence, in this stage, the layout information of each container maintains the state before calculation.

In steps S3206 to S3209, layout calculation in the vertical direction is executed first, and layout calculation in the horizontal direction is executed then. The obtained result is stored as Layout2. In step S3206, layout calculation in the vertical direction is executed for the container set. The layout calculation processing is the same as described above. When calculation in the vertical direction is ended, a container having priority on the aspect ratio is detected, and the above-described layout calculation considering the aspect ratio is executed for the container in step S3207. The horizontal size obtained by layout calculation in step S3207 is fixed at this point. In step S3208, layout calculation in the horizontal direction is executed. The horizontal size obtained in step S3207 is handled as a fixed size. When layout calculation is ended in the horizontal and vertical directions, the layout of each container is temporarily stored in the memory in step S3209. For the descriptive convenience, assume that layout information is stored in an area Layout2.

Layout calculation is executed in two modes, i.e., horizontal direction→vertical direction and vertical direction→horizontal direction because, in layout calculation considering the aspect ratio, the finally calculated layout changes depending on whether calculation is executed first in the horizontal direction or vertical direction. In steps S3205 and S3209, layout results of two patterns are temporarily stored in the memory. A more optimum layout is determined and set as the final layout. To do this processing, layout adjustment is executed in step S3210 next to step S3209. Processing in step S3210 will be described later with reference to FIG. 33. With this layout adjustment processing, an optimum layout result is reflected on the containers, and the processing is ended.

FIG. 33 is a flowchart for explaining layout adjustment processing in step S3210. In layout adjustment processing, which of the layouts stored in Layout1 and Layout2 is more appropriate is determined for each container set. A more appropriate layout is employed as a final calculation result (Layout3) for each container set.

In step S3301, the number of container sets in the entire layout is substituted into N. In step S3302, 0 is substituted into a variable i. Layout1 temporarily stored in step S3205 contains the layout calculation result of each container set. The layout calculation result of a container set i can be acquired by designating Layout1[i]. This also applies to Layout2.

In step S3303, a container P to consider the aspect ratio is extracted from Layout1[i]. When a plurality of containers to consider the aspect ratio are present, the plurality of containers are acquired. In step S3304, it is determined whether a plurality of containers are acquired. If YES in step S3304, of the acquired containers, a container having the highest priority is set as the container P in step S3305. If a plurality of containers have the same priority, a container closest to the upper left corner of the layout coordinates is set as the container P. If NO in step S3304, the flow advances to step S3306. In step S3306, for the container P acquired in step S3303 or S3305, the size in Layout1[i] and that in Layout2[i] are compared. A layout result nearer to the size of the content to be inserted in the container P is substituted into Layout_N[i]. Conversely, a farther layout result is substituted into Layout_F[i]. For example, when Layout1[i] is nearer to the contents size, Layout_N[i]=Layout1[i].

In step S3308, it is determined whether the priority set for the container P is equal to or higher than the average value of the priorities of the remaining containers in the calculation target container set. If YES in step S3308, Layout_N[i] set in step S3307 is substituted into Layout3 prepared for temporary storage in step S3309. If NO in step S3308, the flow advances to step S3310 to substitute Layout_F[i] into Layout3. When substitution is ended, the temporary storage areas Layout_N[i] and Layout_F[i] are deleted in step S3311. In step S3312, the variable i is incremented by one. In step S3313, it is determined whether layout adjustment is ended for all container sets. If layout adjustment is ended for all container sets, the flow advances to step S3314 to set the temporarily stored layout adjustment result Layout3 as a layout calculation result considering the aspect ratios of the contents. If the processing is not ended for all container sets yet, the flow returns to step S3303 to repeat the processing.

FIG. 34 shows a layout example when the above-described layout calculation considering the aspect ratio of each content is executed. Containers 3401 and 3402 are associated with a link 3403. The container 3401 is an image container to insert an image. The container 3402 is a text container to insert a text. A priority of 75% is set for the container 3401, and a priority of 50% is set for the container 3402. The container 3401 is set to consider the aspect ratio. The horizontal and vertical sizes of the container 3401 are 15 and 8. The horizontal and vertical sizes of the container 3402 are 20 and 9. The width of the link is 5. An image content 3404 and text content 3405 are inserted in this layout. The horizontal and vertical sizes of the image content are 22 and 8. The horizontal and vertical sizes of the text content are 25 and 9. When the contents are inserted, the above-described layout calculation is executed.

Let a and b be the container sizes after calculation. The cost k of the layout is given by $$k=(a-22)^2+(b-25)^2 \quad (5)$$

When the priority of each container is taken into consideration, the cost k is minimized when $$75/100(a-22)=50/100(b-25) \quad (6)$$

The size of the layout set after layout calculation is given by $$a+b+5=40 \quad (7)$$

The size of each container after calculation is obtained from equations (6) and (7). The size of a container 3406 after calculation is 17.2, and that of a container 3407 is 17.8. Since the container 3406 is set to consider the aspect ratio, the vertical size of the container 3406 must be calculated in consideration of the aspect ratio of the content 3404. Letting X be the vertical size of the container 3406, the ratio is given by $$22:8=17.2:X \tag{8}$$

From equation (8), X =6.25 is obtained. Hence, the vertical size of the container 3406 is 6.25. Reference numeral 3408 denotes a contents size. As is apparent from FIG. 34, the container 3406 has changed while maintaining the aspect ratio of the content (3409).

Layout calculation considering only the horizontal direction has been described with reference to FIG. 34. Layout calculation considering both the horizontal and vertical directions will be described with reference to FIGS. 35 and 36. More specifically, a layout calculation method considering not only priorities but also aspect ratios will be described assuming that containers have associations not only in the horizontal direction but in both the horizontal and vertical directions. Layout calculation can be executed even for a layout set having associations in the horizontal and vertical directions by using the procedures described with reference to FIG. 32.

Figure 35:
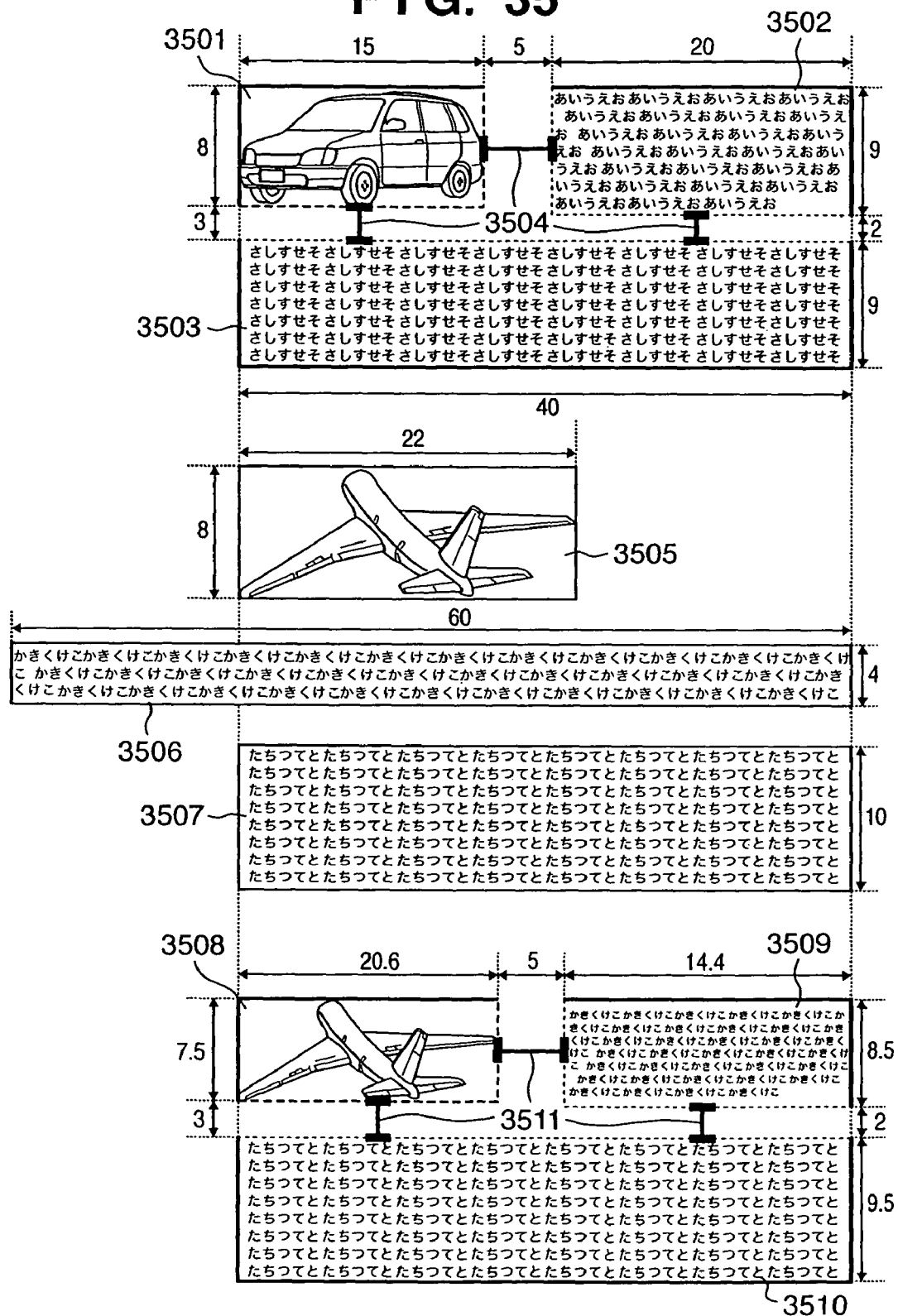
FIG. 35 is a view showing a processing example of layout calculation considering aspect ratios.
Figure 36:
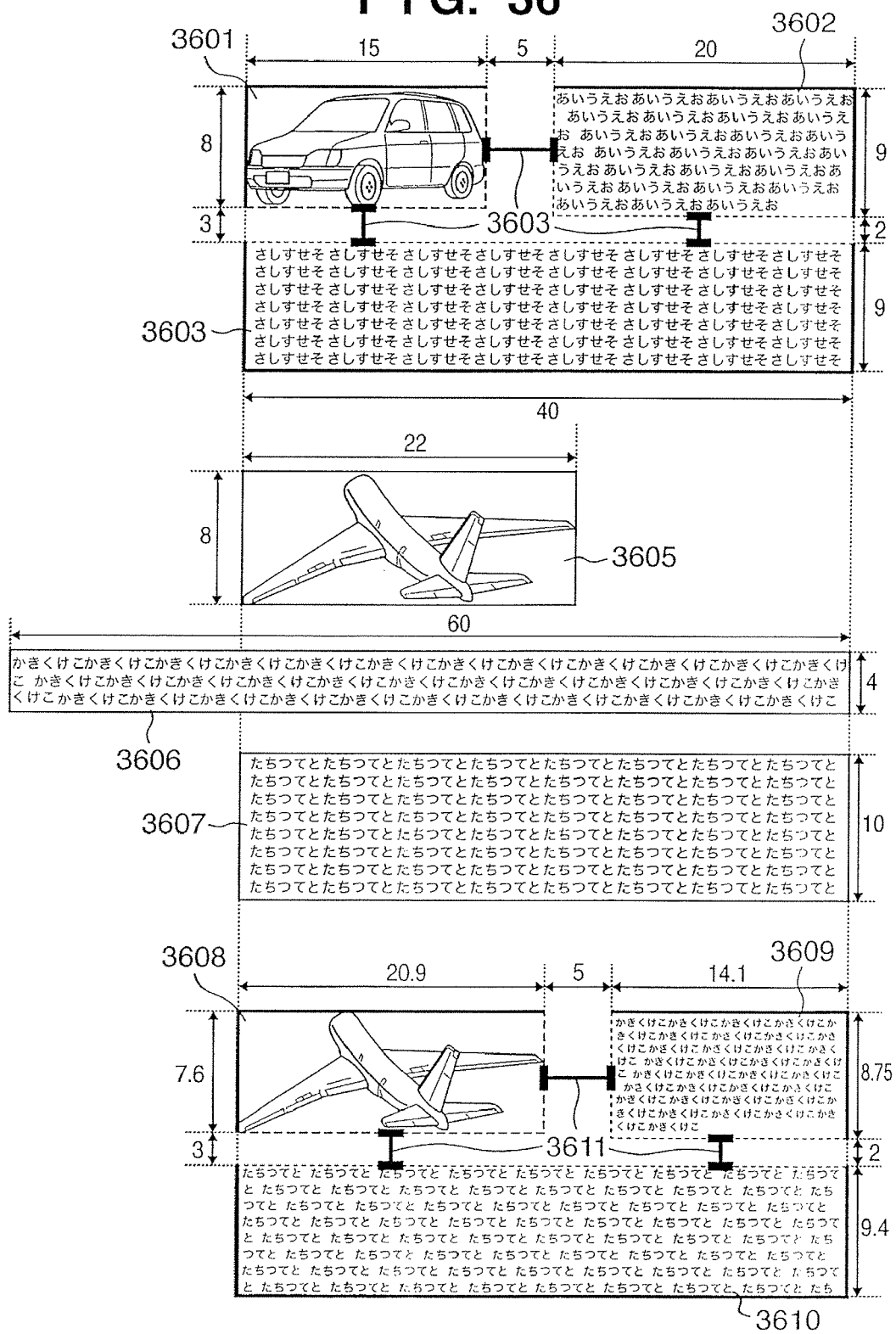
FIG. 36 is a view showing a processing example of layout calculation considering priorities in layout calculation shown in FIG. 35.

FIGS. 35 and 36 show a layout calculation example with associations in the horizontal and vertical directions. FIGS. 35 and 36 show the same layout set. FIG. 35 shows an example when no priority is set. FIG. 36 shows an example when priorities are set. Calculation processing according to this embodiment will be described with reference to FIGS. 35 and 36.

FIG. 35 shows calculation of a layout set in which containers 3501, 3502, and 3503 are associated by links 3504. The container 3501 is set to consider the aspect ratio. The width of the page shown in FIG. 35 is 60. A content 3505 is inserted in the container 3501, a content 3506 is inserted in the container 3502, and a content 3507 is inserted in the container 3503. The ideal sizes of the contents 3505, 3506, and 3507 are shown in FIG. 35. The width of the text contents data 3506 in FIG. 35 is limited to 60 on the basis of the page width of 60. The width of the text contents data 3507 is limited to 40 in consideration of the page width (e.g., 60) and the page margin size (e.g., 10 on each edge). The present invention can be applied to both of text contents data limited on the basis of the page width and text contents data limited on the basis of the page width and the page margin size. Layout calculation in the horizontal direction is executed first (S3202). Let ah, bh, and ch be the horizontal sizes of the containers 3501, 3502, and 3503 after calculation. A cost kh in the horizontal direction is given by $$kh=(ah-22)^2+(bh-60)^2 \tag{9}$$

The container 3503 has no cost because the horizontal size is fixed. Since the containers have the same priority, the cost k is minimized when $$ah-22=bh-60 \tag{10}$$

The size of the layout set after layout calculation is given by $$ah+bh+5=40 \tag{11}$$

The size of each container after calculation is obtained from equations (10) and (11). After calculation, the size of the container 3501 is −1.5, and the size of the container 3502 is 36.5. Actually, the container size never has a negative value. Hence, the container 3501 violates the rules. Minimum and maximum values are set for the size of a container. No negative value can be set. For example, when a minimum value of 10 and a maximum value of 30 are set for the container 3501, the container 3501 never becomes smaller than 10 under any stress. The stress that cannot be distributed to the container 3501 is distributed to the remaining layouts. In this case, the stress is distributed to the container 3502. Hence, the horizontal layout result of the container 3501 is 10, and that of the container 3502 is 25. The size of the container 3503 is 40 because it does not change.

Size calculation in the vertical direction is executed next. Since the container 3501 is set to consider the aspect ratio, the vertical size is calculated from the horizontal size of 10 (S3203). Letting av be the vertical size, the aspect ratio is given by $$22:8=10:av \tag{12}$$

From equation (12), av=3.6 is obtained. Hence, the vertical size of the container 3501 is 3.6.

Layout calculation in the vertical direction is executed next (S3204). Since the vertical size of the container 3501 is obtained, $$3.6+3+cv=20 \tag{13}$$

holds, where cv is the vertical size of the container 3503.

Equation (13) is an equation about the vertical size of the layout set. From equation (13), cv=13.45 is obtained. Since the vertical size of the container 3503 is obtained, $$bv+2+13.45=20 \tag{14}$$

holds, where bv is the vertical size of the container 3502. Equation (14) is an equation about the vertical size of the layout set. From equation (14), bv=4.6 is obtained. The layout results obtained by equations (9) to (14) are temporarily stored as layout results calculated in the order of horizontal and vertical directions (S3205).

The same layout calculation is executed from the vertical direction (S3206). The cost in the vertical direction has two patterns given by $$kv_1=(av-8)^2+(cv-10)^2 \tag{15}$$

$$kv_2=(bv-4)^2+(cv-10)^2 \tag{16}$$

The pattern based on equation (15) will be referred to as a pattern A, and the pattern based on equation (16) will be referred to as a pattern B hereinafter.

Calculation of the pattern A is executed first. Since the containers have the same priority, the cost $kv_1$ is minimized when $$av-8=cv-10 \tag{17}$$

The size of the layout set after layout calculation is given by $$av+cv+3=20 \tag{18}$$

The size of each container after calculation is obtained from equations (17) and (18). After calculation, the size of the container 3501 is 7.5, and the size of the container 3503 is 9.5. Consequently, the size of the container 3502 is 8.5. The obtained layout results of the pattern A are temporarily stored.

Calculation of the pattern B is executed next. Since the containers have the same priority, the cost $kv_2$ is minimized when $$bv-4=cv-10 \tag{19}$$

The size of the layout set after layout calculation is given by $$bv+cv+2=20 \quad (20)$$

The size of each container after calculation is obtained from equations (19) and (20). After calculation, the size of the container 3502 is 6, and the size of the container 3503 is 12. Consequently, the size of the container 3501 is 5. The obtained layout results of the pattern B are temporarily stored.

Next, a container having the highest priority is extracted from the container set. Since no layout priority is set for the container set, the containers have the same priority. In this case, a container closest to the upper left corner in the container set is extracted as the container having the highest priority. Hence, the container 3501 is extracted. Of the temporarily stored layout results of the patterns A and B, a pattern in which the container 3501 is laid out in a size close to the actual size is detected. Since the actual size of the container 3501 is 8, the layout result of the pattern A based on equation (15), which is calculated as 7.5, is handled as the layout result in the vertical direction.

Calculation in the horizontal direction is executed next (S3207 and S3208). Since the container 3501 is set to consider the aspect ratio, the horizontal size is calculated from the vertical size of 7.5 (S3207). Letting ah be the horizontal size, the aspect ratio is given by $$22:8=ah:7.5 \quad (21)$$

From equation (21), ah=20.6 is obtained. Hence, the horizontal size of the container 3501 is 20.6.

Since the horizontal size of the container 3501 is obtained, $$20.6+5+bh=40 \quad (22)$$

holds, where bh is the horizontal size of the container 3502. Equation (22) is an equation about the horizontal size of the layout set. From equation (22), bh=14.4 is obtained. The horizontal size of the container 3503 is fixed and remains 40. The layout results obtained by equations (15) to (22) are temporarily stored as layout results calculated in the order of vertical and horizontal directions (S3209).

Layout adjustment is executed by comparing the layout results temporarily stored in the horizontal/vertical mode with those temporarily stored in the vertical/horizontal mode (S3210). As described above, since no layout priority is set for the container set, the container 3501 located closest to the upper left corner is handled as the container having the highest priority. The layout result of the container 3501, which is nearer to the ideal size, is set as the layout result of the layout set. As the layout results calculated for the container 3501 in the order of horizontal and vertical directions, the horizontal size is 10, and the vertical size is 3.6. As the layout results calculated in the order of vertical and horizontal directions, the horizontal size is 20.6, and the vertical size is 7.5. The actual size (ideal size) of the content 3505 to be inserted in the container 3501 is 22 in the horizontal direction and 8 in the vertical direction. The layout results calculated in the order of vertical and horizontal directions are nearer to the actual size (ideal size). Hence, the layout results calculated in the order of vertical and horizontal directions are set as the layout results of the container set (steps S3307 to S3309). The layout results after calculation are indicated by containers 3508 to 3510. In this case, since the layout adjustment target is image data, the actual size equals the ideal size. When the target is text data, the ideal size is determined on the basis of the contents amount held by the text data and the font attribute or container attribute of the container to insert the text data.

The layout flow shown in FIG. 36 will be described next. In FIG. 36, priorities are set for the same layout set as in FIG. 35. A priority of 75% is set for a container 3601, a priority of 50% is set for a container 3602, and a priority of 25% is set for a container 3603. Contents 3605, 3606, and 3607 are inserted in these containers. The content sizes and page width (60) are the same as in FIG. 35.

Priorities set for the containers are acquired (S3201). Layout calculation in the horizontal direction is executed (S3202). Let ah, bh, and ch be the horizontal sizes of the containers 3601, 3602, and 3603 after calculation. The cost kh in the horizontal direction is given by $$kh=(ah-22)^2+(bh-60)^2 \quad (23)$$

The container 3603 has no cost because the horizontal size is fixed.

When the priorities of the containers are taken into consideration, the cost k is minimized when $$75/100(ah-22)=50/100(bh-60) \quad (24)$$

The size of the layout set after layout calculation is given by $$ah+bh+5=40 \quad (25)$$

The size of each container after calculation is obtained from equations (24) and (25). After calculation, the size of the container 3601 is 3.5, and the size of the container 3602 is 31.5. As in FIG. 35, when a minimum value of 10 and a maximum value of 30 are set for the container 3601, the container 3601 has a size of 10, and the container 3602 has a size of 25 as layout results in the horizontal direction. The size of the container 3603 is 40 because it does not change.

Calculation in the vertical direction is executed next (S3203 and S3204). Since the container 3601 is set to consider the aspect ratio, the vertical size is calculated from the horizontal size of 10. Letting av be the vertical size, the aspect ratio is given by $$22:8=10:av \quad (26)$$

From equation (26), av=3.6 is obtained. Hence, the vertical size of the container 3601 is 3.6.

Since the vertical size of the container 3601 is obtained, $$3.6+3+cv=20 \quad (27)$$

holds, where cv is the vertical size of the container 3603. Equation (27) is an equation about the vertical size of the layout set. From equation (27), cv=13.45 is obtained. Since the vertical size of the container 3603 is obtained, $$bv+2+13.45=20 \quad (28)$$

holds, where bv is the vertical size of the container 3602. Equation (28) is an equation about the vertical size of the layout set. From equation (28), bv=4.6 is obtained. The layout results obtained by equations (23) to (28) are temporarily stored as layout results calculated in the order of horizontal and vertical directions (S3205).

The layout calculation is executed from the vertical direction next (S3206). The cost in the vertical direction has two patterns given by $$kv_1=(av-8)^2+(cv-10) \quad (29)$$

$$kv_2=(bv-4)^2+(cv-10) \quad (30)$$

Layout calculation based on equation (29) will be referred to as a pattern A, and layout calculation based on equation (30) will be referred to as a pattern B hereinafter. Calculation of the pattern A is executed first.

When the priorities of the containers are taken into consideration, the cost $kv_1$ is minimized when $$75/100(av-8)=25/100(cv-10) \quad (31)$$

The size of the layout set after layout calculation is given by $$av+cv+3=20 \quad (32)$$

The size of each container after calculation is obtained from equations (31) and (32). After calculation, the size of the container 3601 is 7.6, and the size of the container 3603 is 9.4. Consequently, the size of the container 3602 is 8.6. The obtained layout results of the pattern A are temporarily stored.

Calculation of the pattern B is executed next. When the priorities of the containers are taken into consideration, the cost $kv_2$ is minimized when $$50/100(bv-4)=25/100(cv-10) \quad (33)$$

The size of the layout set after layout calculation is given by $$bv+cv+2=20 \quad (34)$$

The size of each container after calculation is obtained from equations (33) and (34). After calculation, the size of the container 3602 is 5.3, and the size of the container 3603 is 12.7. Consequently, the size of the container 3601 is 4.3. The layout results of the pattern B are temporarily stored.

A container having the highest priority is extracted from the container set. Of this container set, the container 3601 has the highest priority. Of the temporarily stored layout results of the patterns A and B, a pattern in which the container 3601 is laid out in a size close to the actual size is detected. Since the actual size of the content 3605 to be inserted in the container 3601 is 8, the layout result of the pattern A, which is calculated as 7.6, is handled as the layout result in the vertical direction.

Calculation in the horizontal direction is executed next (S3207 and S3208). Since the container 3601 is set to consider the aspect ratio, the horizontal size is calculated from the vertical size of 7.6 (S3207). Letting ah be the horizontal size, the aspect ratio is given by $$22:8=ah:7.6 \quad (35)$$

From equation (35), ah=20.9 is obtained. Hence, the horizontal size of the container 3601 is 20.9. Since the horizontal size of the container 3601 is obtained, $$20.9+5+bh=40 \quad (36)$$

holds, where bh is the horizontal size of the container 3602. Equation (36) is an equation about the horizontal size of the layout set. From equation (36), bh=14.1 is obtained. The horizontal size of the container 3603 is fixed and remains 40.

The layout results obtained by equations (29) to (36) are temporarily stored as layout results calculated in the order of vertical and horizontal directions (S3209).

Layout adjustment is executed by comparing the layout results temporarily stored in the horizontal/vertical mode with those temporarily stored in the vertical/horizontal mode (S3210). Since the container 3601 has the highest priority, a layout in which the layout result of the container 3601 is close to the ideal size is set as the layout result of the layout set. As the layout results calculated for the container 3601 in the order of horizontal and vertical directions, the horizontal size is 10, and the vertical size is 3.6. As the layout results calculated in the order of vertical and horizontal directions, the horizontal size is 20.9, and the vertical size is 7.6. The actual size of the content 3605 to be inserted in the container 3601 is 22 in the horizontal direction and 8 in the vertical direction. The layout results calculated in the order of vertical and horizontal directions are nearer to the actual size (ideal size). Hence, the layout results calculated in the order of vertical and horizontal directions are set as the layout results of the container set (especially steps S3307 to S3309). The layout results after calculation are indicated by containers 3608 to 3610 in FIG. 36. As described above, when the calculation results from both of the horizontal and vertical directions or vertical and horizontal directions are compared, an optimum layout can be created.

In the layout result in FIG. 36 with priorities, a container having a high priority is laid out optimally (close to the ideal size), as compared to the layout result shown in FIG. 35.

As described above, according to this embodiment, in the automatic layout system, even when a plurality of containers are associated and affect each other to change the layout, the priority order of the containers can be set in consideration of the contents sizes of contents data to be inserted. Hence, the container size (area size) of a container that the user wants to appeal can be calculated with priority over the remaining containers. In addition, since calculation is done in accordance with weighting of the set priority (ratio), priority orders of different variations can be set, and layout calculation can be executed while making containers negotiate each other. Furthermore, the set priority order can visually be displayed, the user can easily predict the layout result by automatic layout.

The object of the present invention can also be achieved by supplying a storage medium (or recording medium) which stores software program codes for implementing the functions of the above-described embodiment to a system or apparatus and causing the computer (or a CPU or MPU) of the system or apparatus to read out and execute the program codes stored in the storage medium.

In this case, the program codes read out from the storage medium implement the functions of the above-described embodiment by themselves, and the storage medium which stores the program codes constitutes the present invention. The functions of the above-described embodiment are implemented not only when the readout program codes are executed by the computer but also when the operating system (OS) running on the computer performs part or all of actual processing on the basis of the instructions of the program codes.

The functions of the above-described embodiment are also implemented when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes.

The present invention is also achieved when software program codes for implementing the functions of the above-described embodiment are distributed through a network and stored in a storage means such as a hard disk or memory of a system or apparatus or a storage medium such as a CD-RW or CD-R, and the computer (or CPU or MPU) of the system or apparatus reads out and executes the program codes stored in the storage means or storage medium.

As described above, according to the present invention, since the size of a data area to insert data is determined in accordance with a priority set for the data area, layout processing properly adapting to the user's requirement can be implemented.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-231428 filed on Aug. 6, 2004, which is hereby incorporated by reference herein.

What is claimed is:

1. A layout processing method of performing layout processing by using a template having a plurality of data areas and contents data to be inserted in each of the plurality of data areas, comprising:
  a first setting step of setting a first priority for a first data area and a second priority for a second data area, wherein the first data area and the second data area are connected by a link;
  a second setting step of setting an aspect ratio attribute for the first data area;
  a first determination step of determining a first size for the first data area by determining a length in a horizontal direction of the first data area so that a change amount of a contents size in the horizontal direction of first contents data to be inserted in the first data area and to which the first priority has been set is smaller than a change amount of a contents size in the horizontal direction of second contents data to be inserted in the second data area and to which the second priority, which is lower than the first priority, has been set and then determining a length in a vertical direction of the first data area based on the determined length in the horizontal direction of the first data area and the aspect ratio of the first contents data;
  a second determination step of determining a second size for the first data area by determining a length in a vertical direction of the first data area so that a change amount of a contents size in the vertical direction of first contents data to be inserted in the first data area and to which the first priority has been set is smaller than a change amount of a contents size in the vertical direction of second contents data to be inserted in the second data area and to which the second priority, which is lower than the first priority, has been set and then determining a length in a horizontal direction of the first data area based on the determined length in the vertical direction of the first data area and aspect ratio of the first contents data;
  a selecting step of selecting a size of the first data area nearer to the size of the first contents data from the first size of the first data area determined in the first determination step and the second size of the first data area determined in the second determination step; and
  an output step of outputting a layout result with layout processing performed using the size of the first data area selected in the selecting step.

2. The method according to claim 1, further comprising a template generation step of generating, as a layout range where the data areas should be laid out, a template in which the data areas are arranged, and the constraint to associate the data areas is set,
  wherein in the first and second determination steps, the area size of each of the data areas is determined in accordance with the template generated in the template generation step.

3. The method according to claim 2, further comprising a data area setting step of setting, as a data area attribute, a maximum size and a minimum size of a data area to be determined in the first and second determination steps,
  wherein in the first and second determination steps, the area size of each of the data areas is determined in accordance with the template and the data area attribute.

4. The method according to claim 1, further comprising:
  a test step of executing test layout processing based on a test priority for test when the second setting step sets the test priority for the plurality of data areas; and
  a return step of returning the test priority to the priority before the test priority was set when the test layout processing performed in the test step has ended.

5. An information processing apparatus which executes layout processing by using a template having a plurality of data areas and contents data to be inserted in each of the plurality of data areas, comprising:
  a first setting unit configured to set a first priority for a first data area and a second priority for a second data area, wherein the first data area and the second data area are connected by a link;
  a second setting step of setting an aspect ratio attribute for the first data area;
  a determination unit configured (i) to determine a first size for the first data area by determining a length in a horizontal direction of the first data area so that a change amount of a contents size in the horizontal direction of first contents data to be inserted in the first data area and to which the first priority has been set is smaller than a change amount of a contents size in the horizontal direction of second contents data to be inserted in the second data area and to which the second priority, which is lower than the first priority, has been set and then determining a length in a vertical direction of the first data area based on the determined length in the horizontal direction of the first data area and aspect ratio of the first contents data, and (ii) to determine a second size for the first data area by determining a length in a vertical direction of the first data area so that a change amount of a contents size in the vertical direction of first contents data to be inserted in the first data area and to which the first priority has been set is smaller than a change amount of a contents size in the vertical direction of second contents data to be inserted in the second data area and to which the second priority, which is lower than the first priority, has been set and then determining a length in a horizontal direction of the first data area based on the determined length in the vertical direction of the first data area and aspect ratio of the first contents data;
  a selecting unit of selecting the size of the first data area nearer to the size of the first contents data from the first size of the first data area and the second size of the first data area; and
  said display unit is configured to output a layout result from layout processing performed using the size of the first data area selected in the selecting unit.

6. The apparatus according to claim 5, further comprising a template generation unit configured to generate, as a layout range where the data areas should be laid out, a template in which the data areas are arranged, and the constraint to associate the data areas is set,
  wherein said determination unit determines the area size of each of the data areas in accordance with the template generated by said template generation unit.

7. The apparatus according to claim 6, further comprising a data area setting unit configured to set, as a data area attribute, a maximum size and a minimum size of a data area to be determined by said determination unit, wherein said determination unit determines the area size of each of the data areas in accordance with the template and the data area attribute.

8. The apparatus according to claim 5, further comprising:
a test unit configured to execute test layout processing based on a test priority when the second setting unit sets the test priority for the plurality of data areas; and
a return unit configured to return the test priority to the priority before the test priority was set when the test layout processing performed by said test unit has ended.

9. A computer readable storage medium encoded with a computer which causes a computer to execute layout processing by using a template having a plurality of data areas and contents data to be inserted in each of the plurality of data areas, the layout processing comprising:
a first setting step of setting a first priority for a first data area and a second priority for a second data area, wherein the first data area and the second data area are connected by a link;
a second setting step of setting an aspect ratio attribute for the first data area;
a first determination step of determining a first size for the first data area by determining a length in a horizontal direction of the first data area so that a change amount of a contents size in the horizontal direction of first contents data to be inserted in the first data area and to which the first priority has been set is smaller than a change amount of a contents size in the horizontal direction of second contents data to be inserted in the second data area and to which the second priority, which is lower than the first priority, has been set and then determining a length in a vertical direction of the first data area based on the determined length in the horizontal direction of the first data area and aspect ratio of the first contents data;
a second determination step of determining a second size for the first data area by determining a length in a vertical direction of the first data area so that a change amount of a contents size in the vertical direction of first contents data to be inserted in the first data area and to which the first priority has been set is smaller than a change amount of a contents size in the vertical direction of second contents data to be inserted in the second data area to which the second priority, which is lower than the first priority, has been set and then determining a length in a horizontal direction of the first data area based on the determined length in the vertical direction of the first data area and aspect ratio of the first contents data;
a selecting step of selecting the size of the first data area nearer to the size of the first contents data from the first size of the first data area determined in the first determination step and the second size of the first data area determined in the second determination step; and
an output step of outputting a layout result that layout processing is performed by using the size of the first data area selected in the selecting step.

* * * * *